United States Patent
Kitani et al.

(10) Patent No.: US 7,241,010 B2
(45) Date of Patent: *Jul. 10, 2007

(54) BI-ASPHERICAL TYPE PROGRESSIVE-POWER LENS

(75) Inventors: Akira Kitani, Tokyo (JP); Yoshihiro Kikuchi, Tokyo (JP)

(73) Assignee: Hoya Corporation, Tokyo (JP)

( * ) Notice: Subject to any disclaimer, the term of this patent is extended or adjusted under 35 U.S.C. 154(b) by 136 days.

This patent is subject to a terminal disclaimer.

(21) Appl. No.: 11/107,934

(22) Filed: Apr. 18, 2005

(65) Prior Publication Data
US 2005/0179861 A1   Aug. 18, 2005

Related U.S. Application Data

(62) Division of application No. 10/476,891, filed as application No. PCT/JP03/06448 on May 23, 2003, now Pat. No. 6,935,744.

(30) Foreign Application Priority Data

May 28, 2002 (JP) ............................. 2002-154681
Oct. 3, 2002 (JP) ............................. 2002-290606

(51) Int. Cl.
    *G02C 7/02*   (2006.01)
(52) U.S. Cl. ...................... 351/177; 351/169
(58) Field of Classification Search ............ 351/161, 351/168, 169, 177
    See application file for complete search history.

(56) References Cited

U.S. PATENT DOCUMENTS

| | | | |
|---|---|---|---|
| 3,711,191 A | 1/1973 | Tagnon | |
| 4,606,622 A | 8/1986 | FueGerhard et al. | |
| 4,786,160 A | 11/1988 | Furter | |
| 4,969,729 A | 11/1990 | Merle | |
| 5,455,642 A | 10/1995 | Kato | |
| 5,719,657 A | 2/1998 | Izawa et al. | |
| 5,926,250 A | 7/1999 | Mukaiyama et al. | |

(Continued)

FOREIGN PATENT DOCUMENTS

EP   0 809 127 A1   11/1997

(Continued)

*Primary Examiner*—Scott J. Sugarman
*Assistant Examiner*—Darryl J. Collins
(74) *Attorney, Agent, or Firm*—Oliff & Berridge, PLC

(57) ABSTRACT

To provide a bi-aspherical type progressive-power lens which provides an excellent visual acuity correction for prescription values and a wide effective visual field with less distortion in wearing, by reducing a magnification difference of an image between a distance portion and a near portion. The lens is characterized in that when on a first refractive surface being an object side surface, a surface refractive power in a horizontal direction and a surface refractive power in a vertical direction, at a far vision diopter measurement position F1, are DHf and DVf respectively, and on the first refractive surface, a surface refractive power in a horizontal direction and a surface refractive power in a vertical direction, at a near vision diopter measurement position N1, are DHn and DVn respectively, relational equations, DHf+DHn<Dvf+DVn, and DHn<DVn are satisfied, and surface astigmatism components at F1 and N1 of the first refractive surface are cancelled by the second refractive surface being an eyeball side surface so that the first and second refractive surfaces together provide a far vision diopter (Df) and an addition diopter (ADD) based on prescription values.

8 Claims, 38 Drawing Sheets

U.S. PATENT DOCUMENTS 6,149,271 A    11/2000    Menezes et al.
6,712,467 B1    3/2004    Kitani
6,935,744 B2 *  8/2005    Kitani et al. ................ 351/169

FOREIGN PATENT DOCUMENTS

| EP | 0996 023 A2 | 4/2000 |
|---|---|---|
| JP | A 47-23943 | 7/1972 |
| JP | A 57-10112 | 1/1982 |
| JP | A 6-118353 | 4/1994 |
| JP | A 10-206805 | 8/1998 |
| JP | A 2000-338452 | 12/2000 |
| JP | A 2001-21846 | 1/2001 |
| WO | WO97/19382 | 5/1997 |
| WO | WO97/19383 | 5/1997 |

* cited by examiner

Fig. 7

| TABLE 1-1 | DVf1 | DHf1 | DVn1 | DHn1 | DVf2 | DHf2 | DVn2 | DHn2 |
|---|---|---|---|---|---|---|---|---|
| PRIOR ART EXAMPLE A (CONVEX SURFACE PROGRESSION) | 4.00 | 4.00 | 7.00 | 7.00 | 4.00 | 4.00 | 4.00 | 4.00 |
| PRIOR ART EXAMPLE B (DOUBLE SURFACE PROGRESSION) | 4.75 | 4.75 | 6.25 | 6.25 | 4.75 | 4.76 | 3.25 | 3.25 |
| PRIOR ART EXAMPLE C (CONCAVE SURFACE PROGRESSION) | 5.50 | 5.50 | 5.50 | 5.50 | 5.50 | 6.50 | 2.50 | 2.50 |
| EXAMPLE 1 | 4.75 | 4.75 | 7.75 | 4.75 | 4.75 | 4.75 | 4.75 | 1.75 |
| EXAMPLE 4 | 5.50 | 4.00 | 8.50 | 4.00 | 5.50 | 4.00 | 5.50 | 1.00 |
| EXAMPLE 5 | 6.25 | 6.25 | 6.25 | 3.25 | 6.25 | 6.25 | 3.25 | 0.25 |
| EXAMPLE 6 | 6.50 | 4.50 | 6.50 | 4.50 | 6.50 | 4.50 | 3.50 | 1.50 |

| TABLE 1-2 | SMVf | SMVn | SMVfn | SMHf | SMHn | SMHfn |
|---|---|---|---|---|---|---|
| PRIOR ART EXAMPLE A (CONVEX SURFACE PROGRESSION) | 1.0087 | 1.1467 | 0.1380 | 1.0077 | 1.1092 | 0.1015 |
| PRIOR ART EXAMPLE B (DOUBLE SURFACE PROGRESSION) | 1.0104 | 1.1464 | 0.1360 | 1.0092 | 1.1080 | 0.0988 |
| PRIOR ART EXAMPLE C (CONCAVE SURFACE PROGRESSION) | 1.0120 | 1.1462 | 0.1342 | 1.0107 | 1.1068 | 0.0961 |
| EXAMPLE 1 | 1.0104 | 1.1446 | 0.1342 | 1.0092 | 1.1046 | 0.0954 |
| EXAMPLE 4 | 1.0120 | 1.1428 | 0.1308 | 1.0076 | 1.1028 | 0.0952 |
| EXAMPLE 5 | 1.0137 | 1.1438 | 0.1301 | 1.0123 | 1.1024 | 0.0901 |
| EXAMPLE 6 | 1.0143 | 1.1431 | 0.1288 | 1.0086 | 1.1042 | 0.0956 |

Fig. 8

| TABLE 2-2 | DVf1 | DHf1 | DVn1 | DHn1 | DVf2 | DHf2 | DVn2 | DHn2 |
|---|---|---|---|---|---|---|---|---|
| PRIOR ART EXAMPLE A (CONVEX SURFACE PROGRESSION) | 9.00 | 9.00 | 12.00 | 12.00 | 3.00 | 3.00 | 3.00 | 3.00 |
| PRIOR ART EXAMPLE B (DOUBLE SURFACE PROGRESSION) | 9.75 | 9.75 | 11.25 | 11.25 | 3.75 | 3.75 | 2.25 | 2.25 |
| PRIOR ART EXAMPLE C (CONCAVE SURFACE PROGRESSION) | 10.50 | 10.50 | 10.50 | 10.50 | 4.50 | 4.50 | 1.50 | 1.50 |
| EXAMPLE 2 | 9.75 | 9.75 | 12.75 | 9.75 | 3.75 | 3.75 | 3.75 | 0.75 |
| EXAMPLE 7 | 9.00 | 9.00 | 15.00 | 9.00 | 3.00 | 3.00 | 6.00 | 0.00 |

| TABLE 2-2 | SMVf | SMVn | SMVfn | SMHf | SMHn | SMHfn |
|---|---|---|---|---|---|---|
| PRIOR ART EXAMPLE A (CONVEX SURFACE PROGRESSION) | 1.1661 | 1.3936 | 0.2275 | 1.1452 | 1.2777 | 0.1325 |
| PRIOR ART EXAMPLE B (DOUBLE SURFACE PROGRESSION) | 1.1684 | 1.3961 | 0.2277 | 1.1487 | 1.2755 | 0.1268 |
| PRIOR ART EXAMPLE C (CONCAVE SURFACE PROGRESSION) | 1.1709 | 1.3989 | 0.2280 | 1.1523 | 1.2733 | 0.1210 |
| EXAMPLE 2 | 1.1683 | 1.3834 | 0.2151 | 1.1486 | 1.2685 | 0.1199 |
| EXAMPLE 7 | 1.1658 | 1.3724 | 0.2066 | 1.1451 | 1.2639 | 0.1188 |

Fig. 9

| TABLE 3-1 | DVf1 | DHf1 | DVn1 | DHn1 | DVf2 | DHf2 | DVn2 | DHn2 |
|---|---|---|---|---|---|---|---|---|
| PRIOR ART EXAMPLE A (CONVEX SURFACE PROGRESSION) | 1.00 | 1.00 | 4.00 | 4.00 | 7.00 | 7.00 | 7.00 | 7.00 |
| PRIOR ART EXAMPLE B (DOUBLE SURFACE PROGRESSION) | 1.75 | 1.75 | 3.25 | 3.25 | 7.75 | 7.75 | 6.25 | 6.25 |
| PRIOR ART EXAMPLE C (CONCAVE SURFACE PROGRESSION) | 2.50 | 2.50 | 2.50 | 2.50 | 8.50 | 8.50 | 5.50 | 6.50 |
| EXAMPLE 3 | 1.75 | 1.75 | 4.75 | 1.75 | 7.75 | 7.75 | 7.75 | 4.75 |

| TABLE 3-2 | SMVf | SMVn | SMVfn | SMHf | SMHn | SMHfn |
|---|---|---|---|---|---|---|
| PRIOR ART EXAMPLE A (CONVEX SURFACE PROGRESSION) | 0.8953 | 0.9428 | 0.0475 | 0.9140 | 0.9914 | 0.0774 |
| PRIOR ART EXAMPLE B (DOUBLE SURFACE PROGRESSION) | 0.8973 | 0.9391 | 0.0418 | 0.9149 | 0.9899 | 0.0750 |
| PRIOR ART EXAMPLE C (CONCAVE SURFACE PROGRESSION) | 0.8991 | 0.9354 | 0.0363 | 0.9157 | 0.9884 | 0.0727 |
| EXAMPLE 3 | 0.8973 | 0.9485 | 0.0512 | 0.9149 | 0.9875 | 0.0726 |

Fig. 11
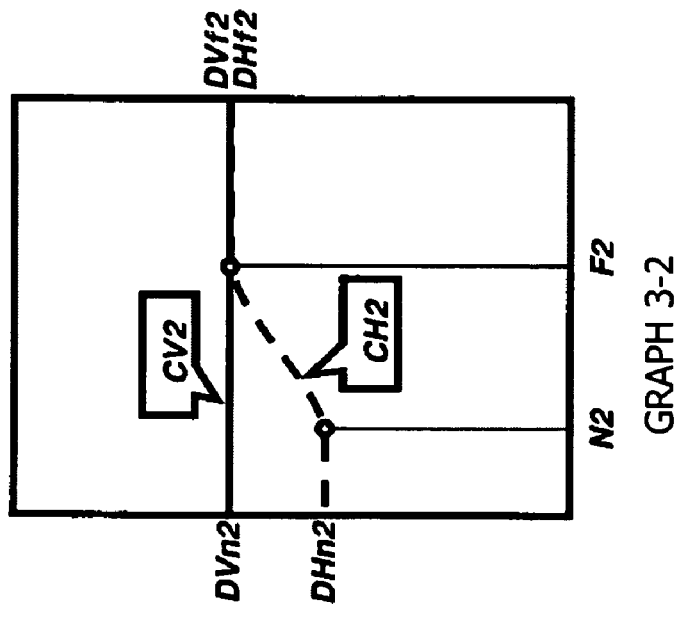
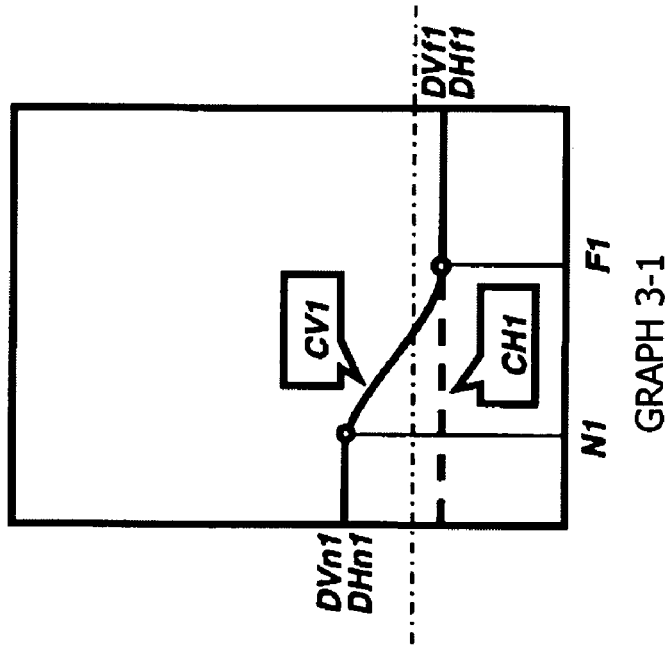

BI-ASPHERICAL TYPE PROGRESSIVE-POWER LENS

CROSS-REFERENCE TO RELATED APPLICATION

This is a Division of application Ser. No. 10/476,891, filed Nov. 26, 2003 now U.S. Pat. No. 6,935,744. The entire disclosure of the prior application is hereby incorporated by reference herein in its entirety.

BACKGROUND

The present invention relates to a bi-aspherical type progressive-power lens, which is a lens used as, for example, a progressive-power lens for a spectacle for presbyopia that is configured to have a progressive refractive power action dividedly allotted to a first refractive surface being an object side surface and a second refractive surface being an eyeball side surface, so that the first surface and the second surface together provide a far vision diopter (Df) and an addition diopter (ADD) based on prescription values.

A progressive-power lens is widely used in general because of an advantage that it is hardly detected from others as a spectacle for the aged in spite of a spectacle lens for presbyopia, an advantage that it allows a wearer to clearly look continuously from a far distance to a near distance without discontinuity, and so on. However, it is also widely known that the necessity of arrangement of a plurality of visual fields such as a field for looking far and a field for looking near, and further a field for looking at a distance intermediate therebetween, without a boundary line existing within a limited lens area, presents disadvantages specific to the progressive-power lens such that each visual field is not always sufficiently wide, and that there is a region mainly in a side visual field which causes the wearer to feel distortion or sway of an image.

Various proposals have been made since long ago to improve the disadvantages specific to the progressive-power lens, and most of such conventional progressive-power lenses have a surface configuration created by a combination of a "progressive surface" arranged on an object side surface and a "spherical surface" or a "cylindrical surface" arranged on an eyeball side surface. Conversely to those, Atoral Variplas as a progressive-power lens, which is characterized in that a "progressive action" is added to the eyeball side surface, is released in 1970 from Essel Optical Co. (now Essilor), France.

Besides, recently proposed prior arts include, for example, technologies described in Patent International Publication Nos. WO 97/19382 and WO 97/19383 and so on, which are generally called rear surface progression (or concave surface progression). The surface configuration in the recently proposed rear surface progression has a main purpose of improving distortion and sway of an image by allotting a portion or the whole of a necessary addition diopter from an object side surface to an eyeball side surface to reduce the magnification difference of an image between a distance portion and a near portion.

Among these prior arts, one described in WO 97/19382 has a configuration in which the object side surface is made a spherical surface or a rotationally symmetrical aspherical surface to completely cancel the "progressive action," and a "progressive surface" providing a predetermined addition diopter is added (fused) to only the eyeball side surface. Besides, the prior art described in WO 97/19383 has a configuration in which the addition diopter on the "progressive surface" being the object side surface is made lower than a predetermined value and a "progressive surface" providing a deficiency in addition diopter is added (fused) to a "spherical surface" or "=cylindrical surface" on the rear surface side.

Although having different purposes and reasons, other prior arts of the progressive-power lens having description of technologies of adding the "progressive action" to the eyeball side surface, include, for example, ones described in Japanese Patent Publication No. Sho 47-23943, Japanese Patent Laid-Open No. Sho 57-10112, Japanese Patent Laid-Open No. Hei 10-206805, and Japanese Patent Laid-Open No. 2001-21846. In addition, prior arts in which the "progressive action" is provided to both surfaces of a lens, as in one described in the aforementioned WO 97/19383, include ones described in Japanese Patent Laid-Open No. 2000-338452 and Japanese Patent Laid-Open No. Hei 6-118353. Commonly, in these prior arts, front and rear two surfaces together provide a necessary addition diopter.

These prior arts have a main purpose of improving distortion and sway of an image by allotting a portion or the whole of a necessary addition diopter on an object side surface to an eyeball side surface to reduce magnification difference between a distance portion and a near portion. Clear description, however, on reasons of their improved effects can be rarely found, and only partial description thereof is found just in the aforementioned Patent International Publication No. WO 97/19383 (hereinafter, Prior art 1) or the like. Namely, Prior art 1 discloses the following calculation equations for a lens magnification SM shown in the equation (1) to the equation (3), the lens magnification SM is used as a basic evaluation parameter for lens design.

Namely, Prior art 1 includes the following description.

"The lens magnification SM is generally expressed by the following equation.

$$SM = Mp \times Ms \quad (1),$$

where Mp is called a power factor, and Ms is called a shape factor. When the distance from a vertex of an eyeball side surface (inside vertex) of a lens to an eyeball is an inter-vertex distance L, a refractive power at the inside vertex (inside vertex refractive power) is Po, a thickness at the center of the lens is t, a refractive index of the lens is n, and a base curve (refractive power) of the object side surface of the lens is Pb, Mp and Ms are expressed as follows.

$$Mp = 1/(1 - L \times Po) \quad (2)$$

$$Ms = 1/(1 - (t \times Pb)/n) \quad (3)$$

It should be noted that for calculations of the equation (2) and the equation (3), dioptry (D) is used for the inside vertex refractive power Po and the base curve Pb, and meter (m) is used for the distance L and thickness t, respectively."

Then, these calculation equations for the lens magnification SM are used to calculate a difference in magnification between a distance portion and a near portion. In Prior art 1, it is regarded that the distortion and sway of an image are improved because of a small magnification difference.

The study by the inventor of the invention shows that though some effects are recognized in the above-described Prior art 1 as compared to its prior art, the following points need to be discussed to design a lens with higher performance.

a. Basic evaluation parameters used in the above-described Prior art 1 include a parameter which should be essentially applied only to a portion near the center of a lens as is clear from the description of "the distance L from a vertex of an eyeball side surface of a lens to an eyeball" and "a thickness t at the center of the lens." More specifically, in an example of Prior art 1, the basic evaluation parameter to be applied only to a distance portion near the center of the lens, is applied also to a near portion positioned at a great distance below the lens center, thus presenting a possibility of error.

b. In Prior art 1, the lens magnification SM is calculated using five basic evaluation parameters, composed of the aforementioned ones with addition of the "refractive index of the lens n." However, as is instantly found when tilting forward and backward a lens having an actual diopter, it is considered that the size of an image is strongly influenced by an "angle between a sight line and a lens surface." This leads to a consideration that the "angle between a sight line and a lens surface" is nonnegligible particularly in calculation of the magnification of the near portion positioned at a great distance below the lens center. Accordingly, the lens design of Prior art 1 has a possibility of error caused by the "calculation of the lens magnification without consideration of the angle between a sight line and a lens surface."

c. Prior art 1 only describes the "magnification" for an application example to a cylindrical lens but lacks idea on direction thereof, which causes a possibility of error when "magnifications in the vertical direction and the horizontal direction are different" which occurs, for example, in the near portion positioned at a great distance below the lens center.

d. To accurately calculate the magnification for the near portion, the distance to a visual target, that is, an "object distance" should be added as a calculation factor. In Prior art 1, the "object distance" is not taken into consideration, which presents an undeniable possibility of error.

e. In the magnification calculations, the influence by a prism action is not taken into consideration, which may cause an error.

As described above, the prior art may not be always sufficient from a viewpoint, in particular, of more accurately calculating the "magnification."

The present invention is made to solve the above problems, and its object is to provide a bi-aspherical type progressive-power lens which provides an excellent visual acuity correction for prescription values and a wide effective visual field with less distortion in wearing, by reducing a magnification difference of an image between a distance portion and a near portion through correct calculation of the magnification of the image with an influence by an "angle between a sight line and a lens surface" and an "object distance" taken into consideration.

It is another object of the present invention to provide a bi-aspherical type progressive-power lens which makes it possible to use a "bilaterally symmetrical semifinished product" as an object side surface and process after acceptance of an order only an eyeball side surface into a bilaterally asymmetrical curved surface coping with a convergence action of an eye in near vision, and to reduce processing time and cost.

SUMMARY

As means to solve the above-described problems, in a first means, in a bi-aspherical type progressive-power lens with a progressive refractive power action dividedly allotted to a first refractive surface being an object side surface and a second refractive surface being an eyeball side surface, when on the first refractive surface, a surface refractive power in a horizontal direction and a surface refractive power in a vertical direction, at a far vision diopter measurement position F1, are DHf and DVf respectively, and on the first refractive surface, a surface refractive power in a horizontal direction and a surface refractive power in a vertical direction, at a near vision diopter measurement position N1, are DHn and DVn respectively, relational equations, $$DHf+DHn<Dvf+DVn, \text{ and } DHn<DVn$$

are satisfied, and surface astigmatism components at F1 and N1 of the first refractive surface are cancelled by the second refractive surface so that the first and second refractive surfaces together provide a far vision diopter (Df) and an addition diopter (ADD) based on prescription values.

In a second means, in the bi-aspherical type progressive-power lens according to the first means, relational equations $DVn-DVf>ADD/2$, and $DHn-DHf<ADD/2$ are satisfied.

In a third means, in the bi-aspherical type progressive-power lens according to the first or second means, the first refractive surface is bilaterally symmetrical with respect to one meridian passing through the far vision diopter measurement position F1, the second refractive surface is bilaterally symmetrical with respect to one meridian passing through a far vision diopter measurement position F2 of the second refractive surface, and a position of a near vision diopter measurement position N2 on the second refractive surface is shifted inward to a nose by a predetermined distance.

In a fourth means, in the bi-aspherical type progressive-power lens according to any one of the first to the third means, the first refractive surface is a rotation surface with as a generatrix one meridian passing through the far vision diopter measurement position F1, the second refractive surface is bilaterally symmetrical with respect to one meridian passing through a far vision diopter measurement position F2 on the second refractive surface, and a position of a near vision diopter measurement position N2 on the second refractive surface is shifted inward to a nose by a predetermined distance to respond to a convergence action of an eye in near vision.

The above-described means are devised based on the following results of clarification. Hereinafter, description will be made with reference to the drawings. FIG. 1 is an explanatory view of various surface refractive powers at positions on a spectacle lens surface, FIG. 2 is an explanatory view of a positional relation among an eyeball, sight lines, and a lens, FIG. 3-1, FIG. 3-2, and FIG. 3-3 and FIG. 4-1, FIG. 4-2, and FIG. 4-3 are explanatory views on a magnification Mγ of a prism, being explanatory views on a difference between a plus lens and a minus lens and on a difference in magnification in viewing mainly using a near portion which is a lower portion of a lens, FIG. 5-1 is an explanatory view of an optical layout of progressive-power lens, being a front view of the progressive power lens when viewed from an object side surface, FIG. 5-2 is an explanatory view of the optical layout of the progressive-power lens, being a side view illustrating a cross section in the vertical direction, FIG. 5-3 is an explanatory view of the optical layout of the progressive-power lens, being an elevational view illustrating a cross section in the transverse direction, and FIG. 6 is an explanatory view illustrating the difference of definition on "addition diopter." Note that in these drawings, symbol F denotes a far vision diopter measurement position, symbol N denotes a near vision diopter measurement position, and symbol Q denotes a prism diopter measurement position. In addition, other symbols shown in FIG. 1 and so on denote, DVf: surface refractive power at F of a sectional curved line in the vertical direction passing through F, DVn: surface refractive power at N of a sectional curved line in the vertical direction passing through N, DHf: surface refractive power at F of a sectional curved line in the horizontal direction passing through F, and DHn: surface refractive power at N of a sectional curved line in the horizontal direction passing through N. Further, suffix 1 is added to all of the symbols when the refractive surface of a drawing is a first refractive surface being the object side surface, and suffix 2 is added to all of the symbols when the surface is a second refractive surface being the eyeball side surface for recognition.

Besides, symbols F1 and F2 denote far vision diopter measurement positions on the object side surface and the eyeball side surface, and similarly symbols N1 and N2 denote near vision diopter measurement positions on the object side surface and the eyeball side surface. Further, symbol E is an eyeball, symbol C a center of rotation of the eyeball, symbol S a reference surface around C, symbols Lf and Ln sight lines passing through the far vision diopter measurement position and near vision diopter measurement position respectively. Besides, symbol M is a curved line called a main gazing line through which a sight line passes when one looks with both eyes from an upper front to a lower front portion. Then, symbols F1, N1, F2, N2, and N3 indicate positions, to which an opening of a lens meter is placed, differing depending on the definition of the "addition diopter."

First, a calculation equation of a magnification corresponding to the near vision improved by "corresponding parameters to the near portion" which is the problem (a) of the above-described prior art and "considering the object distance" which is the problem (d), was designed to be obtained as follows. Namely, when Mp is a power factor and Ms is a shape factor, a magnification SM of an image is expressed by $$SM = Mp \times Ms \quad (1')$$

Here, when the objective power (inverse number of the object distance expressed in a unit of m) to a visual target is Px, the distance from the eyeball side surface in the near portion of the lens to the eyeball is L, the refractive power in the near portion (inside vertex refractive power in the near portion) is Po, the thickness in the near portion of the lens is t, the refractive index of the lens is n, and the base curve (refractive power) of the object side surface in the near portion of the lens is Pb, the following relation is established.

$$Mp = (1-(L+t)Px)/(1-L \times Po) \quad (2')$$

$$Ms = 1/(1-t \times (Px+Pb)/n) \quad (3')$$

These equations, in which the parameters are made to correspond to the distance portion, and 0 corresponding to infinity is substituted for Px indicating power of the object distance, match the equations of the above-described Prior art 1. In other words, the equations used in Prior art 1 can be considered to be equations dedicated for the far vision having an infinitive object distance. By the way, although the equation (1') here is identical to the equation of the above-described Prior art 1, the object distance in near vision is generally about 0.3 m to about 0.4 m, and thus Px which is the inverse number thereof becomes a value from about −2.5 to about −3.0. Accordingly, Mp increases in the equation (2') because the numerator increases, and Ms decreases in the equation (3') because the denominator increases. This shows that the influence by the shape factor Ms in the near vision is less than that by the calculations of Prior art 1. For example, when Pb=−Px, that is, the base curve (refractive power) of the surface on the object side of a lens has a value ranging from about +2.5 to about +3.0, Ms=1, which shows that the shape factor in the near vision is completely irrelevant to the magnification of an image.

Although, in the above-described manner, the calculation equations for magnification with the parameters corresponding to the near portion and the "object distance" taken into consideration have been obtained, the "angle between a sight line and a lens surface" which is the problem (b) of the above-described Prior art 1 also needs to be taken into consideration to calculate a magnification in actual near vision. What is an important here is that the "angle between a sight line and a lens surface" has a directional property. In other words, taking the "angle between a sight line and a lens surface" into consideration is nothing but concurrently taking into consideration the directional property of the "magnification of an image" which is the problem (c) of the above-described Prior art 1.

Reviewing the first calculation equation of the above-described equations (1') to (3') in this viewpoint, it has as calculation factors influenced by the "angle between a sight line and a lens surface," the inside vertex refractive power Po in the near portion and the base curve (refractive power) Pb of the object side surface in the near portion. Here, when well-known Martin's approximate equations are used, with the angle formed between the sight line in near vision and the optical axis of the region in the near portion being α and the angle formed between the sight line in the near vision and the normal line on the object side surface in the near portion being β, the inside vertex refractive power in the vertical direction in the near portion:

$$Pov = Po \times (1 + \sin^2 \alpha \times 4/3),$$

the inside vertex refractive power in the horizontal direction in the near portion:

$$Poh = Po \times (1 + \sin^2 \alpha \times 1/3),$$

the vertical section refractive power on the object side surface in the near portion:

$$Pbv = Pb \times (1 + \sin^2 \beta \times 4/3), \text{ and}$$

the transverse section refractive power on the object side surface in the near portion:

$$Pbh = Pb \times (1 + \sin^2 \beta \times 1/3).$$

As long as the angles α and β and Po and Pb are not zero, the refractive powers, power factors, and shape factors have different values between the vertical and horizontal directions as described above, resulting in a difference in magnification occurring between the vertical direction and the horizontal direction.

By the way, while the approximate equations are used here to explain simply a fact that "the refractive power varies depending on the direction of the sight line," these values are desirably obtained by accurate ray tracing calculation in the actual optical design. In a nonattributive example of the method of calculating these, for example, an optical path along the sight line is calculated using Snell's law to calculate L, t, and the distance from the object side refractive surface to an object point, and then, along this optical path, the first fundamental form, the second fundamental form, Weingarten formula, or the like in differential geometry can be used to calculate the refractive power with the influence of refraction on the optical path on the object side refractive surface and the eyeball side refractive surface taken into consideration. These equations and formula and calculating methods are known from long ago and described in a known literature "Differential Geometry" (written by Kentaro Yano, published by Asakura Shoten Kabusikikaisya, the first edition, 1949) and so on, and thus the description thereof is omitted.

By the way, by performing such accurate ray tracing calculations, four calculation factors L, Po, t, and Pb which are the above-described problems (a) to (d) are taken into consideration, and accurate magnification calculations can be possible in all of sight line directions as well as in the near portion located at a great distance below the lens center. In such a manner, the above-described items, the inside vertex refractive power in the vertical direction in the near portion: Pov, the inside vertex refractive power in the horizontal direction in the near portion: Poh, the vertical section refractive power on the object side surface in the near portion: Pbv, and the transverse section refractive power on the object side surface in the near portion: Pbh, can be obtained at an accuracy higher than that in a case using Martin's approximate equations.

It will be easily understood that all of the above-described magnification calculations of an image have to correspond to the difference in the direction of the sight line from the fact that the "the refractive power varies in accordance with the direction of the sight line," as described above. Here, when Mp is the power factor and Ms is the shape factor, and suffix v is added for the vertical direction and suffix h is added for the horizontal direction to express the magnification SM of an image, the above-described equations (1') to (3') are rewritten as follows:

$$SMv=Mpv \times Msv \quad (1v')$$

$$SMh=Mph \times Msh \quad (1h')$$

$$Mpv=(1-(L+t)Px)/(1-L \times Pov) \quad (2v')$$

$$Mph=(1-(L+t)Px)/(1-L \times Poh) \quad (2h)$$

$$Msv=1/(1-t \times (Px+Pbv)/n) \quad (3v')$$

$$Msh=1/(1-t \times (Px+Pbh)/n) \quad (3h').$$

The above way could cope with the above-described problems (a) to (d) of Prior art 1. At last, the "influence by the prism action" which is the above-described problem (e) in calculating the magnification in the actual near vision will be described. While a prism itself has no refractive power unlike a lens, the magnification $M\gamma$ of the prism varies depending on the incident angle and exit angle of rays to/from the prism. Here, an angle magnification $\gamma$ when a ray incident from a vacuum to a medium with a refractive index n, as shown on the left side in FIG. 3-1 and FIG. 4-1, is refracted on the surface of the medium is considered. When the incident angle is i and the refractive angle is r in this event, $n=\sin i/\sin r$ by well-known Snell's law. Besides, the angle magnification $\gamma$ by refraction is expressed by $\gamma=\cos i/\cos r$. Since $n \geq 1$, generally $I \geq r$ and $\gamma \leq 1$. Here, $\gamma$ becomes a maximum value 1 when $i=r=0$, that is, in the case of a normal incidence. When the refractive angle r is as $n=1/\sin r$, $\gamma$ becomes a theoretical minimum value, $\gamma=0$. At this time, $i=\pi/2$, and thus r is equal to a critical angle of total reflection when a ray exits from the medium.

On the other hand, an angle magnification $\gamma'$ when a ray exits from a medium with a refractive index of n to a vacuum, as shown on the right side in FIG. 3-1 and FIG. 4-1, becomes completely reverse to the above. More specifically, when the incident angle of a ray, which is refracted on a medium surface and exits from within the medium to a vacuum, is i' and the refractive angle is r', $1/n=\sin i'/\sin r'$ by Snell's law, and the angle magnification is expressed by $\gamma'=\cos i'/\cos r'$. Since $n \geq 1$, generally $r' \geq i'$ and $y' \geq 1$. Here, $\gamma'$ becomes a maximum value 1 when $i'=r'=0$, that is, in the case of a normal incidence. When the incident angle i' is as $n=1/\sin i'$, $\gamma'$ becomes a theoretical maximum value, $\gamma'=\infty$. At this time, $r'=\pi/2$, and thus i' is equal to a critical angle of total reflection when a ray exits from the medium.

As shown in FIG. 3-3 and FIG. 4-3, a case in which a ray incident on the object side surface of one spectacle lens passes through the inside of the lens, exits from the eyeball side surface, and reaches an eyeball, is considered (hereinafter, it should be conveniently considered that the refractive index of air is approximated to be 1 that is the same as in a vacuum to simplify description). When the refractive index of a spectacle lens is n, the incident angle of a ray incident on the object side surface is i, the refractive angle is r, the incident angle of a ray from within the lens reaching the eyeball side surface is i', and the refractive angle of an emergent ray is r', the angle magnification $M\gamma$ passing through the two surfaces of the spectacle lens is expressed by a product of the above-described two kinds of angle magnifications, $$M\gamma=\gamma \times \gamma'=(\cos i \times \cos i')/(\cos r \times \cos r').$$

This is irrelevant to the refractive power on the lens surface and known as a magnification of a prism.

Here, when a case of $i=r'$ and $r=i'$ as shown in FIG. 3-1 and FIG. 4-1 is considered, $$M\gamma=\gamma \times \gamma'=1,$$

which means that there is no change in magnification of an image seen through a prism. Meanwhile, when a ray is perpendicularly incident on the object side surface of the spectacle lens as shown in FIG. 3-2, $$M\gamma=\gamma'=\cos i'/\cos r' \geq 1,$$

and conversely, when a ray perpendicularly exits from the eyeball side surface of the spectacle lens as shown in FIG. 4-2, $$M\gamma=\gamma=\cos i/\cos r \leq 1.$$

Here, what is important is that the magnifications $M\gamma$ of a prism have a directional property. More specifically, when the distribution of prisms in a progressive-power lens is considered, it naturally varies depending on the diopter and prescription prism value, in which generally prisms in the far vision near the lens center are small and prisms in the vertical direction in the near vision located at a lower portion of the lens are large. Therefore, it can be said that the magnification $M\gamma$ of the prism has great influence especially on the vertical direction in the near vision.

Not only a progressive-power lens, but also a typical spectacle lens has a meniscus shape in which the object side surface is convex and the eyeball side surface is concave, and thus taking it into consideration that the sight line in near vision is in a downward direction, it can be said that the near vision through the progressive-power lens having a positive refractive power in the near portion as shown in FIG. 3-3, is similar to the shape in FIG. 3-2 of $M\gamma \geq 1$ rather than in FIG. 3-1 of $M\gamma=1$, and at least $M\gamma>1$. Similarly, it can be said that the near vision through the progressive-power lens having a negative refractive power in the near portion as shown in FIG. 4-3, is similar to the shape in FIG. 4-2 of $M \leq 1$ rather than in FIG. 4-1 of $M\gamma=1$, and at least $M\gamma<1$. Accordingly, $M\gamma>1$ in the near vision through the progressive-power lens having a positive refractive power in the near portion, and $M\gamma<1$ in the near vision through the progressive-power lens having a negative refractive power in the near portion.

While the magnification SM of the lens in Prior art 1 is grasped only as a product of the power factor Mp and the shape factor Ms as described above, the present invention aims to further multiply the product by the magnification $M\gamma$ of a prism to obtain a correct magnification of a lens.

The magnification $M\gamma$ by a prism is called a "prism factor" in contrast with Mp and Ms, and when suffix v is added for the vertical direction, and suffix h is added for the horizontal direction to express the magnification SM of an image, the above-described equations (1v') and (1h') are rewritten as follows:

$$SMv = Mpv \times Msv \times M\gamma v \qquad (1v'')$$

$$SMh = Mph \times Msh \times M\gamma h \qquad (1h'').$$

It should be noted that these $M\gamma v$ and $M\gamma h$ can be obtained in the process of the above-described accurate ray tracing calculations. This can solve the problem of the influence by the prism action in the magnification calculations of a spectacle.

In a typical convex surface progressive-power lens, the distance portion is lower than the near portion in surface refractive power of a "progressive surface" being the object side surface. In contrast to this, in the progressive-power lens of Prior art 1, the distance portion is set equal to the near portion in surface refractive power of a "progressive surface" being the object side surface, thereby changing the ratio in the shape factor between the distance and near portions and decreasing the magnification difference between the distance and near portions, so as to improve the distortion and sway of an image by the progressive-power lens. In the study in the present invention, however, it is shown that although a reduction in the surface refractive power difference between the distance and near portions of a "progressive surface" being the object side surface presents an advantage of a decrease in the magnification difference of an image between the distance and near portions in the horizontal direction, there are some problems in decreasing the surface refractive power difference in the vertical direction.

A first problem is influence by the prism factor $M\gamma v$ in the vertical direction. The prism factor $M\gamma v$ in the vertical direction is as $M\gamma v<1$ when the near portion has a negative refractive power, and $M\gamma v>1$ when the near portion has a positive refractive power as described above, and this tendency is enhanced by decreasing the surface refractive power difference in the vertical direction, whereby $M\gamma v$ deviates from $M\gamma v=1$, which is a magnification of a naked eye, in either case of the diopter in the near portion being positive or negative. Meanwhile, the prism factor $M\gamma h$ in the horizontal direction receives no such influence, and thus it is kept as $M\gamma h=1$. As a result, there arises a difference between the vertical and horizontal directions in the magnification of an image especially in a portion from the near portion to a portion lower than that, thereby causing a disadvantage that an item which should look square under proper condition looks longer than wider in a plus diopter and wider than longer in a minus diopter.

A second problem is one occurring only when the near portion has a positive refractive power especially in the vertical direction. Specifically, when the surface refractive power difference in the vertical direction is decreased, the angle between the sight line and the lens surface in the near vision is further increased, whereby the power factor Mpv in the vertical direction is increased and acts doubly with the increase in the prism factor $M\gamma v$ in the vertical direction, which is the first problem, to increase the magnification SMv in the vertical direction, resulting in a disadvantage that the magnification difference of an image between the distance and near portions increases.

In short, it is shown that the reduction in the surface refractive power difference between the distance and near portions of a progressive surface being the object side surface is an advantage in the horizontal direction but is conversely deterioration in the vertical direction. Therefore, in a conventional-type convex surface progressive-power lens, the above-described problems can be solved by dividing the progressive surface being the object side surface into the vertical direction and the horizontal direction, and decreasing the surface refractive power difference between the distance and near portions only in the horizontal direction.

These things completely apply to the fact that "the visual field is widened" which is generally regarded as a merit of rear surface progression (or concave surface progression) as described below.

It is generally known that an excellent visual field in the horizontal direction has its limits since there is astigmatism in the peripheral portion of the "progressive surface," but if the "progressive surface" is placed on the eyeball side surface, the "progressive surface" itself approaches the eye to present an advantage that the excellent visual filed is widened in the horizontal direction. On the other hand, this results in a further distance between the distance and near visual regions in the vertical direction to present a disadvantage that a labor increases in rotating the eye from the far vision to the near vision. In other words, the rear surface progression (or concave surface progression), as compared to the conventional front surface progression (or convex surface progression), presents an advantage of widening the visual field in the horizontal direction but a disadvantage of increasing the rotating angle of the eye from the far vision to the near vision in the vertical direction.

The present invention, however, includes the progressive refracting surface which satisfies the relational equations DHf+DHn<DVf+DVn and DHn<DVn, or DVn−DVf>ADD/2 and DHn−DHf<ADD/2 as described above, and thus the present invention has characteristics created by the rear surface progression (or concave surface progression) greater than those by the conventional front surface progression (or convex surface progression) in the horizontal direction, and characteristics created by the conventional front surface progression (or convex surface progression) greater than those by the rear surface progression (or concave surface progression) in the vertical direction. Therefore, according to the present invention, it is possible to restrain the disadvantage of increasing the eyeball rotating angle between the distance and near portions in the vertical direction while receiving the advantage of increasing the visual field in the horizontal direction.

Further, in an extreme example within the scope of the present invention, when DVn−DVf=ADD and DHn−DHf=0, a lens has progressions identical to the conventional front surface progression (or convex surface progression) in the vertical direction and to the rear surface progression (or concave surface progression) in the horizontal direction. Therefore, this case presents an extremely excellent result that the advantage in the horizontal direction can be obtained without the disadvantage in the vertical direction.

Further, these things also apply to decreasing the magnification difference of an image between the distance portion and the near portion and improving the distortion and sway of the image as described above, and thus they can be advantages of the present invention.

As has been described, the most important characteristic of the present invention is that a progressive action of a progressive-power lens is divided in the vertical direction and the horizontal direction of the lens, and then an optimal sharing ratio between the front and rear two surfaces is set in each direction to configure one bi-aspherical type progressive-power lens. As an extreme example, it is also within the scope of the present invention that all the progressive action in the vertical direction is provided by the object side surface, and all the progressive action in the horizontal direction is provided by the eyeball side surface. In this case, since either of the front and rear two faces does not function as a normal progressive surface only by one surface, the addition diopter as a progressive surface cannot be specified. This results in a progressive-power lens having the front and rear surfaces both of which are not progressive surfaces. Contrarily, although the above-described various prior arts are different in sharing ratio, in any of them the "value" of a required addition diopter is allotted to front and rear two surfaces, and after an actual progressive surface to which each allotted addition diopter is given is imagined, a combined surface with a cylindrical surface is configured as required. Consequently, the point of the preset invention definitely different from the prior arts exists in the configuration of a bi-aspherical type progressive-power lens using, on both surfaces, aspherical surfaces having progressive actions different depending on direction.

BRIEF DESCRIPTION OF THE DRAWINGS

FIG. 3-1 is an explanatory view on a magnification Mγ of a prism, being an explanatory view on a difference between a plus lens and a minus lens and on a difference in magnification in viewing mainly using a near portion which is a lower portion of a lens;

FIG. 3-2 is an explanatory view on a magnification Mγ of a prism, being an explanatory view on a difference between a plus lens and a minus lens and on a difference in magnification in viewing mainly using a near portion which is a lower portion of a lens;

FIG. 3-3 is an explanatory view on a magnification Mγ of a prism, being an explanatory view on a difference between a plus lens and a minus lens and on a difference in magnification in viewing mainly using a near portion which is a lower portion of a lens;

FIG. 4-1 is an explanatory view on a magnification Mγ of a prism, being an explanatory view on a difference between a plus lens and a minus lens and on a difference in magnifications in viewing mainly using a near portion which is a lower portion of a lens;

FIG. 4-2 is an explanatory view on a magnification Mγ of a prism, being an explanatory view on a difference between a plus lens and a minus lens and on a difference in magnifications in viewing mainly using a near portion which is a lower portion of a lens;

FIG. 4-3 is an explanatory view on a magnification Mγ of a prism, being an explanatory view on a difference between a plus lens and a minus lens and on a difference in magnifications in viewing mainly using a near portion which is a lower portion of a lens;

FIG. 5-1 is an explanatory view of an optical layout of a progressive-power lens, being a front view of the progressive power lens when viewed from an object side surface;

FIG. 5-2 is an explanatory view of the optical layout of the progressive-power lens, being a side view illustrating a cross section in the vertical direction;

FIG. 5-3 is an explanatory view of the optical layout of the progressive-power lens, being an elevational view illustrating a cross section in the transverse direction;

FIG. 7 is a view collectively showing in Table 1-1 and Table 1-2 "surface refractive powers" and "results of accurate magnification calculations in a direction of a specific sight line" of Examples 1, 4, 5, and 6 and Prior arts A, B, and C corresponding to the diopters of Examples 1, 4, 5, and 6;

FIG. 8 is a view collectively showing in Table 2-1 and Table 2-2 "surface refractive powers" and "results of accurate magnification calculations in a direction of a specific sight line" of Examples 2 and 7 and Prior arts A, B, and C corresponding to the diopters of Examples 2 and 7;

FIG. 9 is a view collectively showing in Table 3-1 and Table 3-2 "surface refractive powers" and "results of accurate magnification calculations in a direction of a specific sight line" of Example 3 and Prior arts A, B, and C corresponding to the diopters of the example 3;

FIG. 11 is a view showing Graphs 3-1 and 3-2 representing the surface refractive power distributions of Example 3;

DETAILED DESCRIPTION OF EMBODIMENTS

Figure 1:
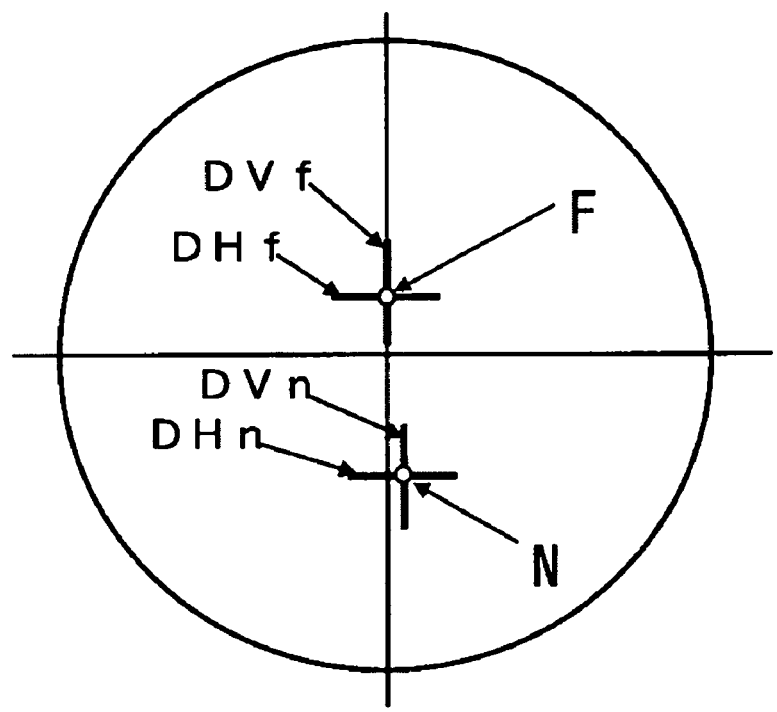
FIG. 1 is an explanatory view of various surface refractive powers at positions on a spectacle lens.
Figure 2:
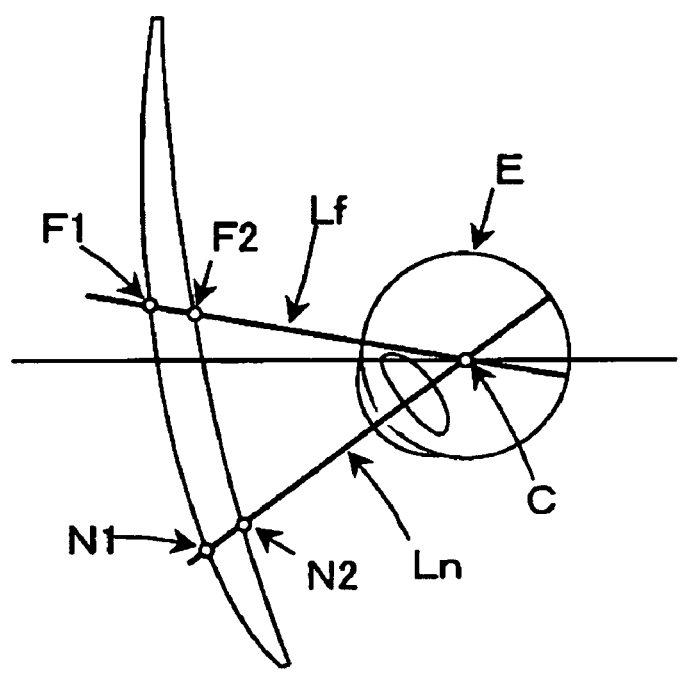
FIG. 2 is an explanatory view of a positional relation among an eyeball, sight lines, and a lens surface.
Figures 1, 3:
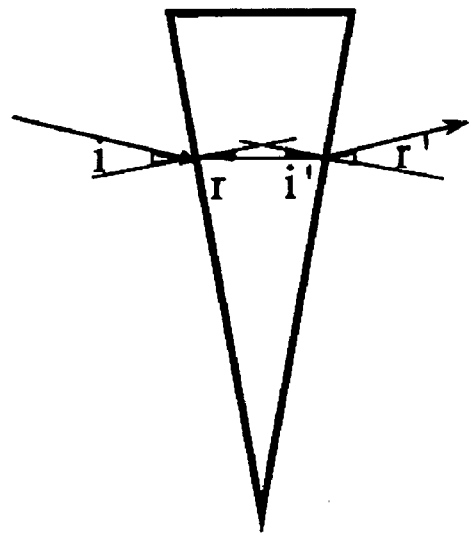
Figures 2, 3:
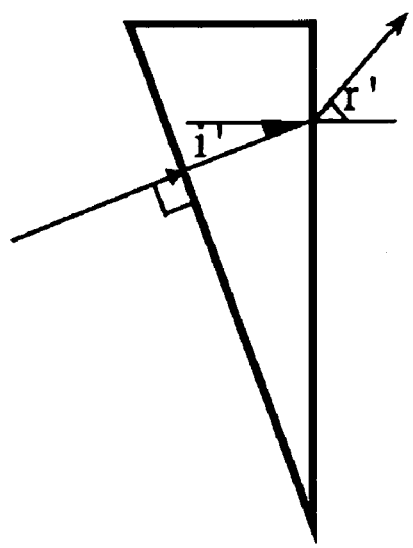
Figure 3:
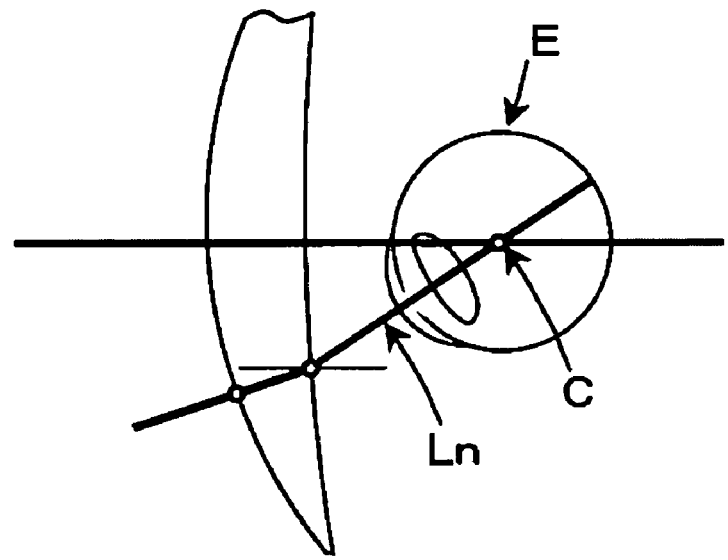
Figures 1, 4:
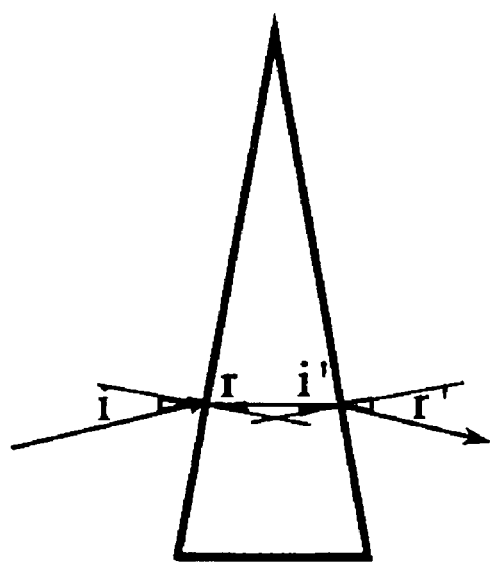
Figures 2, 4:
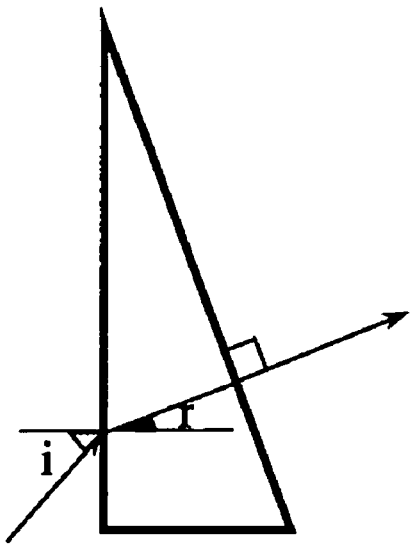
Figures 3, 4:
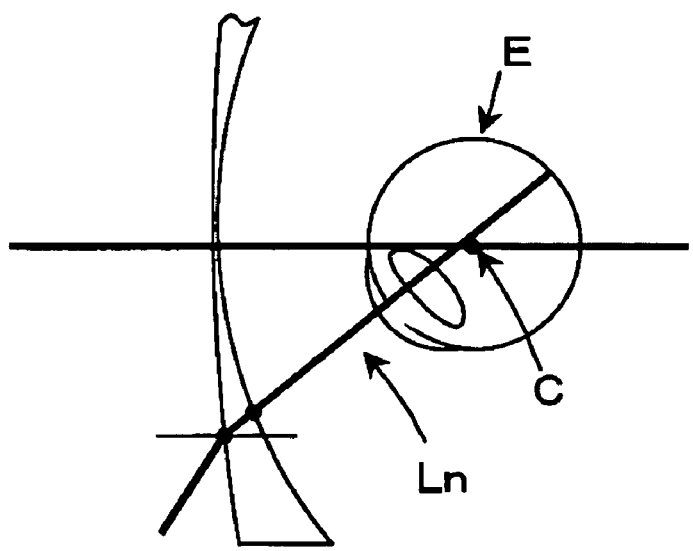
Figures 1, 5:
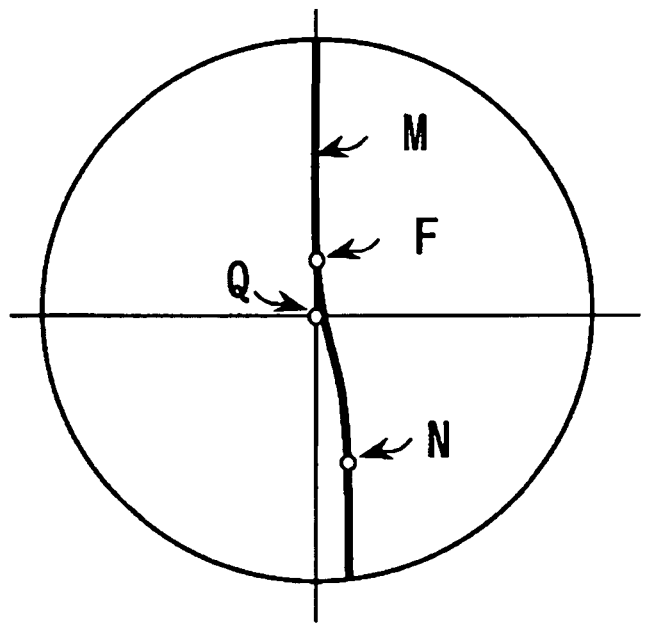
Figures 2, 5:
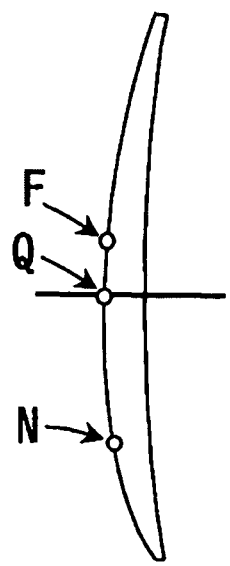
Figures 3, 5:
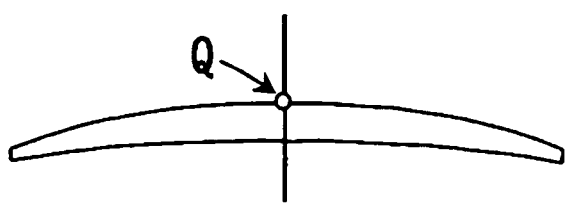

Hereinafter, a bi-aspherical type progressive-power lens according to an embodiment of the present invention of the application will be described. In the following description, a designing method used for obtaining the bi-aspherical type progressive-power lens according to the embodiment will be described first, and then the bi-aspherical type progressive-power lens according to the embodiment will be described.

(Procedures of Lens Design)

The outline of procedures of an optical designing method of the bi-aspherical type progressive-power lens according to the embodiment is as follows:

① Setting of input information,

② Double surface design as a convex progressive-power lens,

③ Conversion into a convex surface shape of the present invention and accompanying rear surface correction, and ④ Rear surface correction accompanying a transmission design, a Listing's law-compliant design, and so on.

Hereinafter, the individual procedure will be made into further divided steps for detailed description.

① Setting of Input Information

The input information is roughly divided into the following two kinds (information other than optical design is omitted).

①-1: Item Specific Information

Data specific to a lens item. A refractive index of a raw material Ne, a minimum center thickness CTmin, a minimum edge thickness ETmin, progressive surface design parameters, and so on.

①-2: Wearer Specific Information

A far vision diopter (a spherical surface diopter S, a cylindrical diopter C, a cylindrical axis AX, a prism diopter P, a prism base direction PAX, and so on), an addition diopter ADD, frame shape data (preferably, three-dimensional shape data), frame wearing data (a forward tilt angle, a horizontal tilt angle, and so on), an inter-vertex distance, lay-out data (a far vision PD, a near vision CD, an eye point position, and so on), and other data on an eyeball. It should be noted that progressive surface design parameters such as a progressive zone length specified by a wearer, a measuring method of an addition diopter, an amount of inner shift of the near portion are classified into the wearer specific information.

② Double Surface Design as a Convex Progressive-Power Lens

A lens is first designed, divided into a convex surface and a concave surface, as a conventional type convex progressive-power lens.

②-1: Convex Surface Shape (Convex Progressive Surface) Design

To realize the addition diopter ADD and the progressive zone length provided as input information, a conventional type convex progressive surface shape is designed in accordance with the progressive surface design parameters being the input information. Various conventional known technologies can be used in the design in this step, and thus the design technology of the present invention is unnecessary.

A specific example of this method is, for example, a method of setting first a "main meridian" corresponding to a spine when forming a lens surface. It is preferable that the "main meridian" is finally a "main gazing line" corresponding to an intersecting line of a sight line and a lens surface when a spectacle wearer looks with both eyes from a front upper portion (far) to a lower portion (near). However, the inner shift of the near region in response to the convergence action of the eye in the near vision is not necessarily dealt with through inner shift of the "main gazing line" as will be described later. Therefore, the "main gazing line" here is defined as one meridian (main meridian) in the vertical direction which passes through the lens center and divides the lens surface into a right part and a left part. A lens has front and rear two surfaces, and thus there are two "main meridians" on the front and rear surfaces. The "main meridian" looks straight when viewed perpendicularly to the lens surface, but it generally becomes a curved line in a three-dimensional space when the lens surface is a curved surface.

Then, based on the information such as a predetermined addition diopter and progressive zone length, an appropriate refractive power distribution along the "main meridian" is set. Although the refractive power distribution can be set dividedly to the front and rear two surfaces, with the influence by the thickness of the lens and an angle between a sight line and a refractive surface taken into consideration, all the progressive action should be provided on a first refractive surface being an object side surface since the conventional type convex progressive surface shape is designed in this step. Therefore, for example, assuming that when a surface refractive power of a front surface (a first refractive surface being an object side surface) of a lens is D1, and a surface refractive power of a rear surface (a second refractive surface being an eyeball side surface) of the lens is D2, a resulting transmission refractive power is D, generally the transmission refractive power D can be approximately obtained as D≈D1−D2. The combination of D1 and D2, however, preferably has a meniscus shape in which the object side surface is convex and the eyeball side surface is concave. Note that D2 has a positive value here. Although the rear surface of the lens is generally a concave surface and thus has a surface refractive power of a negative value, D2 should be given a positive value in this specification for simplification of description to calculate the transmission refractive power D by subtracting D2 from D1.

A relational equation between the surface refractive power and the surface shape is generally defined by the following equation, $$Dn=(N-1)/R$$

where Dn: a surface refractive power of an n-th surface (unit: diopter), N: a refractive index of a lens material, R: a radius of curvature (unit: m). Therefore, a method of converting the distribution of the surface refractive power into a distribution of curvature uses the equation, $$1/R=Dn/(N-1),$$

created by transforming the above relational equation. By obtaining the distribution of curvature, the geometrical shape of the "main meridian" is uniquely determined, which means that the "main meridian" corresponding to the spine in forming a lens surface is set.

What is required next is a "sectional curved line group in the horizontal direction" corresponding to costae in forming the lens surface. Though intersecting angles of the "sectional curved line group in the horizontal direction" and the "main meridian" are not necessarily right angles, each "sectional curved line in the horizontal direction" should intersect at right angles with the "main meridian" to simplify the description. Further, "surface refractive powers in the horizontal direction" of the "sectional curved line group in the horizontal direction" at intersections with the "main meridian" do not always need to be identical to "surface refractive powers in the vertical direction" along the "main meridian", and the present invention is made based on the difference in the surface refractive power between the vertical direction and the horizontal direction as actually described in claims. In the design in this step, however, since the conventional type convex progressive surface shape is designed, the surface refractive powers in the vertical direction and the horizontal direction at the intersections should be identical with each other.

By the way, all the "sectional curved lines in the horizontal direction" can be simple circular curved lines having surface refractive powers at the intersections, and can also be made with applications by various prior arts incorporated thereto. One of conventional technologies on surface refractive power distribution along the "sectional curved line in the horizontal direction" is, for example, a technology in Japanese Patent Publication No. Sho 49-3595. This technology is characterized in that one "sectional curved lines in the horizontal direction" in an almost circular shape is set near the center of a lens, and sectional curved lines positioned at an upper portion is made to have a distribution of surface refractive power increasing from the center to the side, and sectional curved lines positioned at a lower portion is made to have a distribution of surface refractive power decreasing from the center to the side. As described above, the "main meridian" and the "sectional curved line group in the horizontal direction" composed of an uncountable number of lines positioned side by side thereon, form a lens surface as the spine and costae, thus determining a refractive surface.

②-2: Concave Surface Shape (Spherical or Cylindrical Surface) Design

To realize the far vision diopter provided as the input information, a concave surface shape is designed. The surface becomes a cylindrical surface if the far vision diopter includes a cylindrical diopter, and a spherical surface if not. In this event, the center thickness CT suitable for the diopter and the tilt angle between surfaces, the convex surface and the concave surface, are also designed at the same time, thus determining the shape as a lens. Various conventional known technologies can also be used in the design in this step, and thus the design technology of the present invention is unnecessary.

③ Conversion into a Convex Shape of the Present Invention and Accompanying Rear Surface Correction In accordance with the far vision diopter and the addition diopter ADD provided as the input information, the conventional type convex progressive-power lens is converted into the shape as a lens of the present invention.

③-1: Convex Surface Shape (The Present Invention) Design

In accordance with the far vision diopter and the addition diopter ADD provided as the input information, the conventional type convex progressive surface is converted into the convex surface shape of the present invention. More specifically, when a surface refractive power in the horizontal direction and a surface refractive power in the vertical direction, at a far vision diopter measurement position F1, are DHf and DVf respectively, and a surface refractive power in the horizontal direction and a surface refractive power in the vertical direction, at a near vision diopter measurement position N1, are DHn and DVn respectively, the above-described conventional convex progressive lens surface (the first refractive surface being the object side surface) is converted into a refracting surface which satisfies the relational equations, $DHf+DHn<DVf+DVn$, and $DHn<DVn$, or the relational equations, $DVn-DVf>ADD/2$, and $DHn-DHf<ADD/2$.

In this event, the shape is preferably converted into the convex surface shape of the present invention without changing the average surface refractive power of the whole convex surface. It is conceivable, for example, to keep the total average value of the surface refractive powers in the vertical and horizontal directions in the distance portion and the near portion. The value, however, desirably falls within a range keeping a meniscus shape in which the object side surface is convex and the eyeball side surface is concave.

③-2: Concave Surface Shape (The Present Invention) Design

The amount of transformation in converting from the conventional type convex progressive surface into the convex surface shape of the present invention in the above-described ③-1, is added to the concave surface shape designed in ②-2. In other words, the amount of transformation, identical to that of the front surface (the first refractive surface being the object side surface) of the lens added in the process ③-1, is added to the rear surface (the second refractive surface being the eyeball side surface) of the lens. Note that this transformation is not uniform over the whole surface though it is similar to "bending" in which the lens itself is bent, but makes a surface which satisfies the relational equations described in ③-1. It should be noted that the rear surface corrections are within the scope of the present invention, but are merely corrections of linear approximation, and it is preferable to add rear surface correction in ④.

④ Rear Surface Correction Accompanying Transmission Design, a Listing's Law-compliant Design, Design for an Inner Shift-compliant Design of a Near Portion, and So On To realize the optical function provided as the input information, in a situation in which a wearer actually wears a lens, it is desirable to further add rear surface correction to the lens of the present invention obtained in ③.

④-1: Concave Surface Shape (The Present Invention) Design for Transmission Design The transmission design means a designing method for obtaining an essential optical function in the situation in which a wearer actually wears a lens, a designing method of adding a "correction action" for eliminating or reducing occurrence of astigmatism and change in diopter primarily caused by impossibility of a sight line intersecting at right angles with a lens surface.

Specifically, as described above, the difference of optical performance of the lens with respect to a target essential optical performance is grasped through accurate ray tracing calculation in accordance with the direction of the sight line, and surface correction to cancel the difference is implemented. By repeating this, the difference can be minimized to obtain an optimal solution. Generally, it is often very difficult and actually impossible to directly calculate a lens shape having a target optical performance. This is because a "lens shape having an arbitrarily set optical performance" does not always actually exist. Conversely, it is relatively easy to obtain an "optical performance of an arbitrarily set lens shape." Therefore, it is possible to bring the optical performance to a target optical performance by first provisionally calculating a linearly approximated surface by an arbitrary method, finely adjusting the design parameters in accordance with evaluation results on the optical performance of the lens shape using the approximated surface to sequentially modulate the lens shape, and returning to the evaluation step for a repeat of reevaluation and readjustment. This technique is one of well-known techniques called "optimization."

④-2: Concave Surface Shape (The Present Invention) Design for a Listing's Law-compliant Design It is known that three-dimensional rotating motions of eyes when we look around are based on a rule called "Listing's law." When a prescription diopter includes a cylindrical diopter, cylindrical axes of a spectacle lens and the eye may not match to each other in peripheral vision even if the cylindrical axis of the lens is matched to the "cylindrical axis of the eye in front vision." It is also possible to add a "correction action" for eliminating or reducing occurrence of astigmatism and change in diopter caused by such a mismatch between the cylindrical axes of the lens and the eye in the peripheral vision, to a curved surface being the surface on the side having a cylindrical correction action of a lens according to the present invention.

Specifically, similarly to the method of the "optimization" used in ④-1, the difference of optical performance of the lens with respect to a target essential optical performance is grasped through accurate ray tracing calculation in accordance with the direction of the sight line, and surface correction to cancel the difference is implemented. By repeating this, the difference can be minimized to obtain an optimal solution.

④-3: Concave Surface Shape (The Present Invention) Design for an Inner Shift-compliant Design of a Near Portion Though the present invention is of a surface configuration being a bi-aspherical surface, both surfaces are not always processed after acceptance of an order to obtain an effect of the present invention. It is advantageous in terms of cost and processing speed, for example, to prepare in advance "semifinished products" of the object side surface meeting the object of the present invention, select, after acceptance of an order, from among them a "semifinished product" of the object side surface meeting the purpose such as a prescription diopter or the above-described custom-made product (individual design), and process and finish only the eyeball side surface after the acceptance of the order.

In a specific example of this method, the object side surface is prepared in advance as a bilaterally symmetrical "semifinished product" in the above-described convex surface shape (the present invention) design in ③-1, and the eyeball side surface is designed as a bilaterally asymmetrical curved surface meeting the purpose after being inputted individual information such as an inter-pupil distance, object distance in near vision, whereby the inner shift of the near portion in response to the individual information can be performed.

Figure 10:
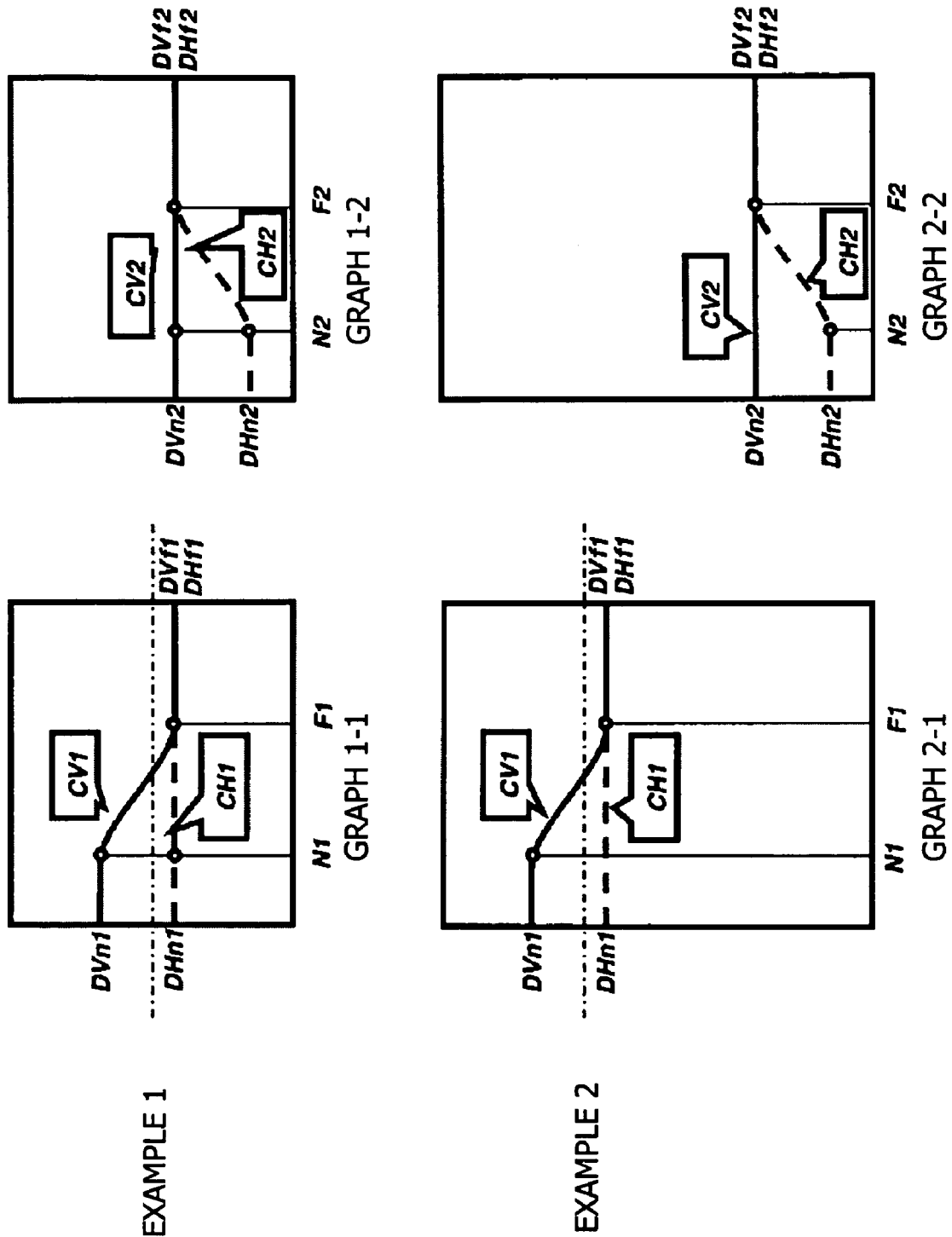
FIG. 10 is a view showing Graphs 1-1, 1-2, 2-1, and 2-2 representing the surface refractive power distributions of Example 1 and Example 2.
Figure 12:
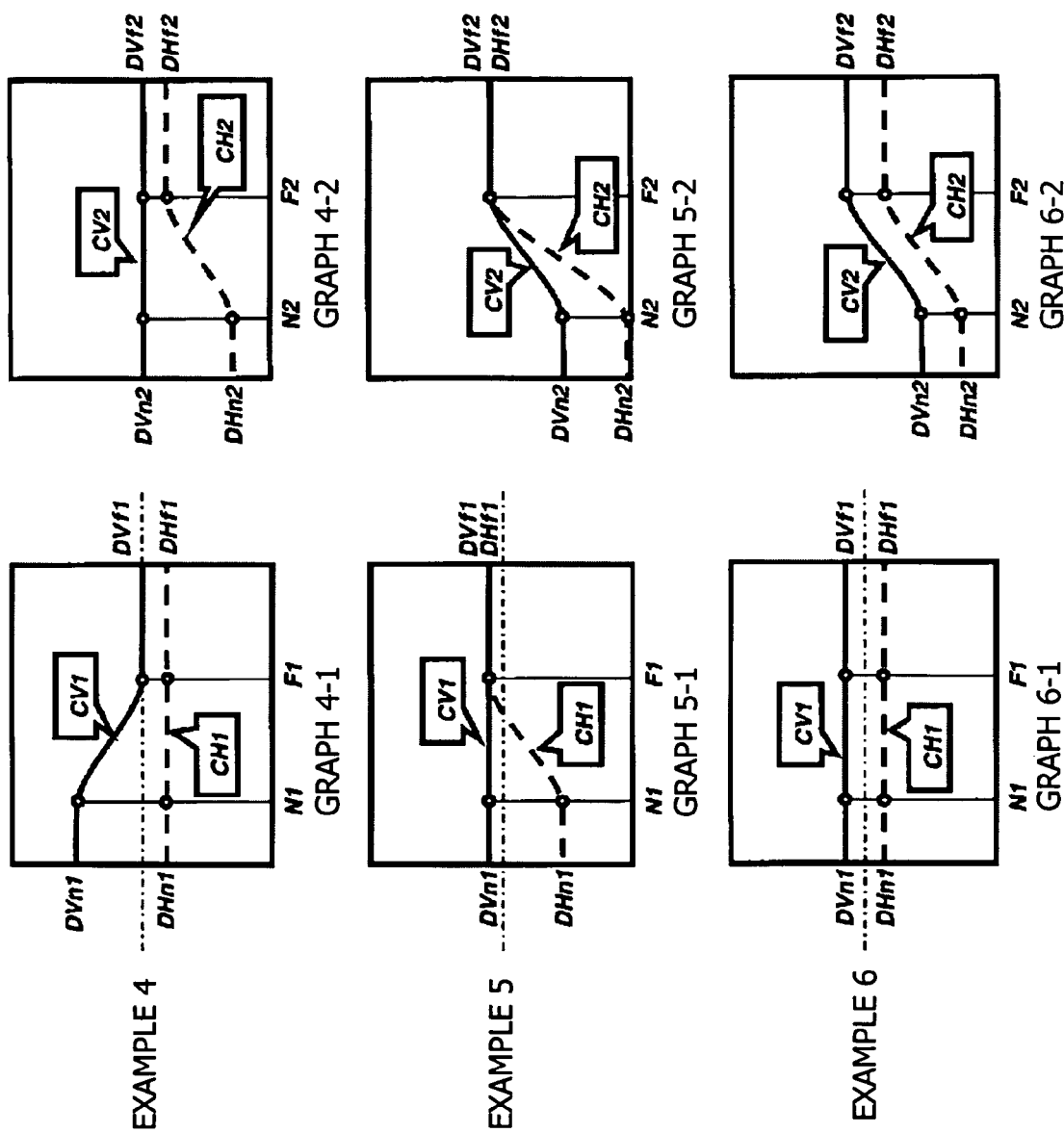
FIG. 12 is a view showing Graphs 4-1, 4-2, 5-1, 5-2, 6-1 and 6-2 representing the surface refractive power distributions of Example 4 to Example 6.
Figure 13:
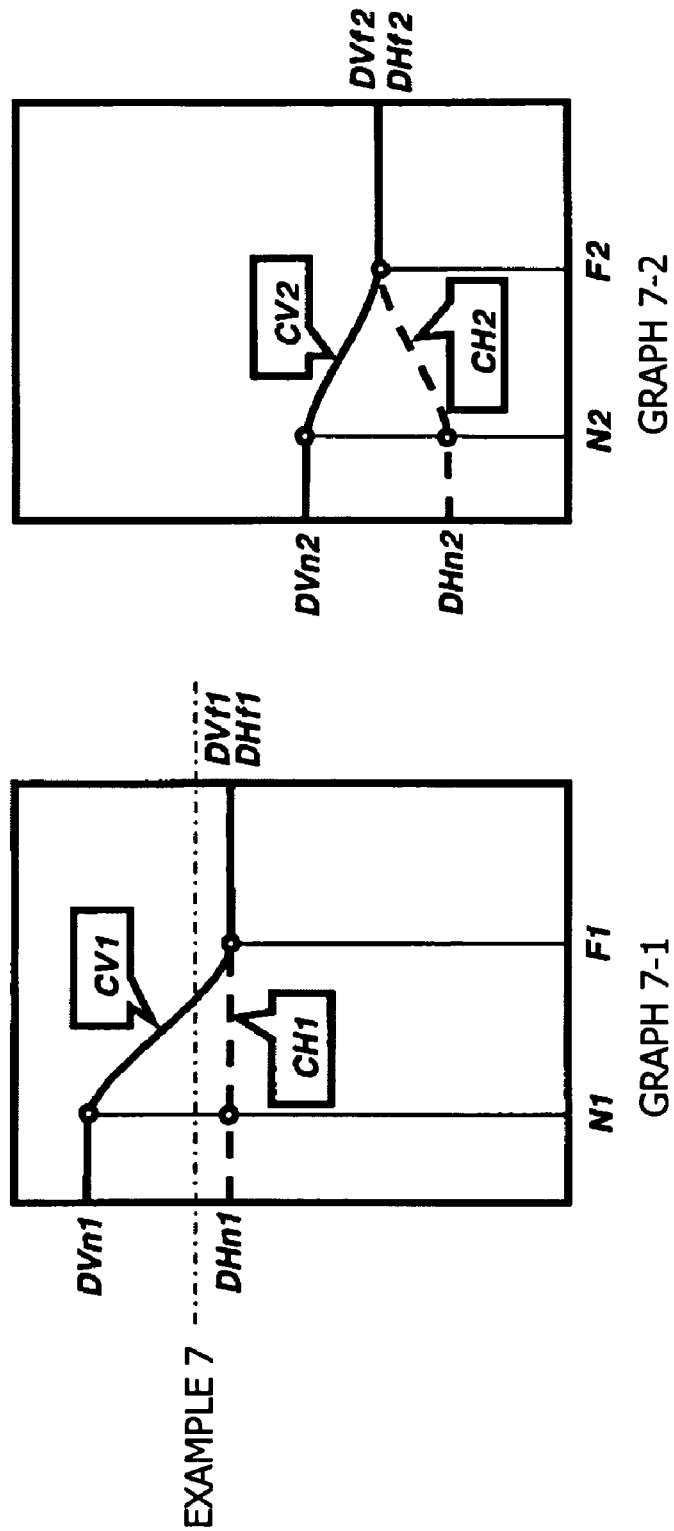
FIG. 13 is a view showing Graphs 7-1 and 7-2 representing the surface refractive power distributions of Example 7.
Figure 14:
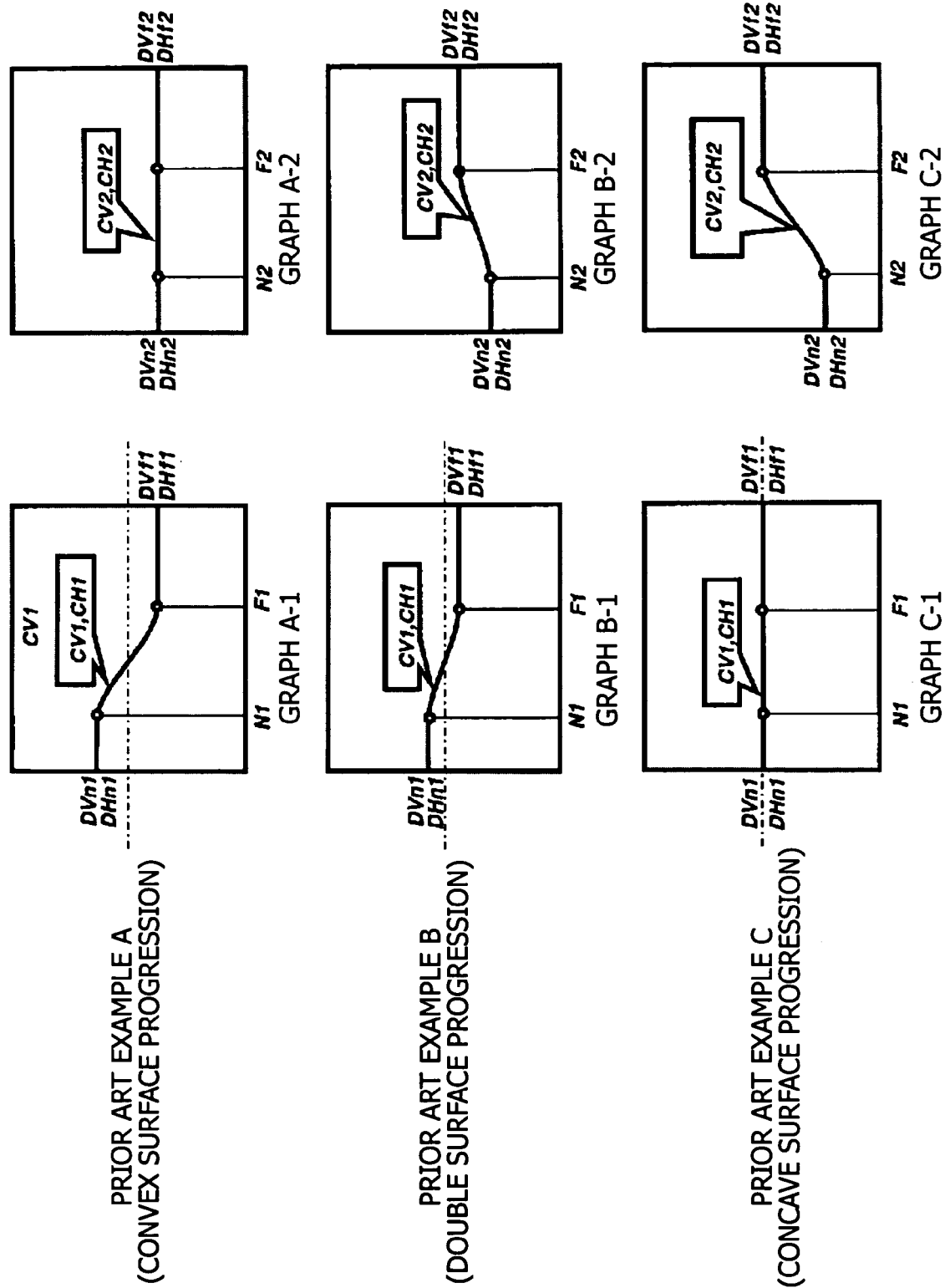
FIG. 14 is a view showing Graphs A-1, A-2, B-1, B-2, C-1 and C-2 representing the surface refractive power distributions of Prior art examples A, B, and C.

Hereinafter, examples of the bi-aspherical surface progressive refractive lens designed by the above-described designing method will be described with reference to the drawings. FIG. 7 is a view collectively showing in Table 1-1 and Table 1-2 "surface refractive powers" and "results of accurate magnification calculations in a direction of a specific sight line" of Examples 1, 4, 5, and 6 and Prior arts A, B, and C corresponding to the diopters of Examples 1, 4, 5, and 6. FIG. 8 is a view collectively showing in Table 2-1 and Table 2-2 "surface refractive powers" and "results of accurate magnification calculations in a direction of a specific sight line" of Examples 2 and 7 and Prior arts A, B, and C corresponding to the diopters of Examples 2 and 7. FIG. 9 is a view collectively showing in Table 3-1 and Table 3-2 "surface refractive powers" and "results of accurate magnification calculations in a direction of a specific sight line" of Example 3 and Prior arts A, B, and C corresponding to the diopters of the example 3. FIG. 10 is a view showing Graphs 1-1, 1-2, 2-1, and 2-2 representing the surface refractive power distributions of Example 1 and Example 2, FIG. 11 is a view showing Graphs 3-1 and 3-2 representing the surface refractive power distributions of Example 3, FIG. 12 is a view showing Graphs 4-1, 4-2, 5-1, 5-2, 6-1 and 6-2 representing the surface refractive power distributions of Example 4 to Example 6, FIG. 13 is a view showing Graphs 7-1 and 7-2 representing the surface refractive power distributions of Example 7, and FIG. 14 is a view showing Graphs A-1, A-2, B-1, B-2, C-1 and C-2 representing the surface refractive power distributions of Prior art examples A, B, and C.

Figure 15:
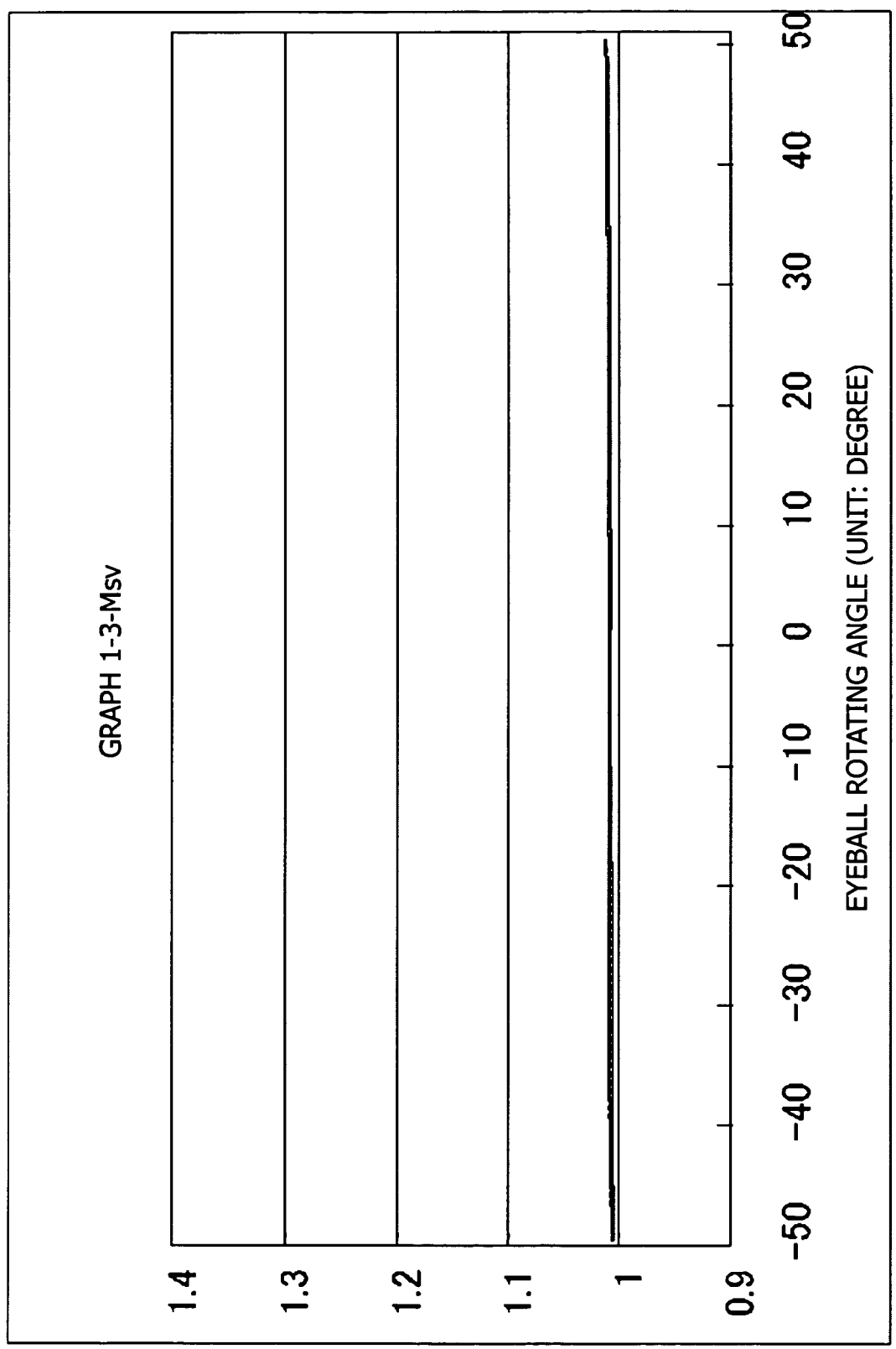
FIG. 15 is a view showing Graph 1-3-Msv representing results, obtained by performing accurate magnification calculations, of magnification distributions when lenses of Example 1 and three kinds of Prior art examples A, B, and C corresponding to the diopters of Example 1 are viewed along main gazing lines.
Figure 16:
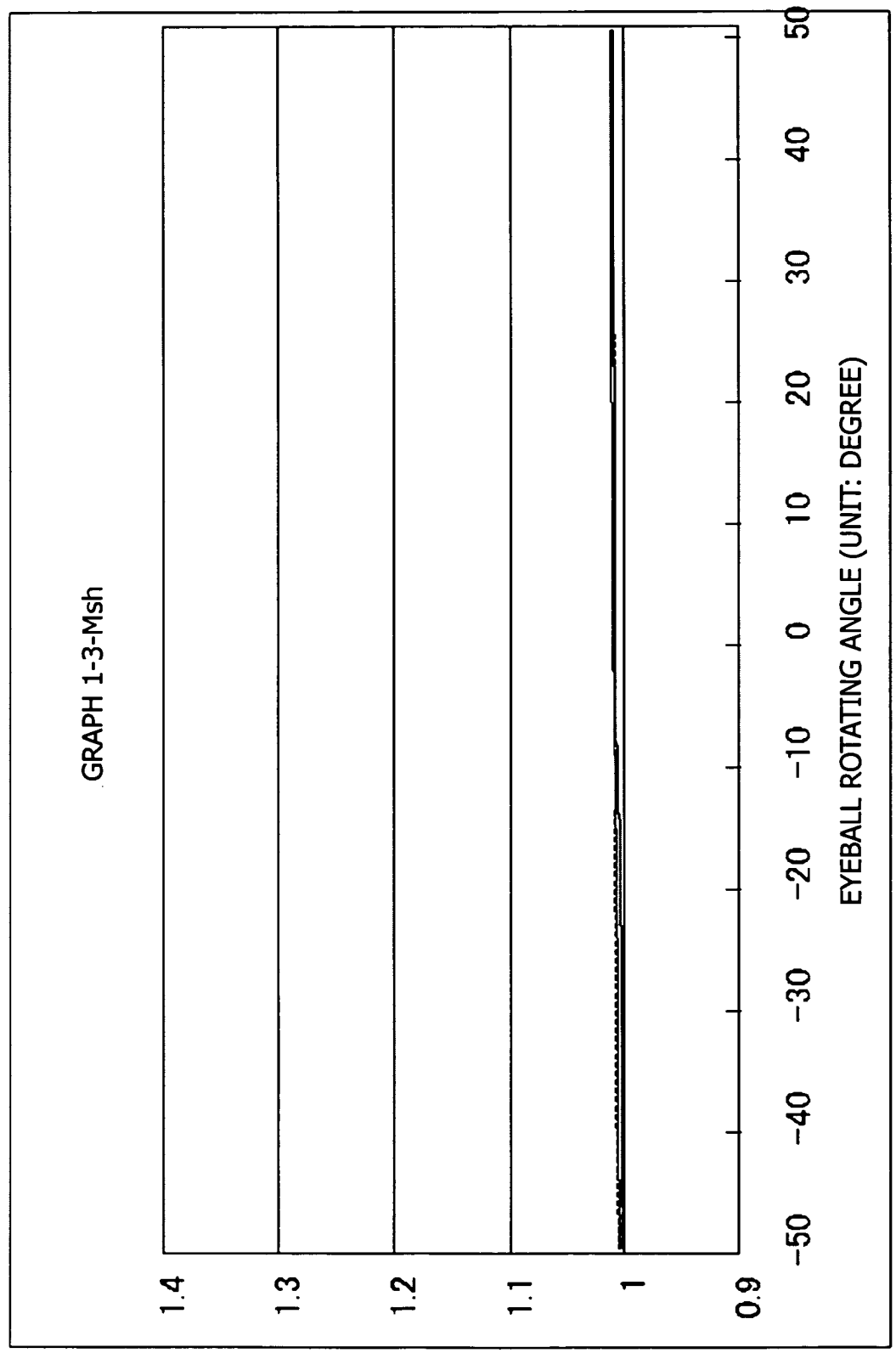
FIG. 16 is a view showing Graph 1-3-Msh representing results, obtained by performing accurate magnification calculations, of the magnification distributions when the lenses of Example 1 and the three kinds of Prior art examples A, B, and C corresponding to the diopters of Example 1 are viewed along the main gazing lines.
Figure 17:
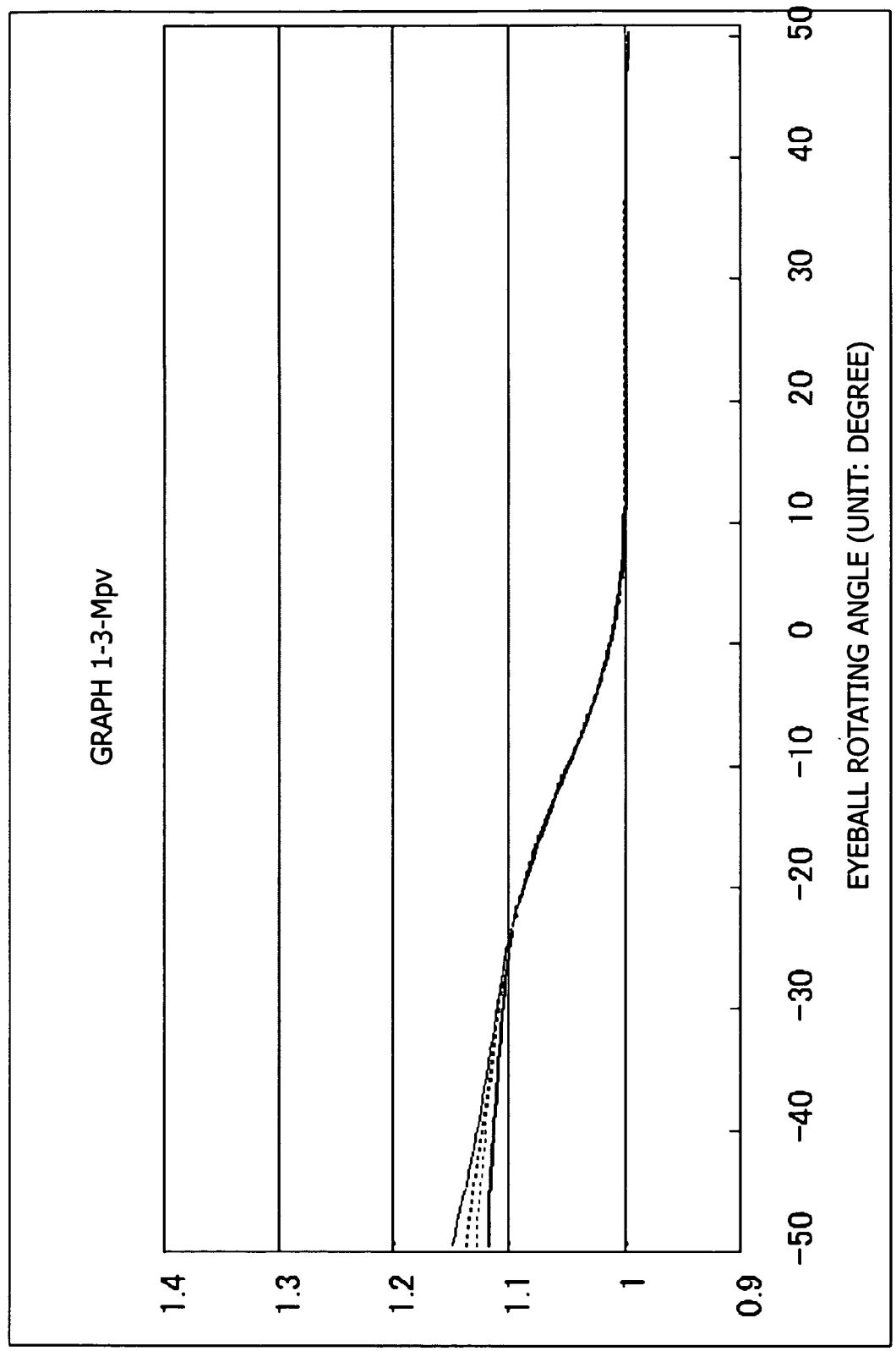
FIG. 17 is a view showing Graph 1-3-Mpv representing results, obtained by performing accurate magnification calculations, of the magnification distributions when the lenses of Example 1 and the three kinds of Prior art examples A, B, and C corresponding to the diopters of Example 1 are viewed along the main gazing lines.
Figure 18:
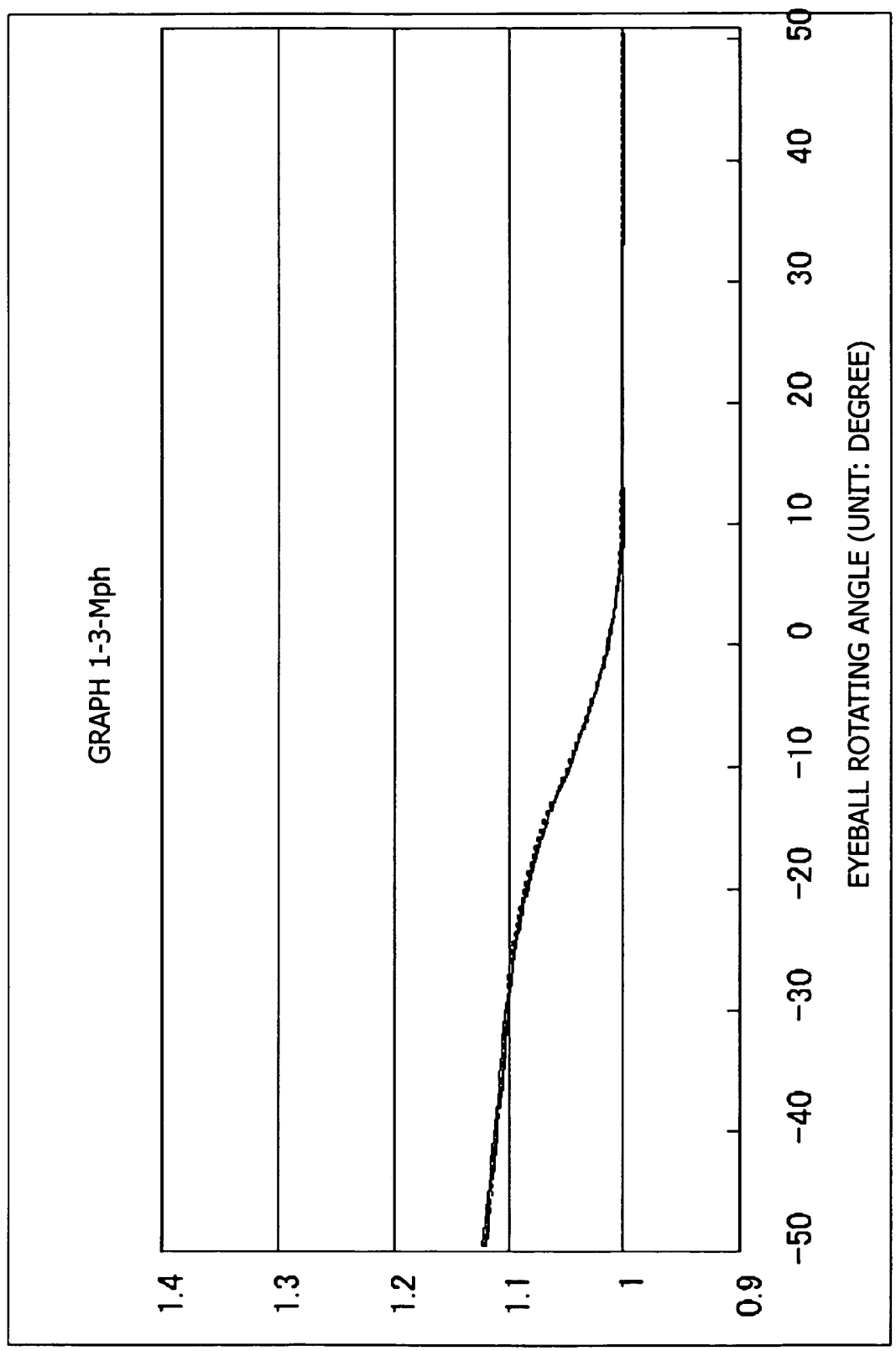
FIG. 18 is a view showing Graph 1-3-Mph representing results, obtained by performing accurate magnification calculations, of the magnification distributions when the lenses of Example 1 and the three kinds of Prior art examples A, B, and C corresponding to the diopters of Example 1 are viewed along the main gazing lines.
Figure 19:
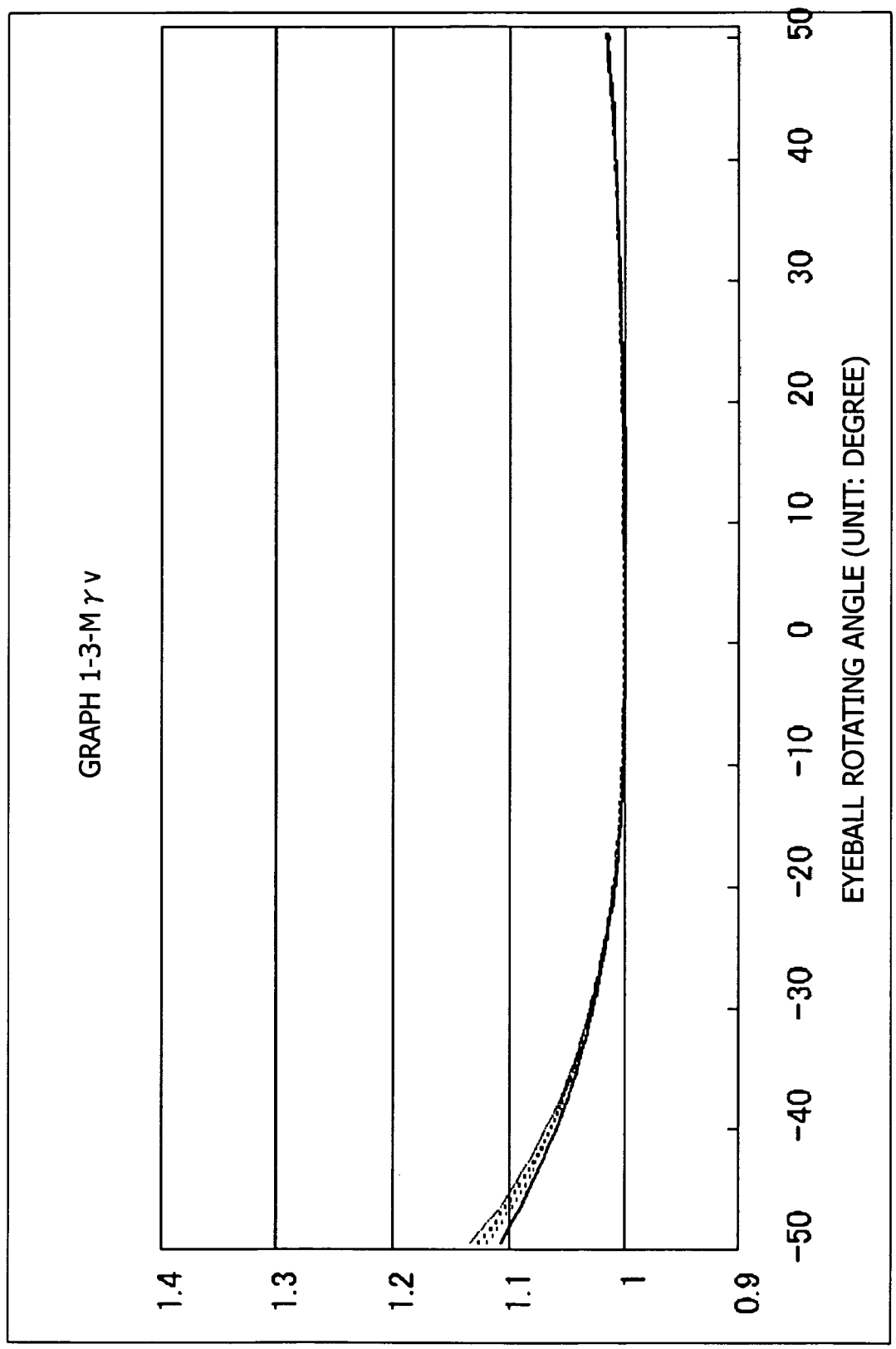
FIG. 19 is a view showing Graph 1-3-Mγv representing results, obtained by performing accurate magnification calculations, of the magnification distributions when the lenses of Example 1 and the three kinds of Prior art examples A, B, and C corresponding to the diopter of Example 1 are viewed along the main gazing lines.
Figure 20:
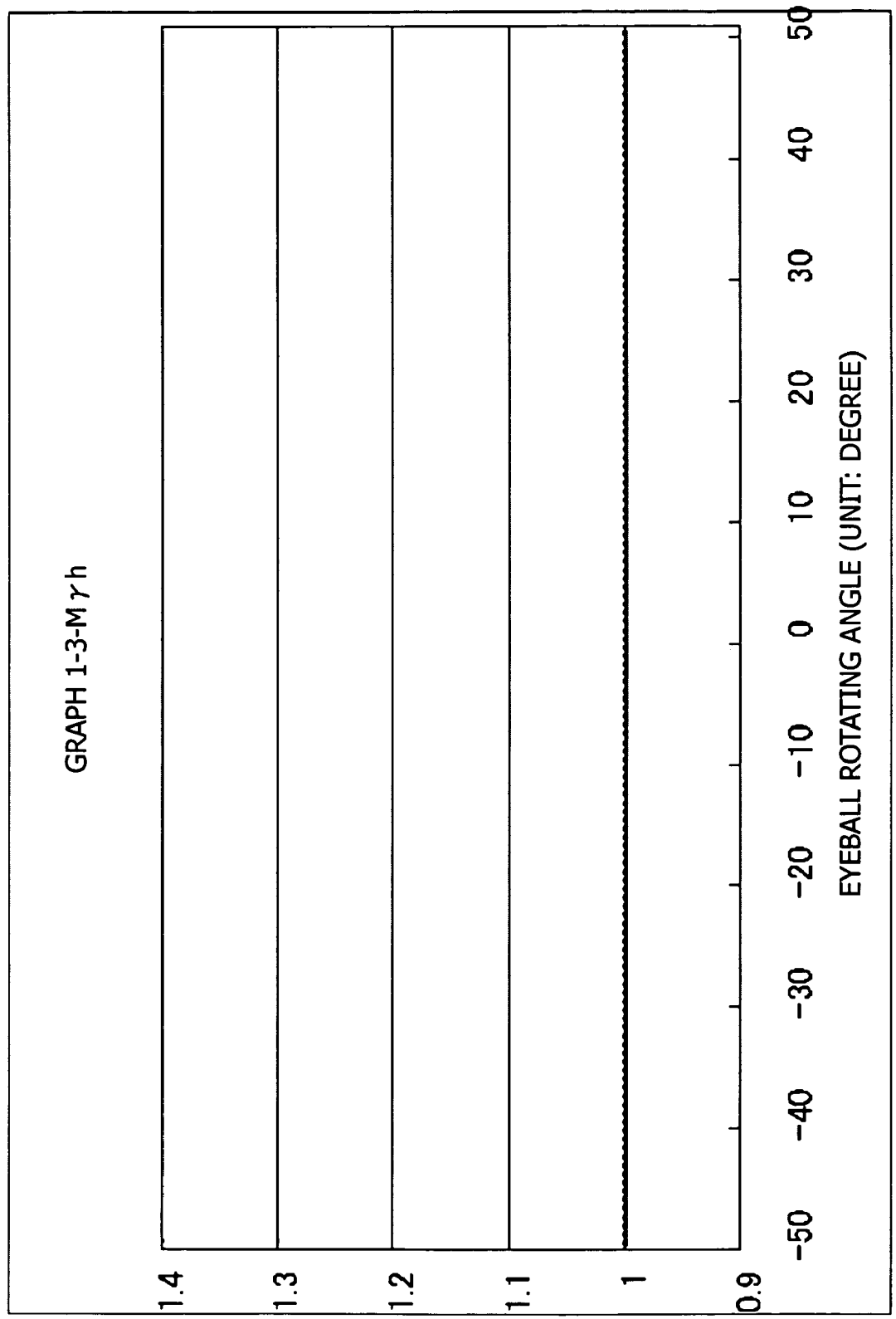
FIG. 20 is a view showing Graph 1-3-Mγh representing results, obtained by performing accurate magnification calculations, of the magnification distributions when the lenses of Example 1 and the three kinds of Prior art examples A, B, and C corresponding to the diopters of Example 1 are viewed along the main gazing lines.
Figure 21:
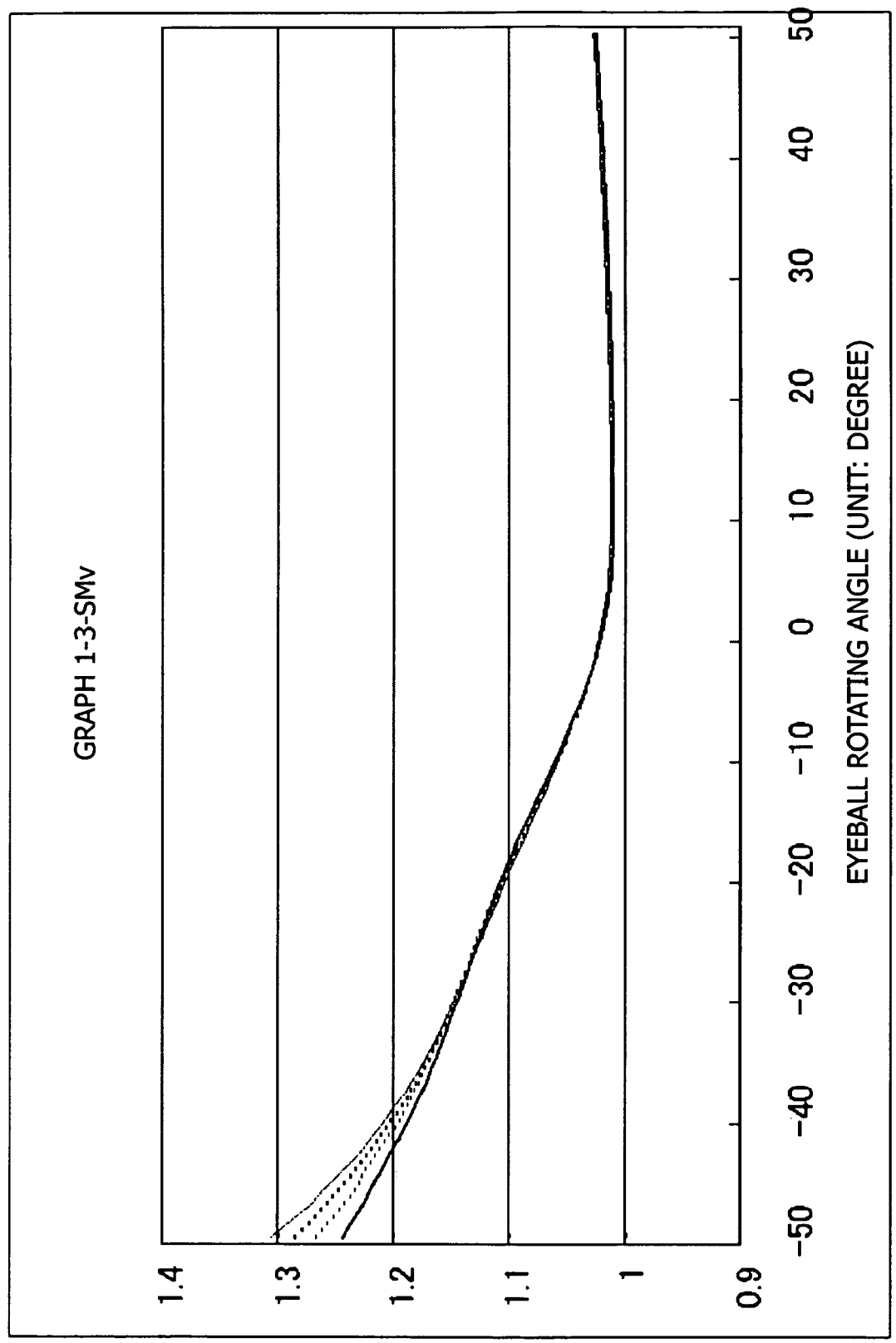
FIG. 21 is a view showing Graph 1-3-SMv representing results, obtained by performing accurate magnification calculations, of the magnification distributions when the lenses of Example 1 and the three kinds of Prior art examples A, B, and C corresponding to the diopters of Example 1 are viewed along the main gazing lines.
Figure 22:
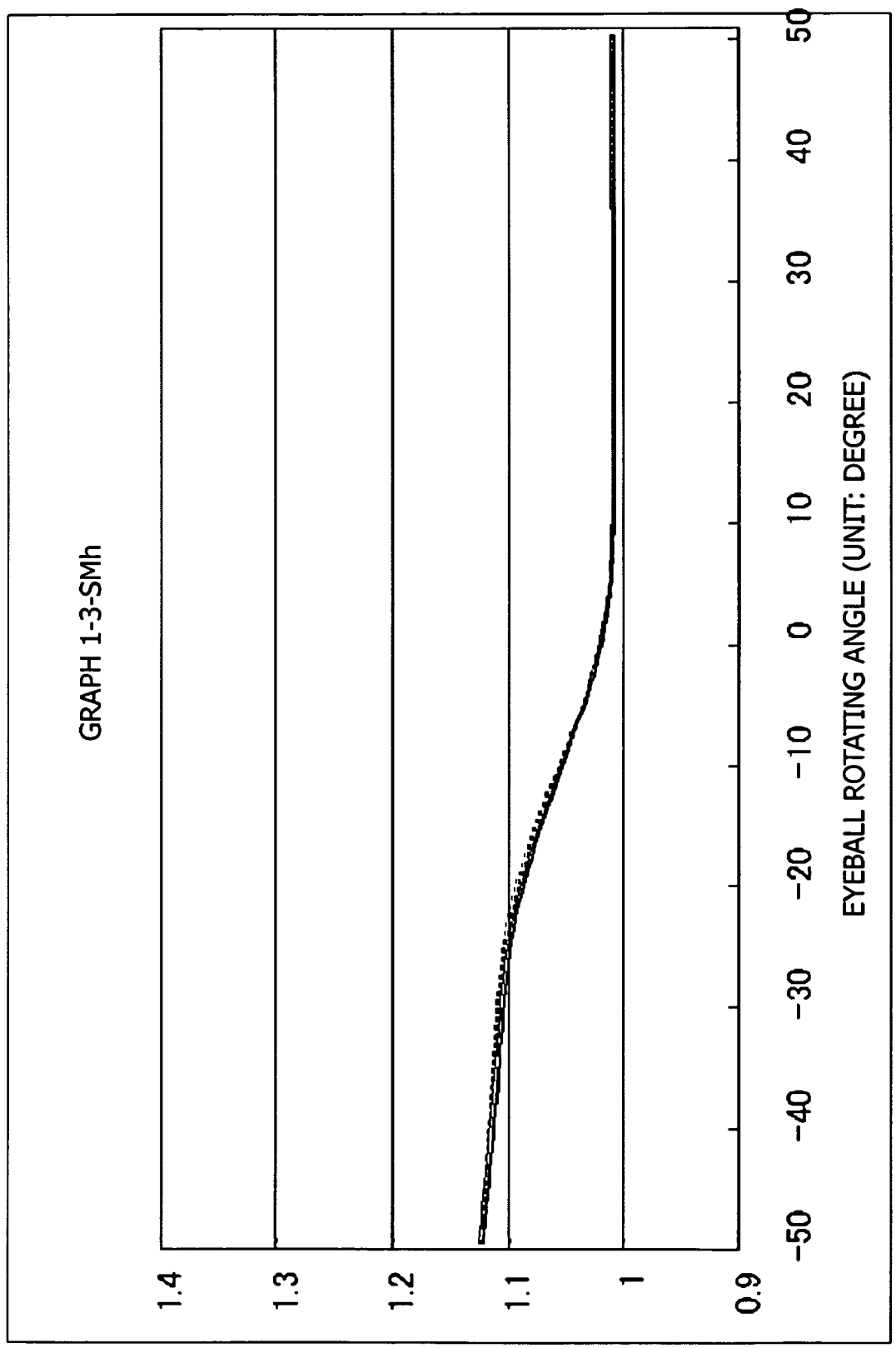
FIG. 22 is a view showing Graph 1-3-SMh representing results, obtained by performing accurate magnification calculations, of the magnification distributions when the lenses of Example 1 and the three kinds of Prior art examples A, B, and C corresponding to the diopters of Example 1 are viewed along the main gazing lines.

FIG. 15 is a view showing Graph 1-3-Msv representing the results, obtained by performing accurate magnification calculations, of magnification distributions when lenses of Example 1 and three kinds of Prior art examples A, B, and C corresponding to the diopters of Example 1 are viewed along main gazing lines, FIG. 16 is a view showing Graph 1-3-Msh representing results, obtained by performing accurate magnification calculations, of the magnification distributions when the lenses of Example 1 and the three kinds of Prior art examples A, B, and C corresponding to the diopters of Example 1 are viewed along the main gazing lines, FIG. 17 is a view showing Graph 1-3-Mpv representing results, obtained by performing accurate magnification calculations, of the magnification distributions when the lenses of Example 1 and the three kinds of Prior art examples A, B, and C corresponding to the diopters of Example 1 are viewed along the main gazing lines, FIG. 18 is a view showing Graph 1-3-Mph representing results, obtained by performing accurate magnification calculations, of the magnification distributions when the lenses of Example 1 and the three kinds of Prior art examples A, B, and C corresponding to the diopters of Example 1 are viewed along the main gazing lines, FIG. 19 is a view showing Graph 1-3-Mγv representing results, obtained by performing accurate magnification calculations, of the magnification distributions when the lenses of Example 1 and the three kinds of Prior art examples A, B, and C corresponding to the diopters of Example 1 are viewed along the main gazing lines, FIG. 20 is a view showing Graph 1-3-Mγh representing results, obtained by performing accurate magnification calculations, of the magnification distributions when the lenses of Example 1 and the three kinds of Prior art examples A, B, and C corresponding to the diopters of Example 1 are viewed along the main gazing lines, FIG. 21 is a view showing Graph 1-3-SMv representing results, obtained by performing accurate magnification calculations, of the magnification distributions when the lenses of Example 1 and the three kinds of Prior art examples A, B, and C corresponding to the diopters of Example 1 are viewed along the main gazing lines, and FIG. 22 is a view showing Graph 1-3-SMh representing results, obtained by performing accurate magnification calculations, of the magnification distributions when the lenses of Example 1 and the three kinds of Prior art examples A, B, and C corresponding to the diopters of Example 1 are viewed along the main gazing lines.

Figure 23:
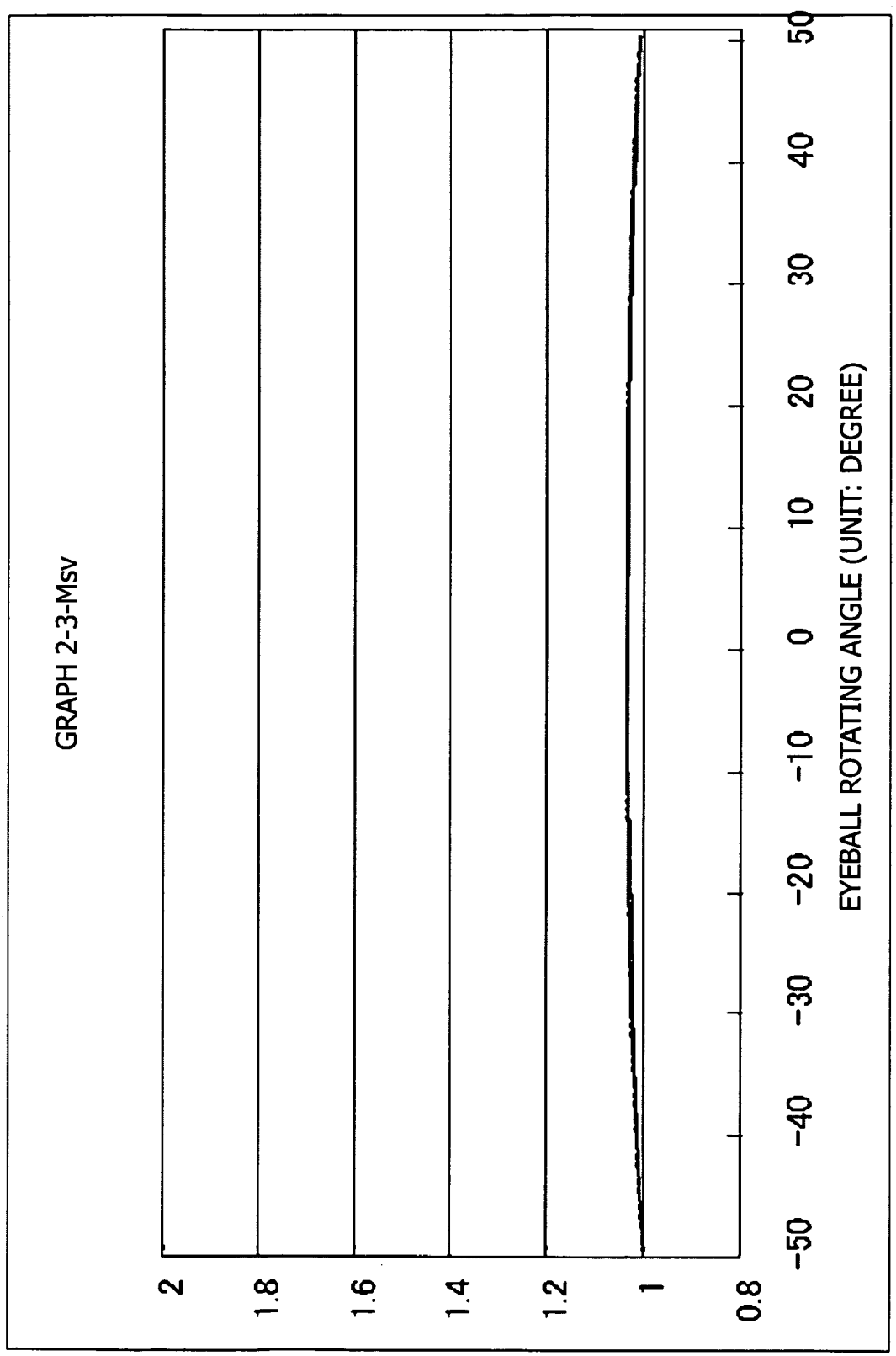
FIG. 23 is a view showing Graph 2-3-Msv representing results, obtained by performing accurate magnification calculations, of magnification distributions when lenses of Example 2 and three kinds of Prior art examples A, B, and C corresponding to the diopters of Example 2 are viewed along main gazing lines.
Figure 24:
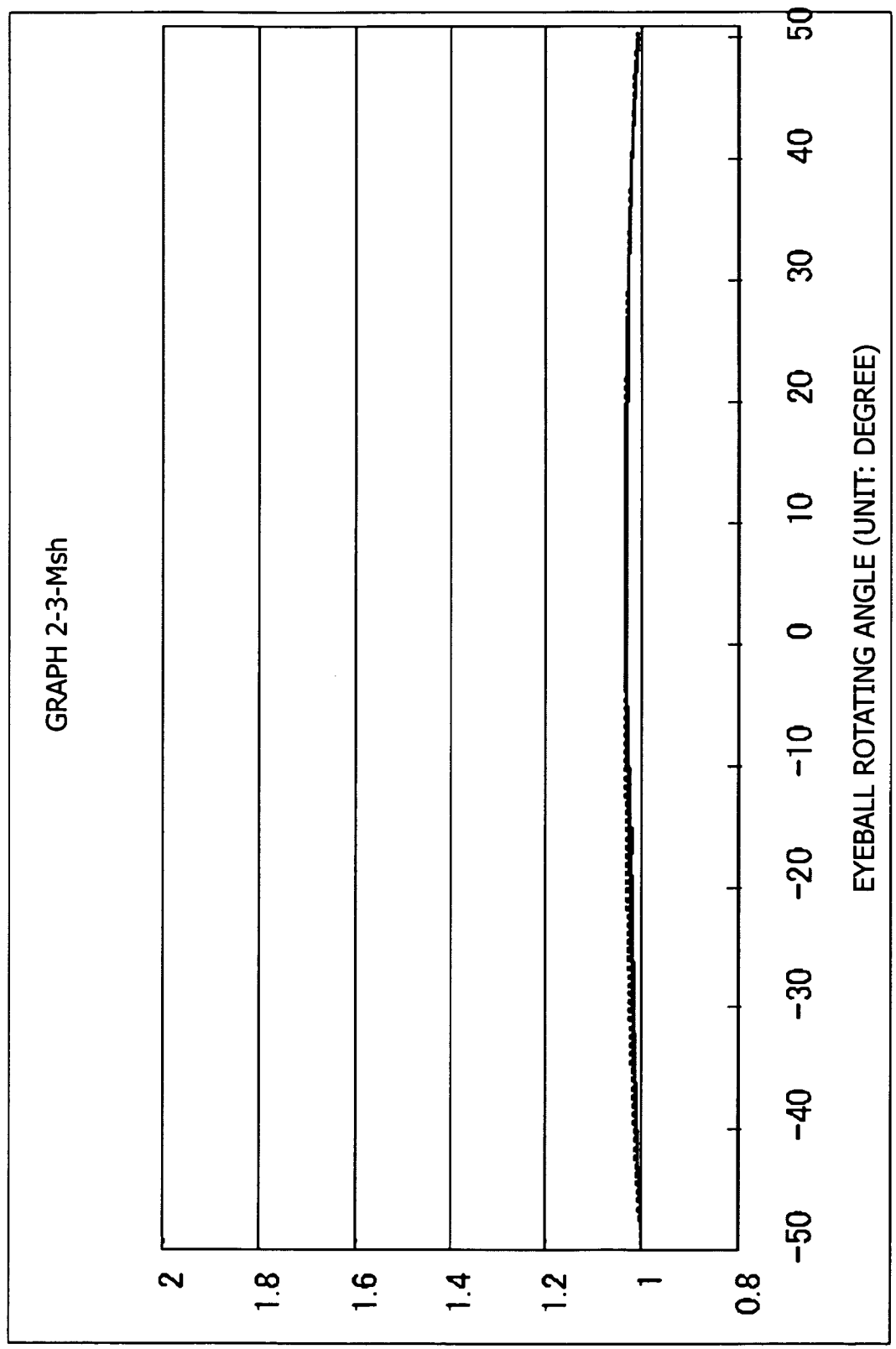
FIG. 24 is a view showing Graph 2-3-Msh representing results, obtained by performing accurate magnification calculations, of the magnification distributions when the lenses of Example 2 and the three kinds of Prior art examples A, B, and C corresponding to the diopters of Example 2 are viewed along the main gazing lines.
Figure 25:
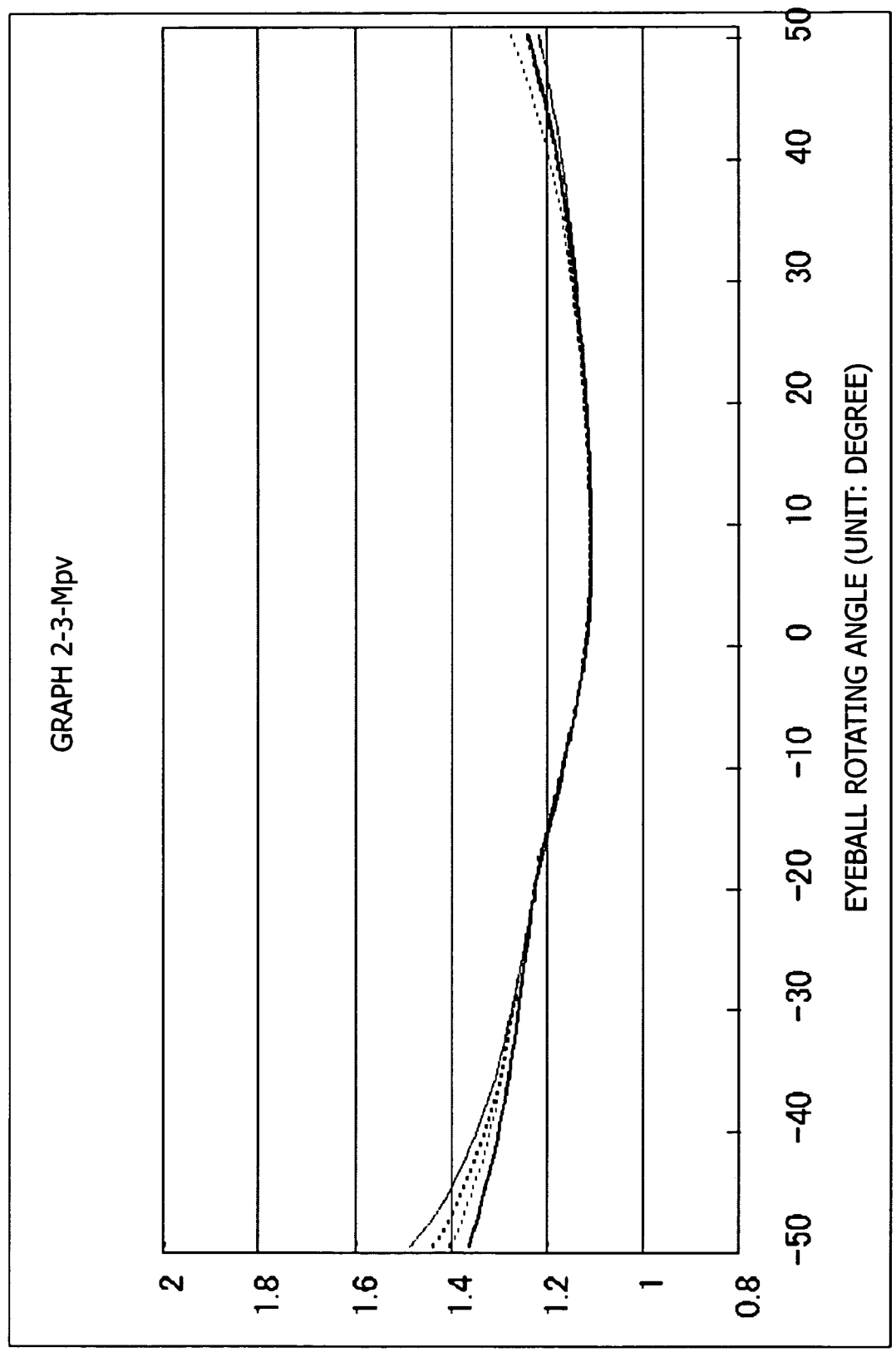
FIG. 25 is a view showing Graph 2-3-Mpv representing results, obtained by performing accurate magnification calculations, of the magnification distributions when the lenses of Example 2 and the three kinds of Prior art examples A, B, and C corresponding to the diopters of Example 2 are viewed along the main gazing lines.

FIG. 23 is a view showing Graph 2-3-Msv representing results, obtained by performing accurate magnification calculations, of magnification distributions when lenses of Example 2 and three kinds of Prior art examples A, B, and C corresponding to the diopters of Example 2 are viewed along main gazing lines, FIG. 24 is a view showing Graph 2-3-Msh representing results, obtained by performing accurate magnification calculations, of the magnification distributions when the lenses of Example 2 and the three kinds of Prior art examples A, B, and C corresponding to the diopters of Example 2 are viewed along the main gazing lines, FIG.

Figure 26:
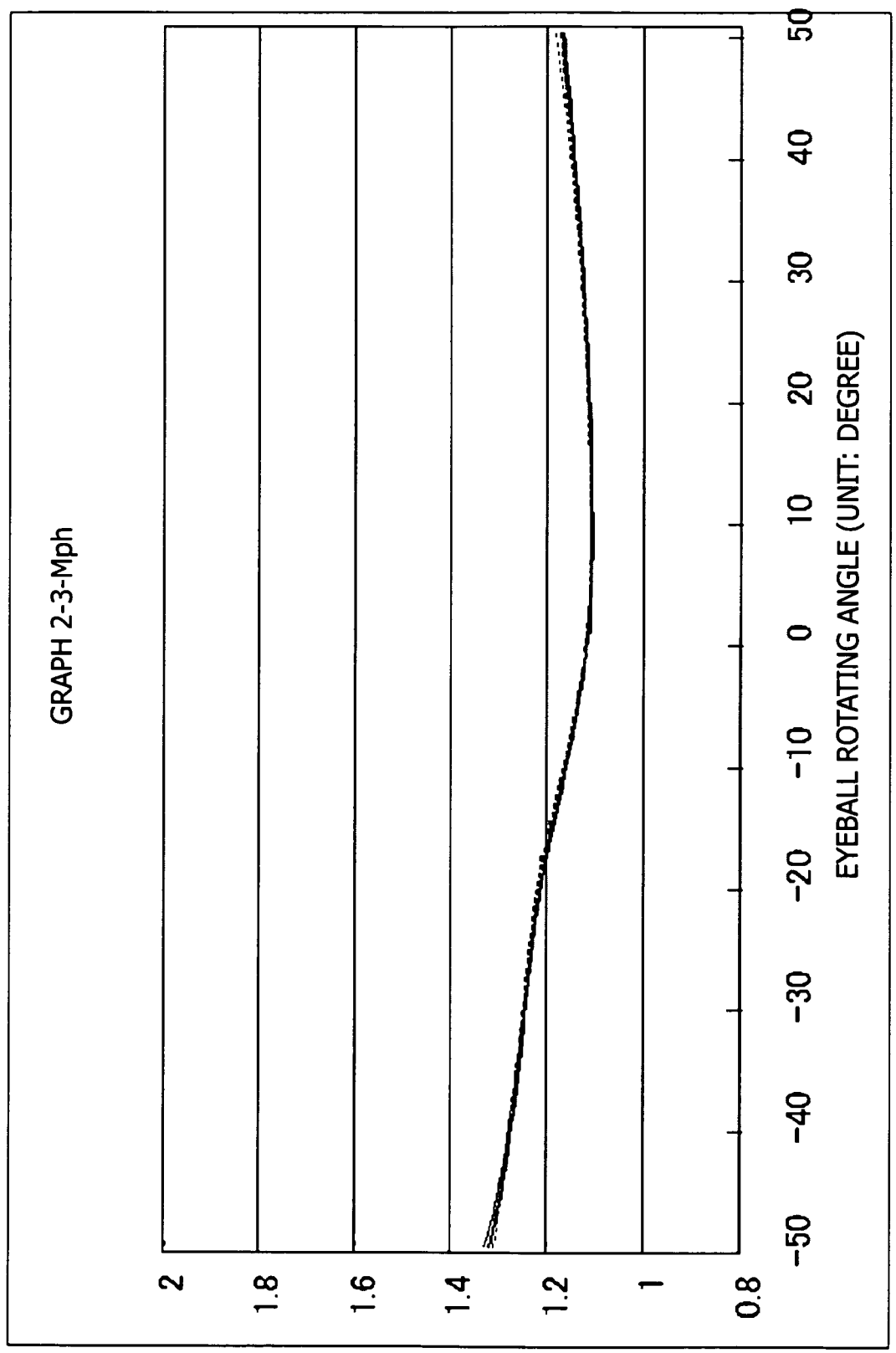
FIG. 26 is a view showing Graph 2-3-Mph representing results, obtained by performing accurate magnification calculations, of the magnification distributions when the lenses of Example 2 and the three kinds of Prior art examples A, B, and C corresponding to the diopters of Example 2 are viewed along the main gazing lines.
Figure 27:
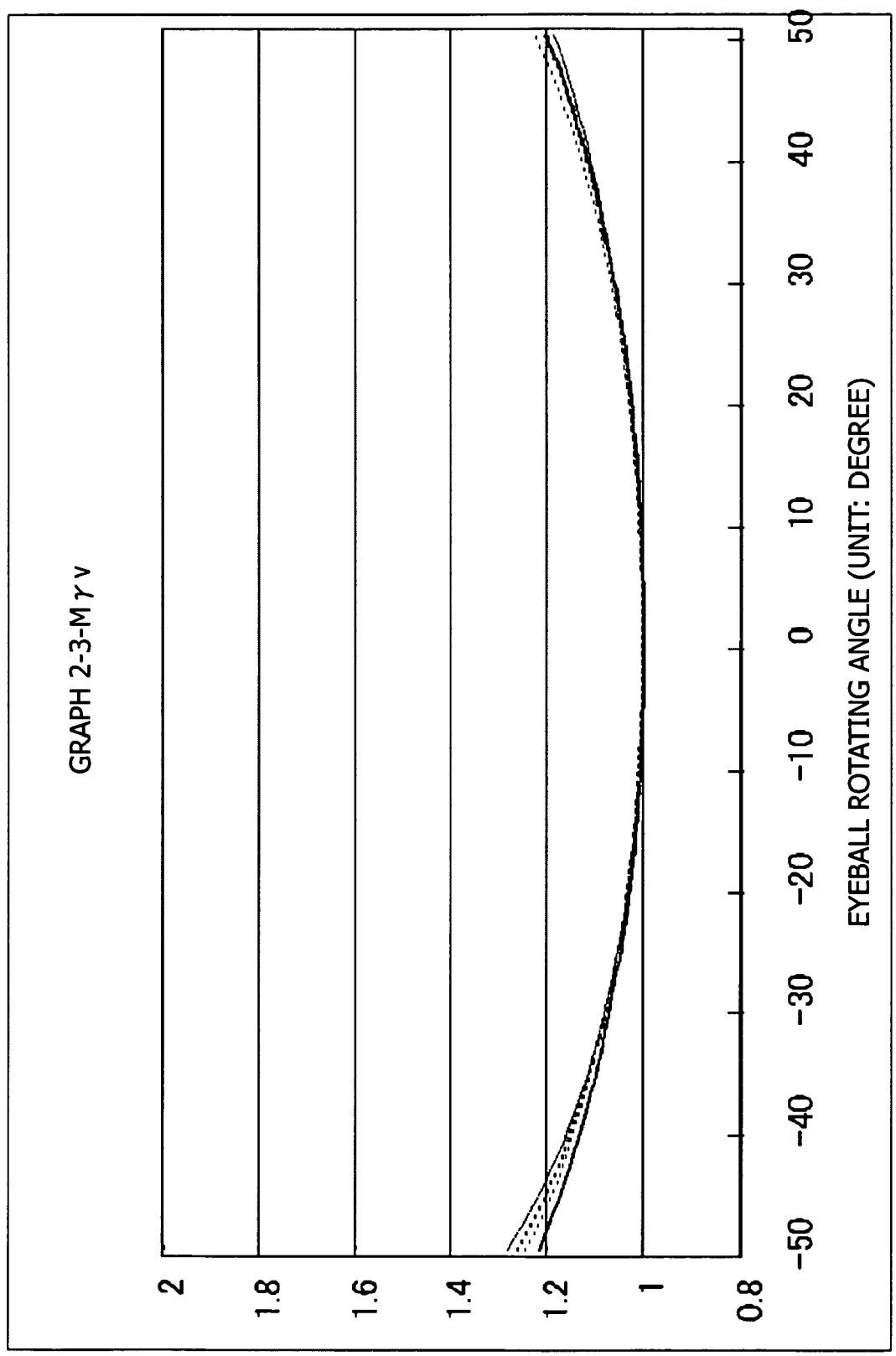
FIG. 27 is a view showing Graph 2-3-Mγv representing results, obtained by performing accurate magnification calculations, of the magnification distributions when the lenses of Example 2 and the three kinds of Prior art examples A, B, and C corresponding to the diopters of Example 2 are viewed along the main gazing lines.
Figure 28:
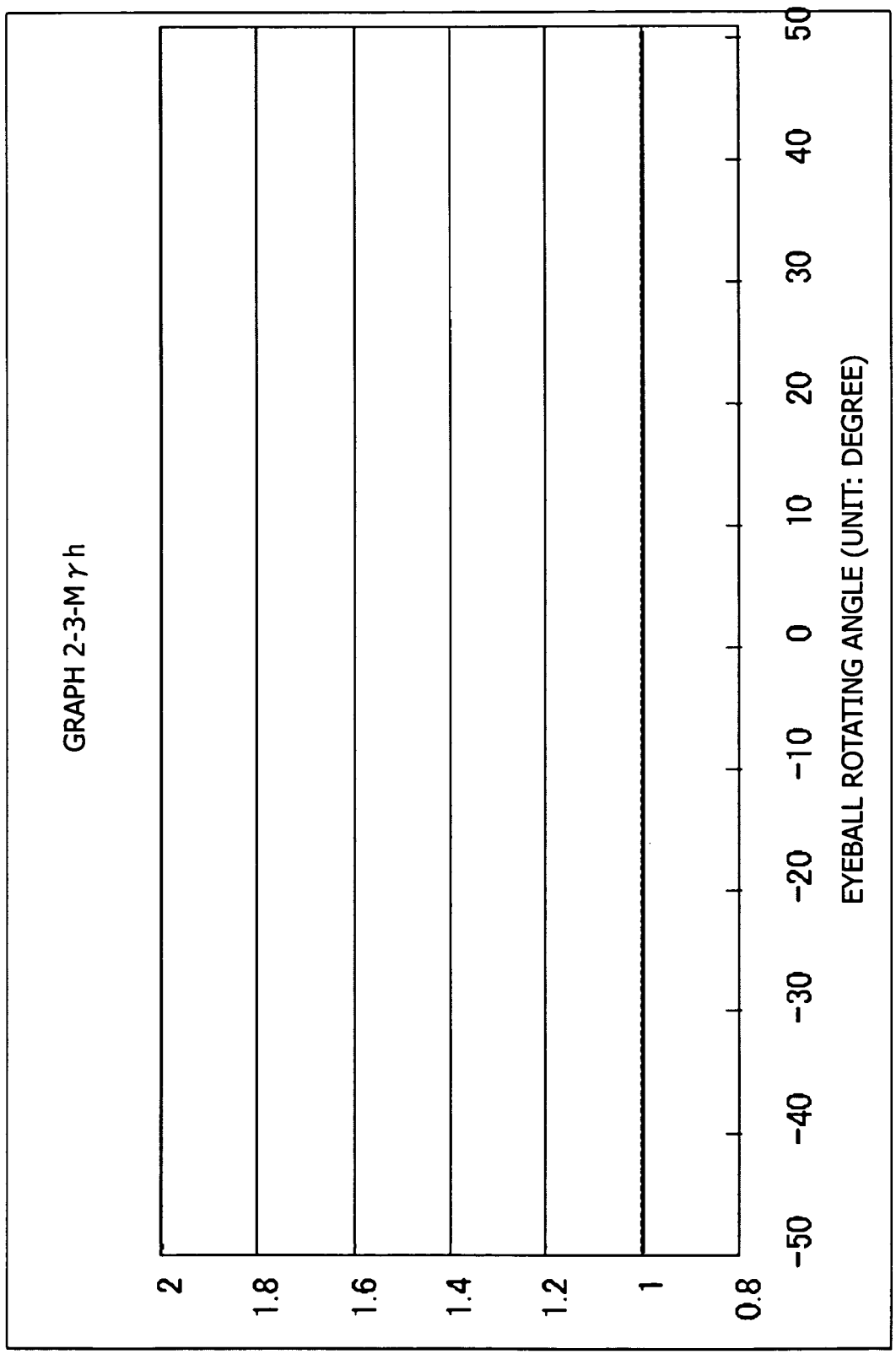
FIG. 28 is a view showing Graph 2-3-Mγh representing results, obtained by performing accurate magnification calculations, of the magnification distributions when the lenses of Example 2 and the three kinds of Prior art examples A, B, and C corresponding to the diopters of Example 2 are viewed along the main gazing lines.
Figure 29:
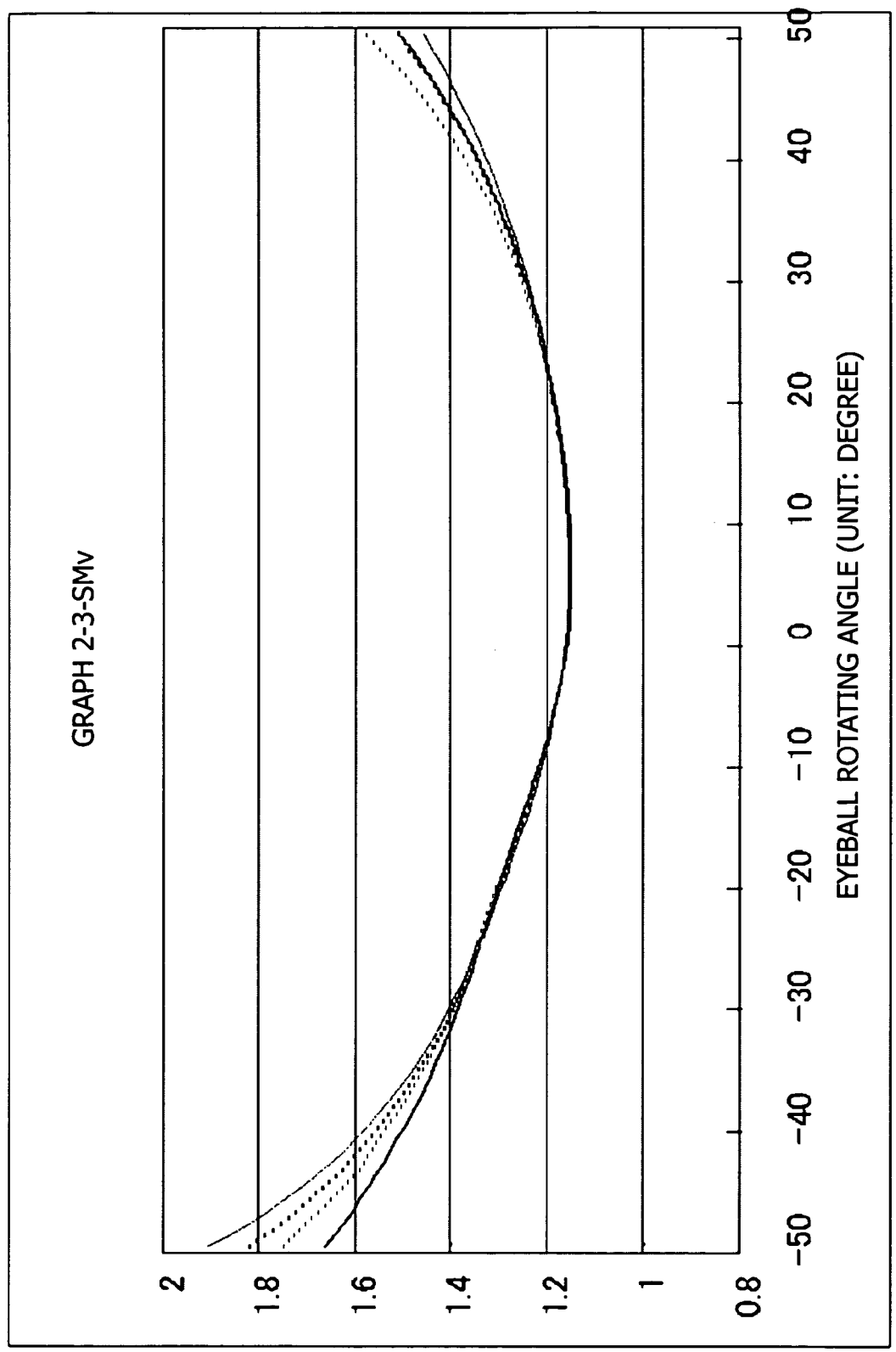
FIG. 29 is a view showing Graph 2-3-SMv representing results, obtained by performing accurate magnification calculations, of the magnification distributions when the lenses of Example 2 and the three kinds of Prior art examples A, B, and C corresponding to the diopters of Example 2 are viewed along the main gazing lines.
Figure 30:
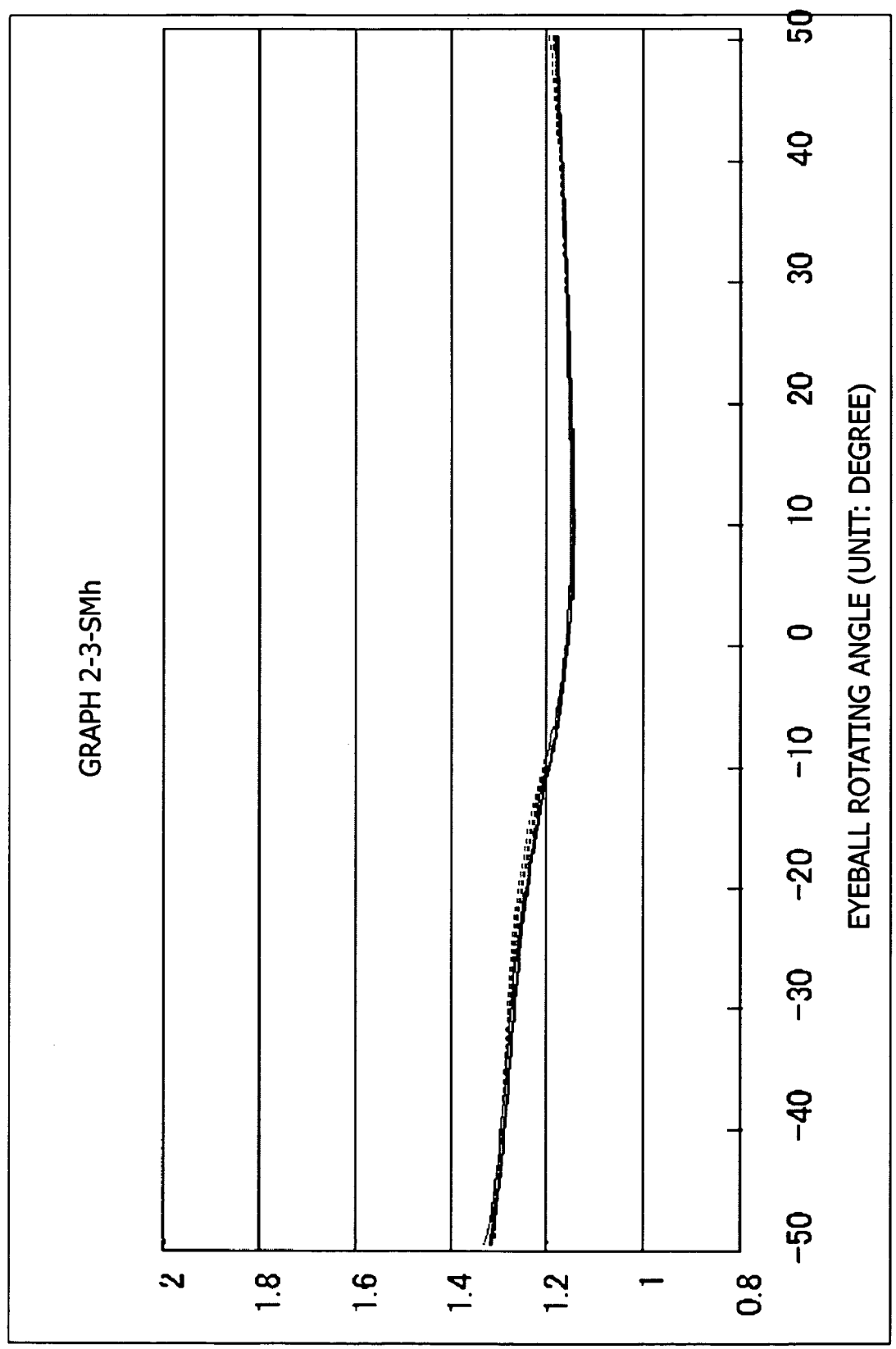
FIG. 30 is a view showing Graph 2-3-SMh representing results, obtained by performing accurate magnification calculations, of the magnification distributions when the lenses of Example 2 and the three kinds of Prior art examples A, B, and C corresponding to the diopters of Example 2 are viewed along the main gazing lines.

25 is a view showing Graph 2-3-Mpv representing results, obtained by performing accurate magnification calculations, of the magnification distributions when the lenses of Example 2 and the three kinds of Prior art examples A, B, and C corresponding to the diopters of Example 2 are viewed along the main gazing lines, FIG. 26 is a view showing Graph 2-3-Mph representing results, obtained by performing accurate magnification calculations, of the magnification distributions when the lenses of Example 2 and the three kinds of Prior art examples A, B, and C corresponding to the diopters of Example 2 are viewed along the main gazing lines, FIG. 27 is a view showing Graph 2-3-Mγv representing results, obtained by performing accurate magnification calculations, of the magnification distributions when the lenses of Example 2 and the three kinds of Prior art examples A, B, and C corresponding to the diopters of Example 2 are viewed along the main gazing lines, FIG. 28 is a view showing Graph 2-3-Mγh representing results, obtained by performing accurate magnification calculations, of the magnification distributions when the lenses of Example 2 and the three kinds of Prior art examples A, B, and C corresponding to the diopters of Example 2 are viewed along the main gazing lines, FIG. 29 is a view showing Graph 2-3-SMv representing results, obtained by performing accurate magnification calculations, of the magnification distributions when the lenses of Example 2 and the three kinds of Prior art examples A, B, and C corresponding to the diopters of Example 2 are viewed along the main gazing lines, and FIG. 30 is a view showing Graph 2-3-SMh representing results, obtained by performing accurate magnification calculations, of the magnification distributions when the lenses of Example 2 and the three kinds of Prior art examples A, B, and C corresponding to the diopters of Example 2 are viewed along the main gazing lines.

Figure 31:
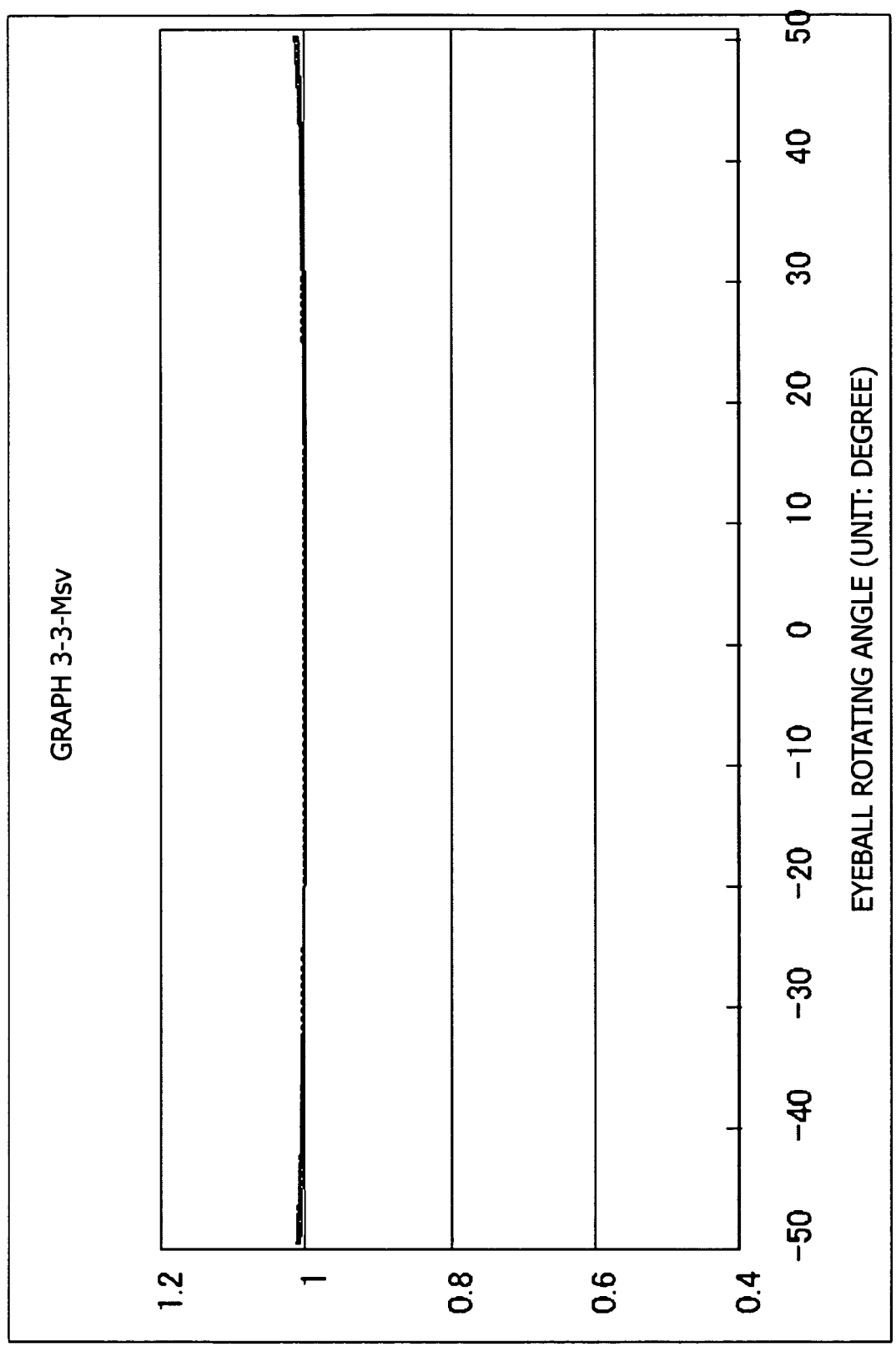
FIG. 31 is a view showing Graph 3-3-Msv representing results, obtained by performing accurate magnification calculations, of magnification distributions when lenses of Example 3 and three kinds of Prior art examples A, B, and C corresponding to the diopters of Example 3 are viewed along main gazing lines.
Figure 32:
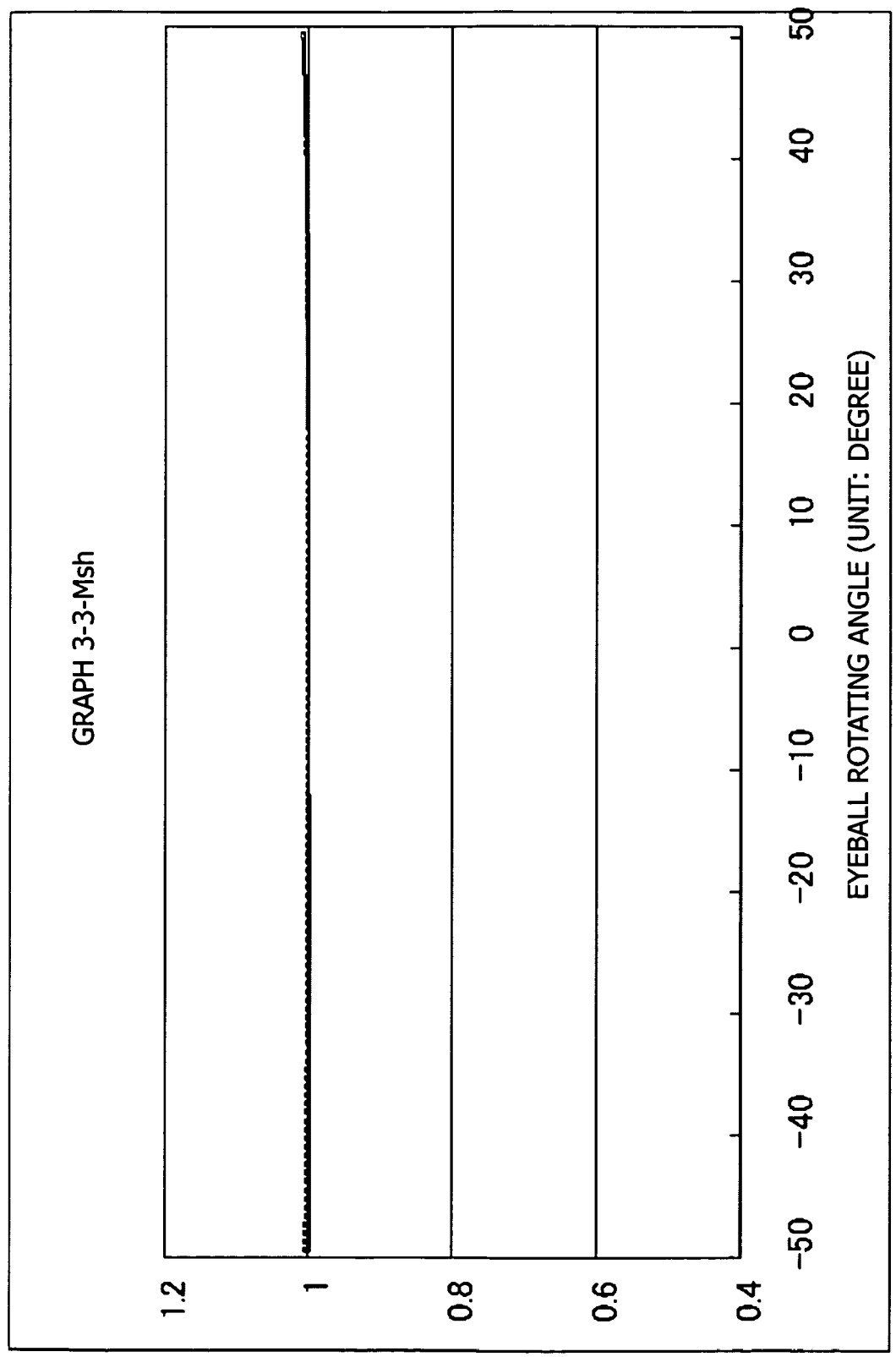
FIG. 32 is a view showing Graph 3-3-Msh representing results, obtained by performing accurate magnification calculations, of the magnification distributions when the lenses of Example 3 and the three kinds of Prior art examples A, B, and C corresponding to the diopters of Example 3 are viewed along the main gazing lines.
Figure 33:
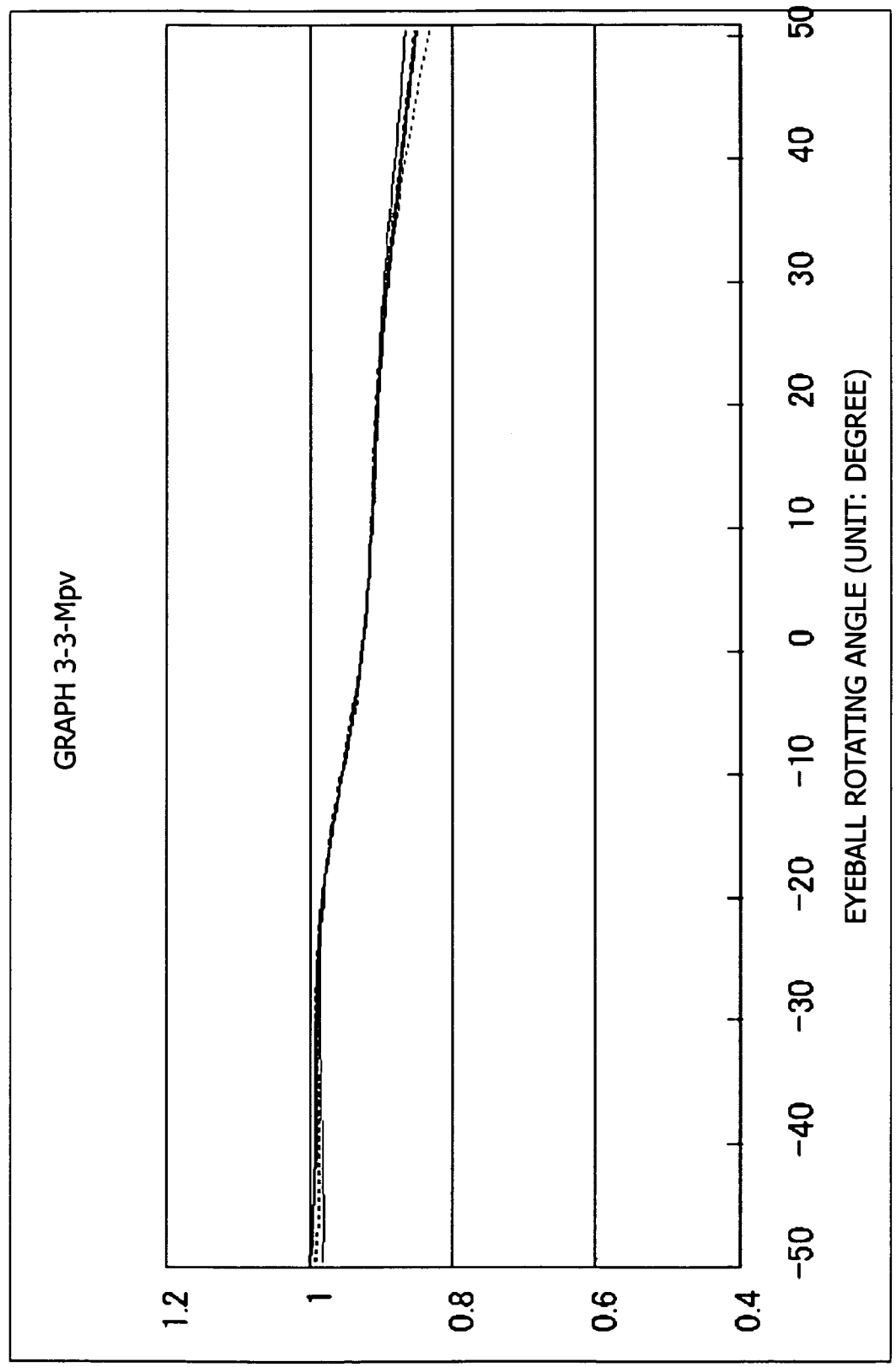
FIG. 33 is a view showing Graph 3-3-Mpv representing results, obtained by performing accurate magnification calculations, of the magnification distributions when the lenses of Example 3 and the three kinds of Prior art examples A, B, and C corresponding to the diopters of Example 3 are viewed along the main gazing lines.
Figure 34:
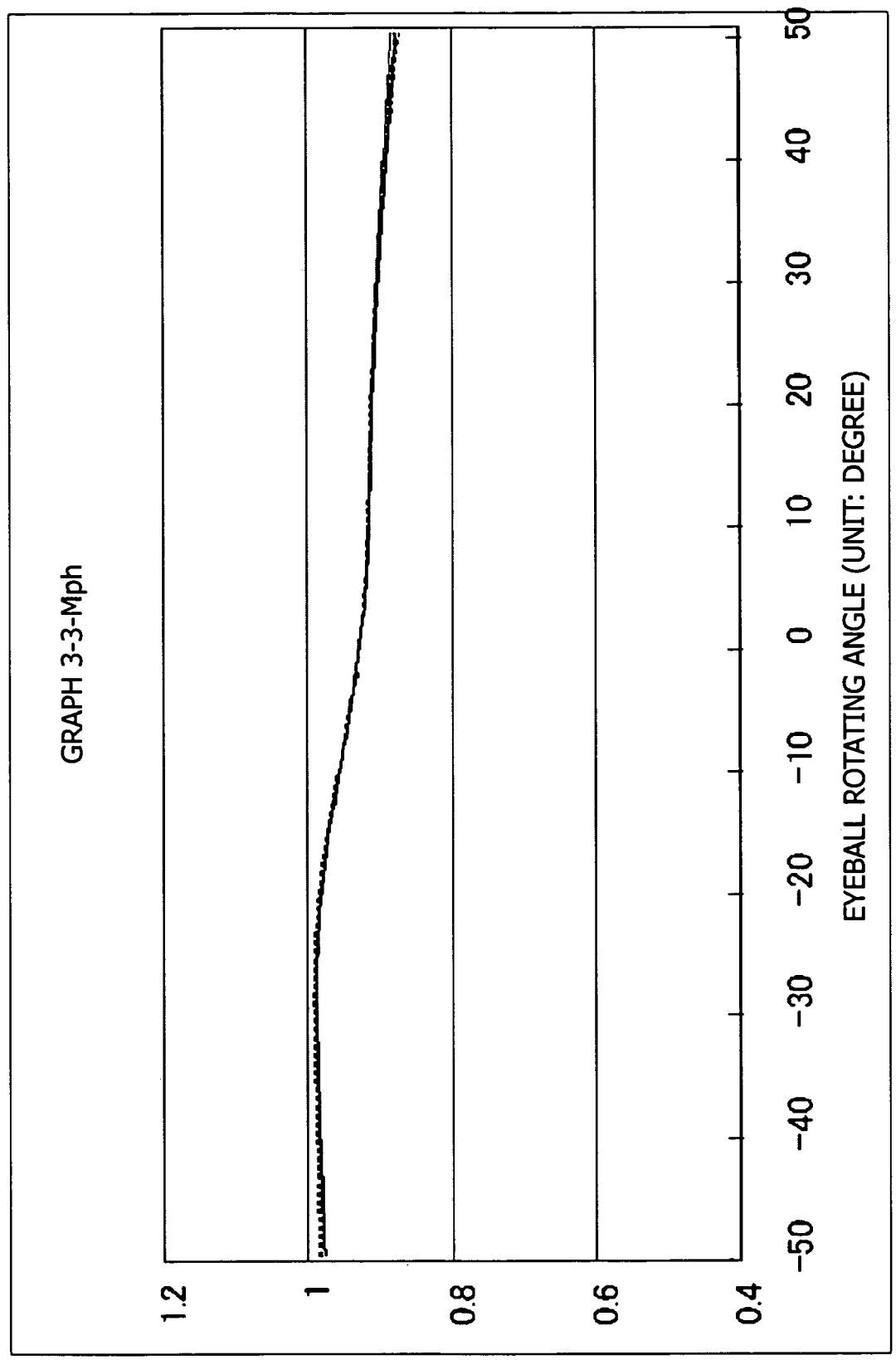
FIG. 34 is a view showing Graph 3-3-Mph representing results, obtained by performing accurate magnification calculations, of the magnification distributions when the lenses of Example 3 and the three kinds of Prior art examples A, B, and C corresponding to the diopters of Example 3 are viewed along the main gazing lines.
Figure 35:
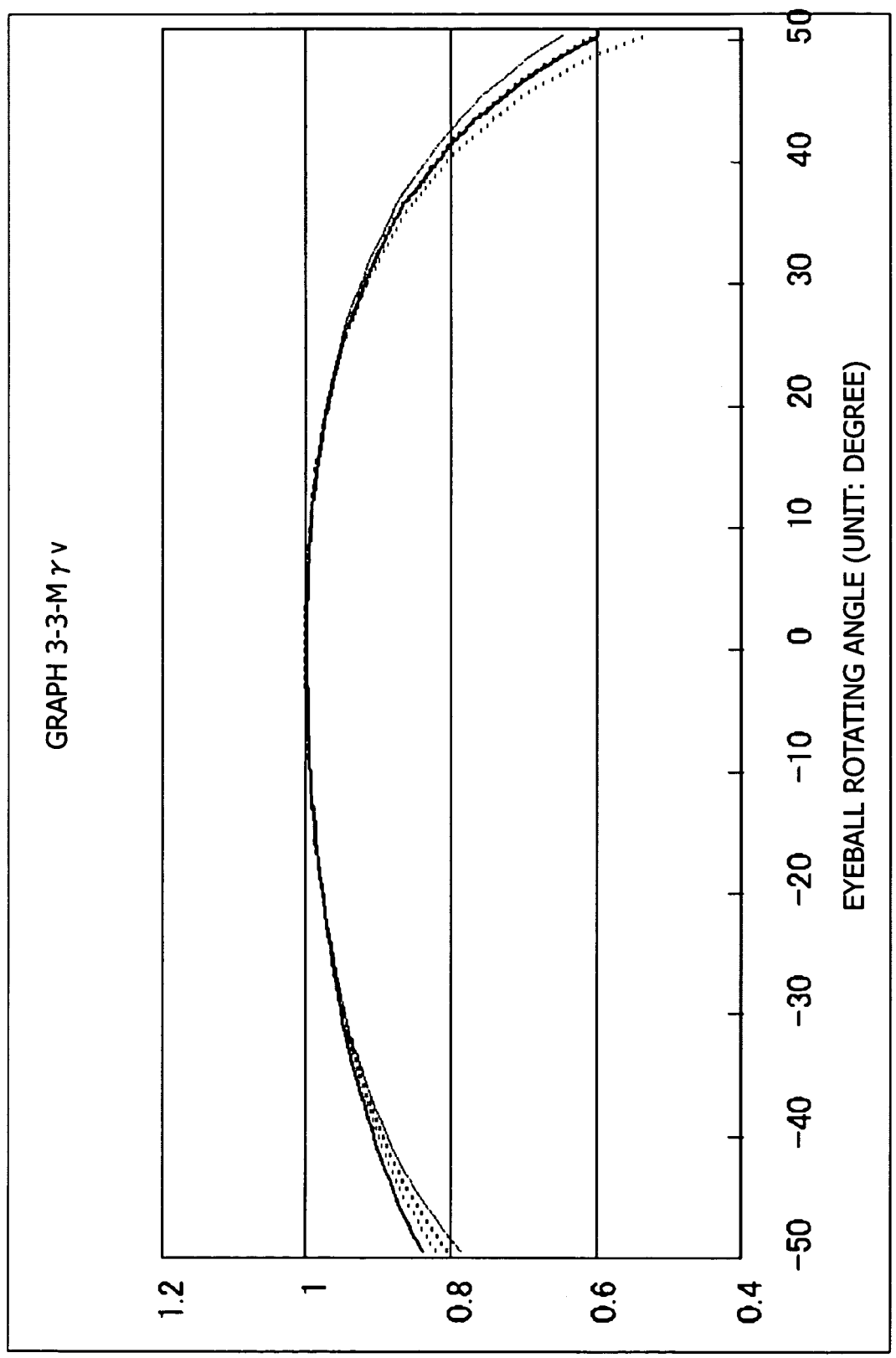
FIG. 35 is a view showing Graph 3-3-Mγv representing results, obtained by performing accurate magnification calculations, of the magnification distributions when the lenses of Example 3 and the three kinds of Prior art examples A, B, and C corresponding to the diopters of Example 3 are viewed along the main gazing lines.
Figure 36:
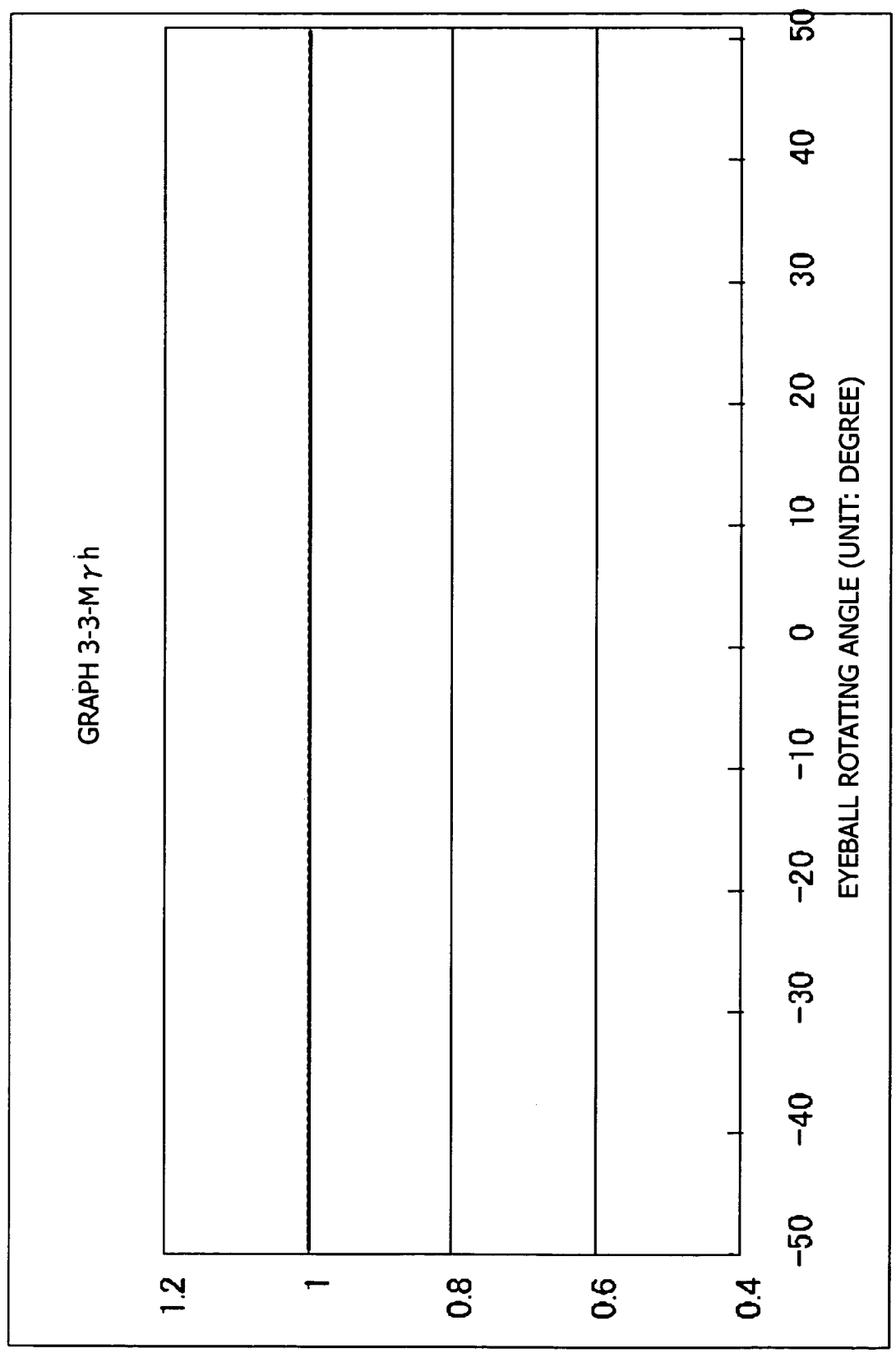
FIG. 36 is a view showing Graph 3-3-Mγh representing results, obtained by performing accurate magnification calculations, of the magnification distributions when the lenses of Example 3 and the three kinds of Prior art examples A, B, and C corresponding to the diopters of Example 3 are viewed along the main gazing lines.
Figure 37:
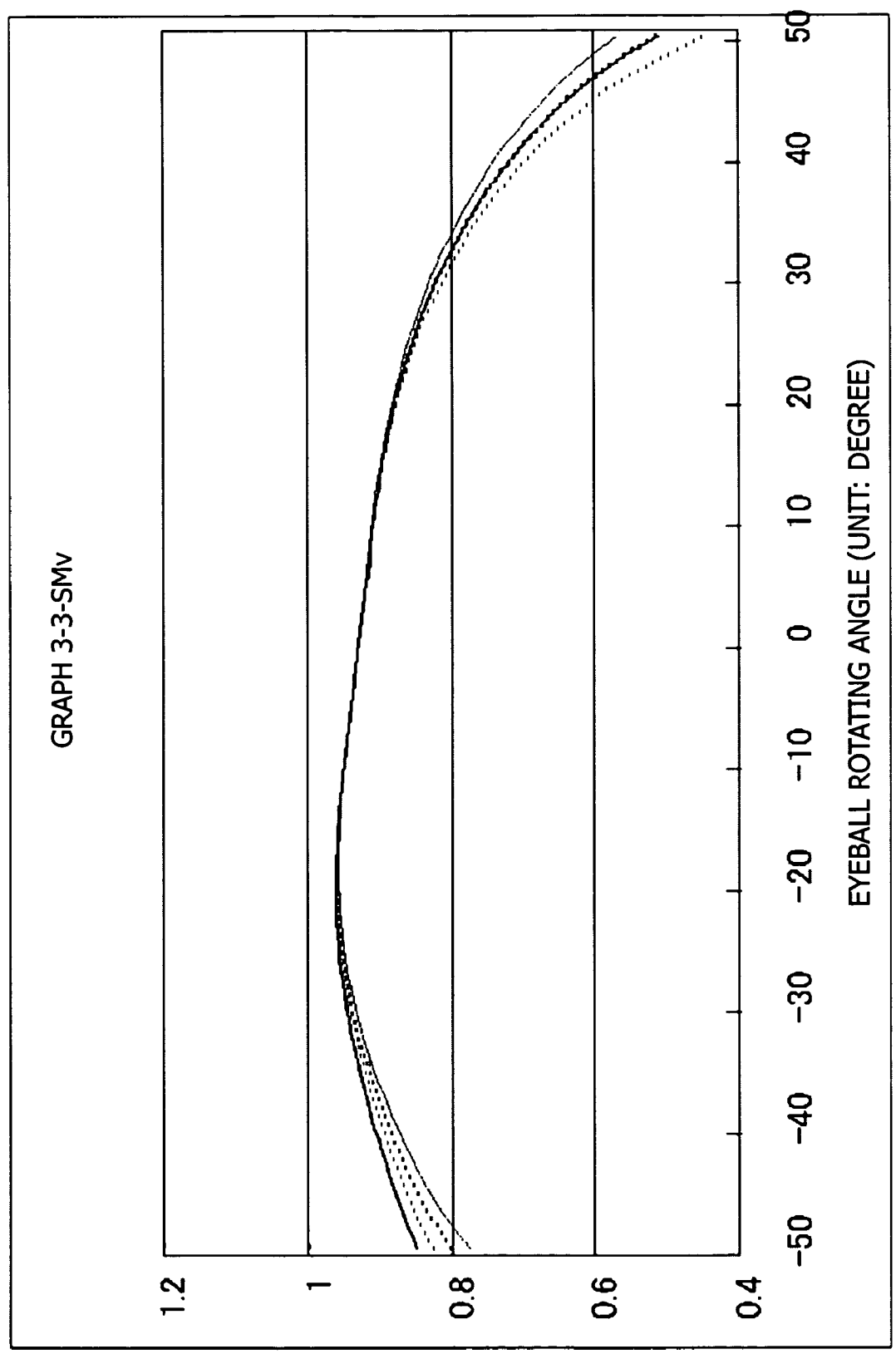
FIG. 37 is a view showing Graph 3-3-SMv representing results, obtained by performing accurate magnification calculations, of the magnification distributions when the lenses of Example 3 and the three kinds of Prior art examples A, B, and C corresponding to the diopters of Example 3 are viewed along the main gazing lines.
Figure 38:
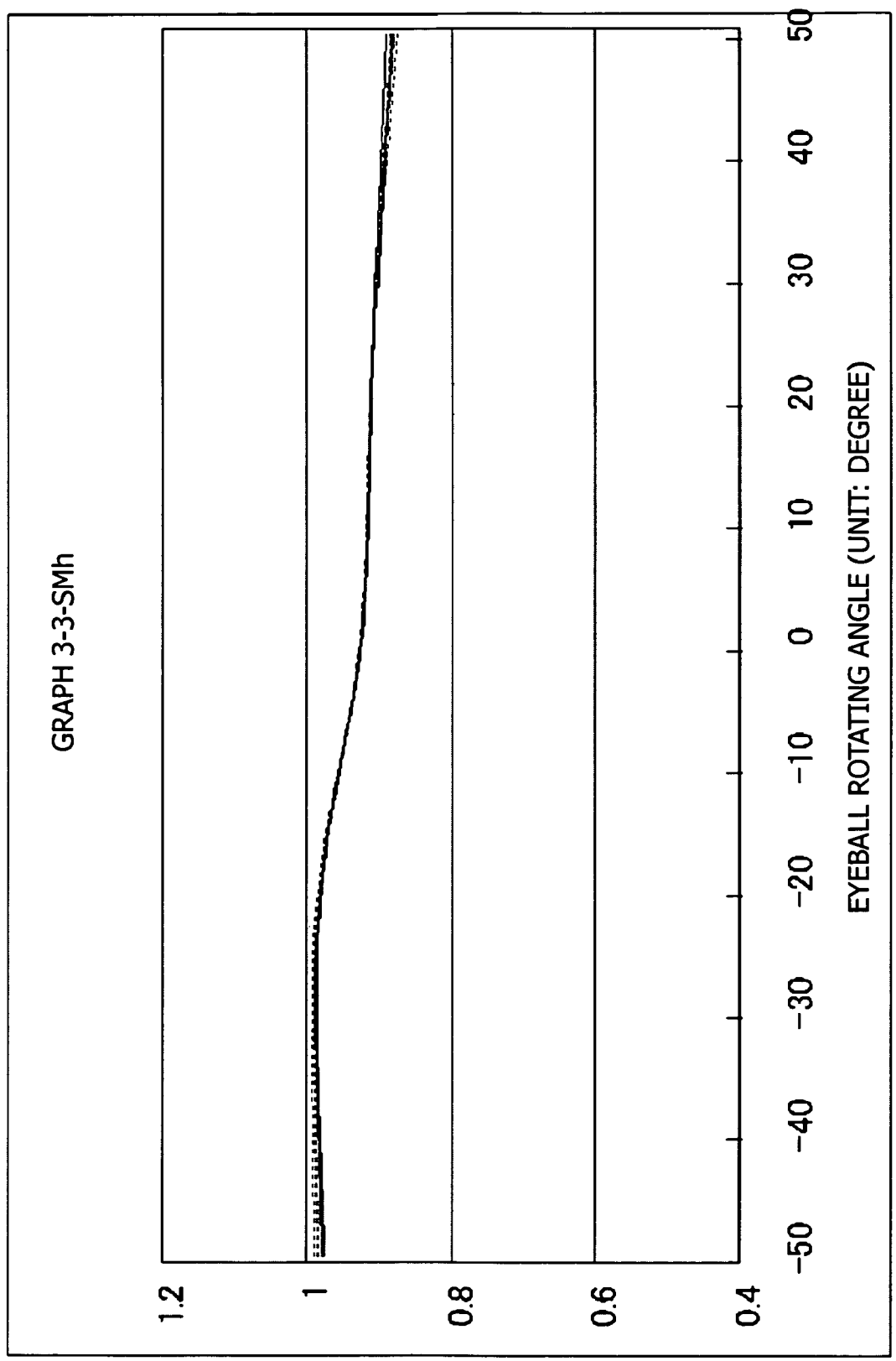
FIG. 38 is a view showing Graph 3-3-SMh representing results, obtained by performing accurate magnification calculations, of the magnification distributions when the lenses of Example 3 and the three kinds of Prior art examples A, B, and C corresponding to the diopters of Example 3 are viewed along the main gazing lines.

FIG. 31 is a view showing Graph 3-3-Msv representing results, obtained by performing accurate magnification calculations, of magnification distributions when lenses of Example 3 and three kinds of Prior art examples A, B, and C corresponding to the diopters of Example 3 are viewed along main gazing lines, FIG. 32 is a view showing Graph 3-3-Msh representing results, obtained by performing accurate magnification calculations, of the magnification distributions when the lenses of Example 3 and the three kinds of Prior art examples A, B, and C corresponding to the diopters of Example 3 are viewed along the main gazing lines, FIG. 33 is a view showing Graph 3-3-Mpv representing results, obtained by performing accurate magnification calculations, of the magnification distributions when the lenses of Example 3 and the three kinds of Prior art examples A, B, and C corresponding to the diopters of Example 3 are viewed along the main gazing lines, FIG. 34 is a view showing Graph 3-3-Mph representing results, obtained by performing accurate magnification calculations, of the magnification distributions when the lenses of Example 3 and the three kinds of Prior art examples A, B, and C corresponding to the diopters of Example 3 are viewed along the main gazing lines, FIG. 35 is a view showing Graph 3-3-Mγv representing results, obtained by performing accurate magnification calculations, of the magnification distributions when the lenses of Example 3 and the three kinds of Prior art examples A, B, and C corresponding to the diopters of Example 3 are viewed along the main gazing lines, FIG. 36 is a view showing Graph 3-3-Mγh representing results, obtained by performing accurate magnification calculations, of the magnification distributions when the lenses of Example 3 and the three kinds of Prior art examples A, B, and C corresponding to the diopters of Example 3 are viewed along the main gazing lines, FIG. 37 is a view showing Graph 3-3-SMv representing results, obtained by performing accurate magnification calculations, of the magnification distributions when the lenses of Example 3 and the three kinds of Prior art examples A, B, and C corresponding to the diopters of Example 3 are viewed along the main gazing lines, and FIG. 38 is a view showing Graph 3-3-SMh representing results, obtained by performing accurate magnification calculations, of the magnification distributions when the lenses of Example 3 and the three kinds of Prior art examples A, B, and C corresponding to the diopters of Example 3 are viewed along the main gazing lines.

EXAMPLE 1

Table 1-1 in FIG. 7 is a list regarding the surface refractive powers of Example 1 according to the present invention. The diopters of Example 1 correspond to S being 0.00 and ADD being 3.00, with three kinds of prior art examples having the same diopters being listed together for comparison. It should be noted that Prior art example A, Prior art example B, and Prior art example C correspond to a "convex surface progressive-power lens" in which the object side surface is a progressive surface, a "bi-surface progressive-power lens" in which both the object side surface and eyeball side surface are progressive surfaces, and a "concave surface progressive-power lens" in which the eyeball side surface is a progressive surface, respectively. Meanings of items used in Table 1-1 are as follows:

DVf1: surface refractive power in the vertical direction at a far vision diopter measurement position F1 on the object side surface, DHf1: surface refractive power in the horizontal direction at the far vision diopter measurement position F1 on the object side surface, DVn1: surface refractive power in the vertical direction at a near vision diopter measurement position N1 on the object side surface, DHn1: surface refractive power in the horizontal direction at the near vision diopter measurement position N1 on the object side surface, DVf2: surface refractive power in the vertical direction at a far vision diopter measurement position F2 on the eyeball side surface, DHf2: surface refractive power in the horizontal direction at the far vision diopter measurement position F2 on the eyeball side surface, DVn2: surface refractive power in the vertical direction at a near vision diopter measurement position N2 on the eyeball side surface, and DHn2: surface refractive power in the horizontal direction at the near vision diopter measurement position N2 on the eyeball side surface.

Graphs 1-1 and 1-2 in FIG. 10 are graphs showing the surface refractive power distributions along the main gazing lines of Example 1, with the horizontal axis indicating the lens upper side on the right hand side and the lens lower side on the left hand side, and the vertical axis indicating the surface refractive power. Here, Graph 1-1 corresponds to the object side surface, and Graph 1-2 corresponds to the eyeball side surface. Besides, the graph shown by a solid line represents the surface refractive power distribution in the vertical direction along the main gazing line, and the graph shown by a dotted line represents the surface refractive power distribution in the horizontal direction along the main gazing line. In Graphs 1-1, as shown in the drawing, Graph CV1 (solid line) showing the surface refractive power distribution in the vertical direction along the main gazing line on the object side surface changes in refractive power distribution from the progressive zone portion to the near portion, while Graph CH1 (dotted line) showing the surface refractive power distribution in the horizontal direction has no change. Further, Graph CV1 (solid line) showing the surface refractive power distribution in the vertical direction is different from Graph CH1 (dotted line) showing the surface refractive power distribution in the horizontal direction, in the surface refractive power from the progressive zone portion to the near portion. In this case, astigmatism occurs in a ray optically passed over the main gazing line on the object side surface, by about the difference in the surface refractive power between the vertical direction and the horizontal direction. On the other hand, in Graphs 1-2, as shown in the drawing, Graph CV2 (solid line) showing the surface refractive power distribution in the vertical direction along the main gazing line on the eyeball side surface does not change in refractive power distribution from the distance portion through the progressive zone portion to the near portion. On the other hand, Graph CH2 (dotted line) showing the surface refractive power distribution in the horizontal direction varies in refractive power distribution from the progressive zone portion to the near portion. Further, Graph CV2 (solid line) showing the surface refractive power distribution in the vertical direction is also different, as in Graph 1-1, from Graph CH2 (dotted line) showing the surface refractive power distribution in the horizontal direction, in the surface refractive power from the progressive zone portion to the near portion. However, the distribution of the difference in the surface refractive power corresponds to that in Graph 1-1 in a countertendency, as seen in Graph 1-2, which shows that the difference in the surface refractive power is given to the ray optically passed over the main gazing line on the eyeball side surface to cancel the astigmatism occurring on the object side surface. As a result of this, the refractive surfaces of the object side surface and the eyeball side surface can together provide a far vision diopter and an addition diopter based on prescription values. It should be noted that these are graphs for explaining the basic difference in surface configuration, omitting a case of aspherical processing for eliminating astigmatism in a peripheral portion and a case of addition of a cylindrical component for coping with a cylindrical diopter.

Further, for comparison, Graphs A-1 and A-2, Graphs B-1 and B-2, and Graphs C-1 and C-2 are shown in FIG. 14 as graphs showing the surface refractive power distributions along the main gazing lines of the three kinds of prior art examples having the same diopters, which are listed in Table 1-1. Note that, meanings of terms in these graphs are as follows:

F1: far vision diopter measurement position on the object side surface,

F2: far vision diopter measurement position on the eyeball side surface,

N1: near vision diopter measurement position on the object side surface,

N2: near vision diopter measurement position on the eyeball side surface,

CV1: graph showing the surface refractive power distribution in the vertical direction along the main gazing line on the object side surface (shown by the solid line), CH1: graph showing the surface refractive power distribution in the horizontal direction along the main gazing line on the object side surface (shown by the dotted line), CV2: graph showing the surface refractive power distribution in the vertical direction along the main gazing line on the eyeball side surface (shown by the solid line), and CH2: graph showing the surface refractive power distribution in the horizontal direction along the main gazing line on the eyeball side surface (shown by the dotted line).

The surface refractive powers at F1, N1, F2, and N2 on these graphs correspond to those in the aforementioned Table 1-1, and meanings of the terms such as DVf1 to DHn2 are also the same as those in the aforementioned Table 1-1. Note that one-dotted chain lines in the horizontal direction at the middle in these graphs show average surface refractive powers on the object side surface (total average values of the vertical and horizontal surface refractive powers at F1 and N1). Any of the average surface refractive powers on the object side surface in Example 1 according to the present invention and the three kinds of prior art examples was uniformly set to 5.50 diopter for fairness in comparison.

The next eight kinds of graphs starting with Graph 1-3- shown in FIG. 15 to FIG. 22 are graphs showing results, obtained by performing the above-described accurate magnification calculations, of magnification distributions when the lens of Example 1 according to the present invention is viewed along the main gazing line, with the horizontal axis indicating the lens upper side on the right hand side and the lens left lower side on the left hand side, and the vertical axis indicating the magnification. In the drawing, a thick solid line is for Example 1, a thin chain line is for Prior art example A, a thick chain line is for Prior art example B, and a thin solid line is for Prior art example C. These apply to the following graphs of this kind. Note that the horizontal axis was set to allow comparison for each sight line direction through use of eyeball rotating angles, and magnification scales on the vertical axes of the graphs were matched to each other for fairness. Symbols appended to "Graph 1-3-" mean, Msv: shape factor in the vertical direction,
Msh: shape factor in the horizontal direction,
Mpv: power factor in the vertical direction,
Mph: power factor in the horizontal direction,
Mγv: prism factor in the vertical direction,
Mγh: prism factor in the horizontal direction,
SMv: magnification in the vertical direction, and
SMh: magnification in the horizontal direction, and, as described above, the magnification SMv in the vertical direction and the magnification SMh in the horizontal direction are in the relation such that $SMv=Msv \times Mpv \times M\gamma v$ $SMh=Msh \times Mph \times M\gamma h.$ It should be noted that any of Example 1 and the above-described three kinds of prior art examples was made under specifications with the refractive index n=1.699, the center thickness t=3.0 mm, and no prism at the geometrical center GC. The objective power (inverse number of the object distance) was set such that the objective power Px at F1, F2 was set as Px=0.00 diopter (infinite far), the objective power Px at N1, N2 was set as Px=2.50 diopter (40 cm), and the objective powers given in other positions were made by multiplying ratios of the additional refractive powers along the main gazing line by 2.50 diopter. Besides, the distance L from the lens rear vertex to the corneal vertex was set as L=15.0 mm, and the distance from the corneal vertex to the eyeball tuning center CR was set as CR=13.0 mm. The eyeball rotating angle θ was indicated, with the eyeball tuning center point C being positioned on the normal line passing through the geometrical center GC on the object side lens surface, the rotating angle when the normal line and the sight line match to each other being regarded as 0 degree, and the upper portion shown with (+) and the lower portion shown with (−). Thereafter, standardization was made such that the eyeball rotating angle θ with respect to F1, F2 was +15 degrees, and the eyeball rotating angle θ with respect to N1, N2 was −30.0 degrees, for consideration of allowing comparison on the same condition even the progressive action and the surface refractive power distribution were either on front or rear side.

Table 1-2 in FIG. 7 is a list of results obtained by performing the above-described accurate magnification calculations for a specific sight line direction of Example 1 according to the present invention and the three kinds of prior art examples prepared for comparison, and corresponds to the above-described Graph 1-3-SMv (total magnification in the vertical direction) in FIG. 21 and Graph 1-3-SMh (total magnification in the horizontal direction) in FIG. 22. Since magnification values are different between the vertical direction and horizontal direction as described above, both magnifications were calculated. Here, meanings represented by symbols in Table 1-2 are as follows:

SMvf: magnification in the vertical direction on a sight line passing through a far vision measurement point, SMvn: magnification in the vertical direction on a sight line passing through a near vision measurement point, SMvfn: magnification difference in the vertical direction (SMvn−SMvf), SMhf: magnification in the horizontal direction on a sight line passing through a far vision measurement point, SMhn: magnification in the horizontal direction on a sight line passing through a near vision measurement point, and SMhfn: magnification difference in the horizontal direction (SMhn−SMhf).

SMvfn and SMhfn in Table 1-2, that is, the magnification difference in the vertical direction (SMvn−SMvf) and the magnification difference in the horizontal direction (SMhn−SMhf), show that the values of magnification differences of Example 1 according to the present invention are suppressed to as low as 0.1342 and 0.0954, whereas those of the prior art examples are 0.1380 and 0.1015 in A, 0.1360 and 0.0988 in B, and 0.1342 and 0.0961 in C. In other words, the magnification difference between the distance portion and the near portion of Example 1 according to the present invention are made further smaller than those of Prior art 1, which shows that Example 1 is improved more greatly than Prior art 1 also in distortion and sway of an image. Note that the difference between the vertical direction and the horizontal direction in calculating the magnification is not taken into consideration at all in the patent specification corresponding to the above-described Prior art 1. However, as is immediately apparent from comparison between Graph 1-3-SMv (total magnification in the vertical direction) in FIG. 21 and Graph 1-3-SMh in FIG. 22 (total magnification in the horizontal direction) resulting from accurate magnification calculations, corresponding to Example 1 according to the present invention, magnification distributions of an image in the vertical direction and the horizontal direction are apparently different. Further, it is easily read that this difference is prominent mainly in the near portion and a portion lower than that (at an eyeball rotating angle of around −20 degrees and lower).

As expressed in the above-described magnification calculation equations, the magnification in the vertical direction SMv=Msv×Mpv×Mγv, the magnification in the horizontal direction SMh=Msh×Mph×Mγh, Graph 1-3-SMv is obtained by multiplying three elements, that is, values of Graph 1-3-Msv, Graph 1-3-Mpv, and Graph 1-3-Mγv, and similarly Graph 1-3-SMh is obtained by multiplying three elements, that is, values of Graph 1-3-Msh, Graph 1-3-Mph, and Graph 1-3-Mγh. In comparison between the elements in the vertical direction and the horizontal direction here, there is no apparent difference found between Msv and Msh which are shape factors, whereas there is a difference found between Mpv and Mph in a portion lower than the near portion (at an eyeball rotating angle of around −25 degrees and lower). Further, there is an obvious difference between Mγv and Mγh in the near portion and a lower portion than that (at an eyeball rotating angle of around −15 degrees and lower). In short, it is shown that the major cause of the difference between Graph 1-3-SMv and Graph 1-3-SMh is the difference between Mγv and Mγh, the secondary cause thereof is the difference between Mpv and Mph, and there is no obvious difference found between Msv and Msh, which are almost irrelevant thereto. Consequently, the reason why there is no difference found between magnifications in the vertical direction and the horizontal direction in the patent specification corresponding to Prior art 1 is that the prism factors Mγv and Mγh, which are major causes of a magnification difference, are not taken into consideration at all, and because the object distance and the angle between the sight line and lens are neglected, there is no difference found between the power factors Mpv and Mph, which are secondary causes. Further, there is no difference found among the examples in the magnification difference between the distance portion and the near portion, as long as in the scale used in Example 1 of the present invention, in the shape factors Msv and Msh which are regarded as reasons of improvement in Prior art 1.

In Prior art 1 "the distortion and sway of an image can be reduced" by "decreasing the magnification difference between the distance portion and the near portion," and further "decreasing the magnification difference between the vertical direction and the horizontal direction" is also regarded as having an effect of "capable of reducing the distortion and sway of an image" in the present invention. This is intended to prevent a square item from looking flat, or a circular item from looking oval. The improvement in visual sense would be essentially seen as "bringing the ratio closer to 1" rather than "reducing the difference." What is important here is that the sense of a square item looking flat or a circular item looking oval is not due to a "far-near ratio" but due to a "vertical-horizontal ratio." In other words, the present invention can provide an improved effect of "capable of reducing the distortion and sway of an image" not only by "decreasing the magnification difference between the distance portion and the near portion" but also by "decreasing the magnification difference between the vertical direction and the horizontal direction to bring the magnification ratio closer to 1." These tendencies are prominent mainly in a portion lower than the near portion (at an eyeball rotating angle of around −25 degrees and lower).

EXAMPLE 2

Table 2-1 in FIG. 8 is a list regarding the surface refractive powers of Example 2 according to the present invention. The diopters of Example 2 correspond to S being +6.00 and ADD being 3.00, with three kinds of prior art examples having the same diopters being listed together for comparison. It should be noted that Prior art example A, Prior art example B, and Prior art example C correspond to a "convex surface progressive-power lens" in which the object side surface is a progressive surface, a "bi-surface progressive-power lens" in which both the object side surface and eyeball side surface are progressive surfaces, and a "concave surface progressive-power lens in which the eyeball side surface is a progressive surface, respectively. Meanings of terms such as DVf1 to DHn2 used in Table 2-1 are the same as those in the above-described Table 1-1. Graphs 2-1 and 2-2 are graphs showing the surface refractive power distributions along the main gazing lines of Example 2 according to the present invention, with the horizontal axis indicating the lens upper side on the right hand side and the lens lower side on the left hand side, and the vertical axis indicating the surface refractive power. Here, Graph 2-1 corresponds to the object side surface, and Graph 2-2 corresponds to the eyeball side surface. Besides, the graph shown by a solid line represents the surface refractive power distribution in the vertical direction along the main gazing line, and the graph shown by a dotted line represents the surface refractive power distribution in the horizontal direction along the main gazing line. It should be noted that these are graphs for explaining the basic difference in surface configuration, omitting a case of aspherical processing for eliminating astigmatism in a peripheral portion and a case of addition of a cylindrical component for coping with a cylindrical diopter.

Further, Graphs A-1 and A-2, Graphs B-1 and B-2, and Graphs C-1 and C-2 which are used in the above-described Example 1 are used again as graphs showing the surface refractive power distributions along the main gazing lines of the three kinds of prior art examples having the same diopters, which are listed in Table 2-1 for comparison. Therefore, meaning of terms in these graphs are the same as those in the above-described Example 1. The surface refractive powers at F1, N1, F2, and N2 should correspond to those in Table 2-1, and any of the average surface refractive powers on the object side surfaces shown by one-dotted chain lines in the horizontal direction at the middle should have a deep curve of 10.50 diopter on the ground of correspondence to Table 2-1. In Graphs 2-1 and Graph 2-2 of FIG. 10, Graph CV1 (solid line) showing the surface refractive power distribution in the vertical direction along the main gazing line on the object side surface, Graph CH1 (dotted line) showing the surface refractive power distribution in the horizontal direction, Graph CV2 (solid line) showing the surface refractive power distribution in the vertical direction along the main gazing line on the eyeball side surface, and Graph CH2 (dotted line) showing the surface refractive power distribution in the horizontal direction have appearances of change from the distance portion through the progressive zone portion to the near portion showing similar tendencies as those in Example 1. This shows that the difference in the surface refractive power is given to the ray passed over the main gazing line on the eyeball side surface to cancel the astigmatism occurring on the object side surface. As a result of this, the refractive surfaces of the object side surface and the eyeball side surface can also together provide a far vision diopter and an addition diopter based on prescription values in Example 2 as in Example 1.

The next eight kinds of graphs starting with Graph 2-3- shown in FIG. 23 to FIG. 30 are graphs showing results, obtained by performing the above-described accurate magnification calculations, of magnification distributions when the lens of Example 2 according to the present invention is viewed along the main gazing line. Meanings of terms and symbols appended to "Graph 2-3-" are the same as those in the above-described Example 1 other than that thick lines in the drawings are for Example 2. Although any of the refractive indexes, objective powers, and eyeball rotating angles used in Example 2 and the above-described three kinds of prior art examples was the same as that in the above-described Example 1, only the center thickness t was set at 6.0 mm close to an actual product because Example 2 and the above-described three kinds of prior art examples have diopters of S being +6.00 and ADD being 3.00.

Table 2-2 in FIG. 8 is a list of results obtained by performing accurate magnification calculations for a specific sight line direction of Example 2 according to the present invention and three kinds of prior art examples prepared for comparison, and corresponds to the above-described Graph 2-3-SMv (total magnification in the vertical direction) and Graph 2-3-SMh (total magnification in the horizontal direction). Here, meanings represented by symbols in Table 2-2 are the same as those in the above-described Table 1-2.

SMvfn and SMhfn in Table 2-2, that is, the magnification difference in the vertical direction (SMvn−SMvf) and the magnification difference in the horizontal direction (SMhn−SMhf), show that the values of magnification differences of Example 2 according to the present invention are suppressed to as low as 0.2151 and 0.1199, whereas those of the prior art examples are 0.2275 and 0.1325 in A, 0.2277 and 0.1268 in B, and 0.2280 and 0.1210 in C. In other words, the magnification difference between the distance portion and the near portion of Example 2 according to the present invention are made further smaller than those of Prior art 1, which shows that Example 2 is improved more greatly than Prior art 1 also in distortion and sway of an image. As is immediately apparent, as in Example 1, from comparison between Graph 2-3-SMv (total magnification in the vertical direction) and Graph 2-3-SMh (total magnification in the horizontal direction) resulting from accurate magnification calculations, corresponding to Example 2 according to the present invention, magnification distributions of an image in the vertical direction and the horizontal direction are apparently different.

Further, it is easily read that this difference is prominent mainly in a portion lower than the middle portion (at an eyeball rotating angle of around −10 degrees and lower). As in Example 1, Graph 2-3-SMv is obtained also in Example 2 by multiplying three elements, that is, values of Graph 2-3-Msv, Graph 2-3-Mpv, and Graph 2-3-Mγv, and similarly Graph 2-3-SMh is obtained by multiplying three elements, that is, values of Graph 2-3-Msh, Graph 2-3-Mph, and Graph 2-3-Mγh. Here, in comparison between the elements in the vertical direction and the horizontal direction, there is no apparent difference found between Msv and Msh, which are shape factors, whereas there is a difference found between Mpv and Mph in a portion lower than the near portion (at an eyeball rotating angle of around −20 degrees and lower). Further, there is an obvious difference between Mγv and Mγh in a portion lower than the middle portion (at an eyeball rotating angle of around −10 degrees and lower). There is also a difference found in an upper portion of the distance portion (at an eyeball rotating angle of around +20 degrees and upper), which is negligible because a difference existing between the examples in a quite upper portion of the distance portion (at an eyeball rotating angle of around +30 degrees and upper) with less frequent use.

In short, it is shown, as in the above-described Example 1, that the major cause of the difference between Graph 2-3-SMv in FIG. 29 and Graph 2-3-SMh in FIG. 30 is the difference between Mγv and Mγh, the secondary cause thereof is the difference between Mpv and Mph, and there is no obvious difference found between Msv and Msh, which are almost irrelevant thereto. Further, there is no difference found among the examples in the magnification difference between the distance and near portions, as long as in the scale used in Example 2 of the present invention, in the shape factors Msv and Msh, which are regarded as reasons of improvement in Prior art 1. Note that, as in Example 1, the present invention can provide, also in Example 2, an improved effect of "capable of reducing the distortion and sway" not only by "decreasing the magnification difference between the distance portion and the near portion" but also by "decreasing the magnification difference between the vertical direction and the horizontal direction to bring the magnification ratio closer to 1." These tendencies are prominent mainly in a portion lower than the near portion (at an eyeball rotating angle of around −25 degrees and lower).

EXAMPLE 3

Table 3-1 in FIG. 9 is a list regarding the surface refractive powers of Example 3 according to the present invention. The diopters of Example 3 correspond to S being −6.00 and ADD being 3.00, with three kinds of prior art examples having the same diopters being listed together for comparison. It should be noted that Prior art example A, Prior art example B, and Prior art example C correspond to a "convex surface progressive-power lens" in which the object side surface is a progressive surface, a "bi-surface progressive power lens" in which both the object side surface and eyeball side surface are progressive surfaces, and a "concave surface progressive-power lens in which the eyeball side surface is a progressive surface, respectively. Meanings of terms such as DVf1 to DHn2 used in Table 3-1 are the same as those in the above-described Table 1-1 and Table 2-1.

Graphs 3-1 and 3-2 in FIG. 11 are graphs showing the surface refractive power distributions along the main gazing lines of Example 3 according to the present invention, with the horizontal axis indicating the lens upper side on the right hand side and the lens lower side on the left hand side, and the vertical axis indicating the surface refractive power. Here, Graph 3-1 corresponds to the object side surface, and Graph 3-2 corresponds to the eyeball side surface. Besides, the graph shown by a solid line represents the surface refractive power distribution in the vertical direction along the main gazing line, and the graph shown by a dotted line represents the surface refractive power distribution in the horizontal direction along the main gazing line. It should be noted that these are graphs for explaining the basic difference in surface configuration, omitting a case of aspherical processing for eliminating astigmatism in a peripheral portion and a case of addition of a cylindrical component for coping with a cylindrical diopter.

Further, Graphs A-1 and A-2, Graphs B-1 and B-2, and Graphs C-1 and C-2 which are used in the above-described Examples 1 and 2 are used again as graphs showing the surface refractive power distributions along the main gazing lines of the three kinds of prior art examples having the same diopters, which are listed in Table 3-1 in FIG. 9 for comparison. Therefore, meaning of terms in these graphs are the same as those in the above-described Examples 1 and 2. The surface refractive powers at F1, N1, F2, and N2 should correspond to those in the aforementioned Table 3-1, and any of the average surface refractive powers on the object side surface shown by one-dotted chain lines in the horizontal direction at the middle should have a shallow curve with 2.50 diopter for the ground of correspondence to Table 3-1. In Graphs 3-1 and Graph 3-2 of FIG. 12, Graph CV1 (solid line) showing the surface refractive power distribution in the vertical direction along the main gazing line on the object side surface, Graph CH1 (dotted line) showing the surface refractive power distribution in the horizontal direction, Graph CV2 (solid line) showing the surface refractive power distribution in the vertical direction along the main gazing line on the eyeball side surface, and Graph CH2 (dotted line) showing the surface refractive power distribution in the horizontal direction have appearances of change from the distance portion through the progressive zone portion to the near portion showing similar tendencies as those in Example 1 and Example 2, which shows that the difference in the surface refractive power is given to the ray passed over the main gazing line on the eyeball side surface to cancel the astigmatism occurring on the object side surface. As a result of this, the refractive surfaces of the object side surface and the eyeball side surface can together provide a far vision diopter and an addition diopter based on prescription values as in Example 1 and Example 2.

The next eight kinds of graphs starting with Graph 3-3- shown in FIG. 31 to FIG. 38 are graphs showing results, obtained by performing the above-described accurate magnification calculations, of magnification distributions when the lens of Example 3 according to the present invention is viewed along the main gazing line. Meanings of terms and symbols appended to "Graph 3-3-" are the same as those in the above-described Examples 1 and 2 other than that thick lines in the drawings are for Example 3. Although any of the refractive indexes, objective powers, and eyeball rotating angles used in Example 3 and the above-described three kinds of prior art examples was the same as that in the above-described Examples 1 and 2, only the center thickness t was set to 1.0 mm close to an actual product because Example 3 and the above-described three kinds of prior art examples had diopters of S being −6.00 and ADD being 3.00.

Table 3-2 in FIG. 9 is a list of results obtained by performing accurate magnification calculations for a specific sight line direction of Example 3 according to the present invention and three kinds of prior art examples prepared for comparison, and corresponds to the above-described Graph 3-3-SMv (total magnification in the vertical direction) and Graph 3-3-SMh (total magnification in the horizontal direction). Here, meanings represented by symbols in Table 3-2 are the same as those the meanings in the above-described Table 1-2 and Table 2-2.

SMvfn and SMhfn in Table 3-2, that is, the magnification difference in the vertical direction (SMvn−SMvf) and the magnification difference in the horizontal direction (SMhn−SMhf), show that the values of magnification differences of Example 3 according to the present invention are at 0.0512 and 0.0726, whereas those of the prior art examples are 0.0475 and 0.0774 in A, 0.0418 and 0.0750 in B, and 0.0363 and 0.0727 in C, showing that in Example 3 the magnification difference in the vertical direction increases, whereas the magnification difference in the horizontal direction decreases. However, considering the magnification difference in the vertical direction having a low value, which is ⅓ to ⅕ that of the above-described Examples 1 and Example 2, with a slight decrease in the magnification difference in the horizontal direction, it can be said that there is not so great magnification difference between the distance portion and the near portion of Example 3 according to the present invention as compared to those of Prior art 1. Meanwhile, a study of Graph 3-3-SMv (total magnification in the vertical direction) and Graph 3-3-SMh (total magnification in the horizontal direction) obtained by performing accurate magnification calculations corresponding to Example 3 according to the present invention, shows that Example 3 according to the present invention, as compared to the prior art examples, has the least "tendency of the magnification in the vertical direction to be smaller than 1" especially in a portion lower than the near portion (at an eyeball rotating angle of around −20 degrees and lower), which results in the least "magnification difference between the vertical direction and the horizontal direction" so that distortion and sway of an image are improved further than in the prior art examples.

It should be noted that in Graph 3-3-SMv (total magnification in the vertical direction) in FIG. 37, there occurs a significant difference in magnification distribution of an image between the vertical direction and the horizontal direction mainly in a portion lower than the middle portion (at an eyeball rotating angle of around −10 degrees and lower) and in an upper portion of the distance portion (at an eyeball rotating angle of around +10 degrees and upper), whereas there occurs a difference among the examples in a portion lower than the near portion (at an eyeball rotating angle of around −20 degrees and lower) and in a slightly upper portion of the distance portion (at an eyeball rotating angle of around +25 degrees and upper). Of them, the difference in the slightly upper portion of the distance portion is negligible because it is infrequently used, while that in the portion lower than the near portion is nonnegligible because it is frequently used. As a result, in Example 3 according to the present invention, as compared to the prior art examples, the magnification in the vertical direction is closest to 1 especially in the portion lower than the near portion (at an eyeball rotating angle of around −20 degrees and lower), which results in the least "magnification difference between the vertical direction and the horizontal direction" so that distortion and sway of an image are improved further than in the prior art examples. Note that these tendencies are prominent mainly in the portion lower than the near portion (at an eyeball rotating angle of around −25 degrees and lower). Further, there is no difference, as in Example 1 and Example 2 of the present invention, found among the examples in the magnification difference between the distance and near portions even in the scale used in Example 3, in the shape factors Msv and Msh which are regarded as reasons of improvement in Prior art 1.

EXAMPLES 4 TO 7

As examples of the present invention, there are various possible combinations of distributions of surface refractive powers within the scope described in claims other than the above-described Examples 1 to 3. Examples 4 to 6 are shown here as applications having the same diopters as Example 1, and Example 7 as an application having the same diopters as Example 2. Lists and graphs of the surface refractive powers and results obtained by performing accurate magnification calculations for a specific sight line direction of these examples are shown in Table 1-1 and Table 1-2 in FIG. 7 and Graphs 4-1 and 4-2 to Graphs 7-1 and 7-2 in FIG. 12 to FIG. 14.

Modifications

Further, in the present invention, it is also possible to meet the demand for custom-made product (individual design) by incorporating, into the lens design as input information, not only usual prescription values but also, for example, the distance from the corneal vertex to the lens rear vertex, the distance from the eyeball rotating center to the lens rear vertex, the degree of aniseikonia between right and left eyes, the difference in height between right and left eyes, the object distance in near vision most frequently used, the forward tilt angle (in an up-down direction) and horizontal tilt angle (in a right-left direction) of a frame, the bevel position in the edge thickness of the lens, and so on, as individual factors of spectacle wearers which have been rarely grasped by lens manufactures. Although the present invention has a bi-aspherical surface configuration, it is not always necessary to process both surfaces after acceptance of an order to obtain the effect of the present invention. It is also advantageous in terms of cost and processing speed, for example, to prepare in advance "semifinished products" of the object side surface meeting the object of the present invention, select, after acceptance of an order, from among them a "semifinished product" of the object side surface meeting the purpose such as a prescription diopter or the above-described custom-made product (individual design), and process and finish only the eyeball side surface after acceptance of the order.

As a specific example of this method, for example, previous preparation of a bilaterally symmetrical "semifinished product" of the object side surface is conceivable. Then, an inner shift of the near portion in response to the convergence action of an eye in near vision can be incorporated by making the eyeball side surface into a bilaterally asymmetrical curved surface meeting the purpose in accordance with individual information such as the inter-vertex distance or the object distance in the near vision. As a matter of course, there are various conceivable means for obtaining or defining the individual information not only by actual measurement but also by estimation or by setting to average or standard values, but the present invention will not be limited to those means. Besides, it is possible to add a "correction action" for eliminating or reducing occurrence of astigmatism and change in diopter primarily caused by impossibility of the sight line intersecting at right angles with the lens surface, to the object side surface or the eyeball side surface or both curved surfaces of the object side surface and the eyeball side surface, in performance of optical calculations for incorporating not only usual prescription values but also the above-described individual factors into the lens design.

Further, it is generally known that three-dimensional rotating motions of eyes when we look around are based on a rule called "Listing's law." When a prescription diopter includes a cylindrical diopter, cylindrical axes of a spectacle lens and the eye may not match to each other in peripheral vision even if the cylindrical axis of the lens is matched to the "cylindrical axis of the eye in front vision." It is also possible to add a "correction action" for eliminating or reducing occurrence of astigmatism and change in diopter caused by such a mismatch between the cylindrical axes of the lens and the eye in peripheral vision, to a curved surface being the surface on the side having a cylindrical correction action of a lens according to the present invention.

Figure 6:
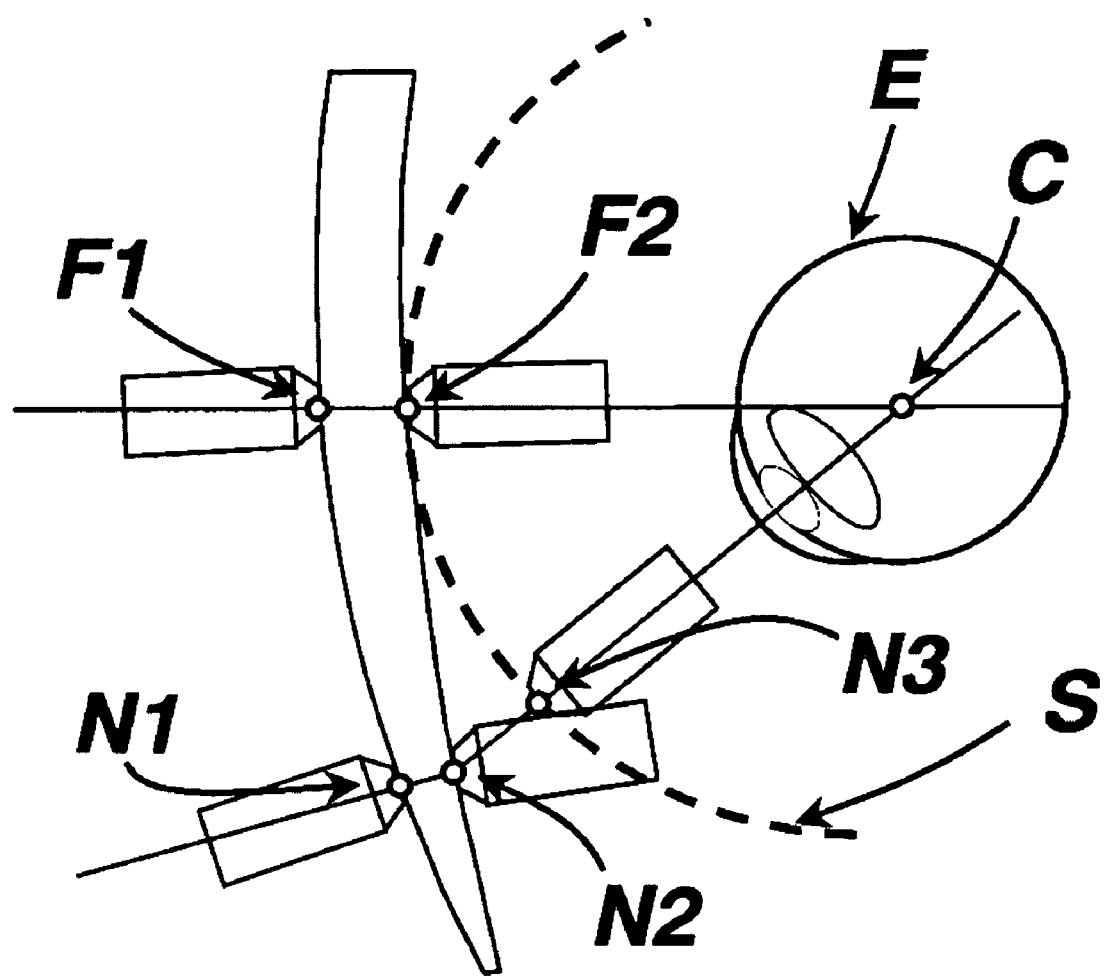
FIG. 6 is an explanatory view illustrating the difference of definition on "addition diopter"

It should be noted that, as the definition of the "predetermined addition diopter" in the present invention, any of the following definitions in various cases can be employed, including a case in which the diopter is defined as the difference between refractive powers measured by placing an opening of a lens meter at the far vision diopter measurement position F1 and at the near vision diopter measurement position N1 on the object side surface as shown in FIG. 6; and in addition, a case in which the diopter is defined as the difference between refractive powers measured by placing an opening of a lens meter at the far vision diopter measurement position F2 and at the near vision diopter measurement position N2 on the eyeball side surface; further a case in which the diopter is defined as the difference between a refractive power measured by placing an opening of a lens meter at the far vision diopter measurement position F2 on the eyeball side surface and a refractive power measured at N3 by rotating the opening of the lens meter about the eyeball rotating center position and directing it toward the near vision diopter measurement position N2; and a case using only refractive power component in the horizontal direction for each refractive power.

INDUSTRIAL AVAILABILITY

According to the present invention, a progressive action of a progressive-power lens is divided in the vertical direction and the horizontal direction of the lens, and then an optimal sharing ratio between the front and rear two surfaces on the object side and the eyeball side is set in each direction to configure one bi-aspherical type progressive-power lens, so that an advantage that the visual filed is widened in the horizontal direction can be received by increasing the sharing ratio of the progressive action in the horizontal direction on the rear surface (the eyeball side surface) and the disadvantage of increasing the eyeball rotating angle between the distance and near portions in the vertical direction can be restrained by increasing the sharing ratio of the progressive action in the vertical direction on the front surface (the object side surface).

Further, a wide effective visual field with less distortion in wearing can be provided in the progressive-power lens by reducing a magnification difference of an image between the distance portion and the near portion.

Furthermore, it is also possible to use a "bilaterally symmetrical semifinished product" as the object side surface of the progressive-power lens and process after acceptance of an order only the eyeball side surface into a bilaterally asymmetrical curved surface coping with a convergence action of an eye in near vision, thereby reducing processing time and cost.

What is claimed is:

1. A manufacturing method of a bi-aspherical type progressive-power lens, wherein a first refractive surface as an object side surface, and a second refractive surface as an eyeball side surface have progressive refractive power action, and surface astigmatism components on the first refractive surface are cancelled by the second refractive surface, so that the first and second refractive surfaces together provide a far vision diopter (Df) and an addition diopter (ADD) based on prescription values, the method comprising:

previously preparing a semi-complete product having the first refractive surface already processed, which is bilaterally symmetrical with respect to one meridian passing through a far vision diopter measurement position F1 and a near vision diopter measurement position N1;

after order reception, drawing the one meridian passing through a far vision diopter measurement position F2 and a near vision diopter measurement position N2 at a part on the second refractive surface of the semi-complete product so as to be shifted inward to a nose on a part for the near vision by a predetermined distance; and processing the second refractive surface.

2. The manufacturing method of the bi-aspherical type progressive-power lens according to claim 1,
wherein when a surface refractive power in a horizontal direction and the surface refractive power in a vertical direction at the far vision diopter measurement position F1 are expressed by DHf and DVf, respectively, and the surface refractive power in the horizontal direction and the surface refractive power in the vertical direction at the near vision diopter measurement position N1 are expressed by DHn and DVn, respectively, the following relational expressions are satisfied; $DHf+DHn<DVf+DVn$, and $DHn<DVn$.

3. The manufacturing method of the bi-aspherical type progressive-power lens according to claim 1,
wherein the relational expressions are satisfied; $DVn-DVf>ADD/2$, and $DHn-DHf<ADD/2$.

4. The manufacturing method of the bi-aspherical type progressive-power lens according to claim 2,
wherein the relational expressions are satisfied; $DVn-DVf>ADD/2$, and $DHn-DHf<ADD/2$.

5. The manufacturing method of the bi-aspherical type progressive-power lens according to claim 1,
wherein the first refractive surface is a rotation surface with the one meridian passing through the far vision diopter measurement position F1 as a generatrix, the second refractive surface is bilaterally asymmetrical with respect to the one meridian passing through a far vision diopter measurement position F2 on the second refractive surface, and a position of a near vision diopter measurement position N2 on the second refractive surface is shifted inward to a nose by a predetermined distance.

6. The manufacturing method of the bi-aspherical type progressive-power lens according to claim 2,
wherein the first refractive surface is a rotation surface with the one meridian passing through the far vision diopter measurement position F1 as a generatrix, the second refractive surface is bilaterally asymmetrical with respect to the one meridian passing through a far vision diopter measurement position F2 on the second refractive surface, and a position of a near vision diopter measurement position N2 on the second refractive surface is shifted inward to a nose by a predetermined distance.

7. The manufacturing method of the bi-aspherical type progressive-power lens according to claim 3,
wherein the first refractive surface is a rotation surface with the one meridian passing through the far vision diopter measurement position F1 as a generatrix, the second refractive surface is bilaterally asymmetrical with respect to the one meridian passing through a far vision diopter measurement position F2 on the second refractive surface, and a position of a near vision diopter measurement position N2 on the second refractive surface is shifted inward to a nose by a predetermined distance.

8. The manufacturing method of the bi-aspherical type progressive-power lens according to claim 4,
wherein the first refractive surface is a rotation surface with the one meridian passing through the far vision diopter measurement position F1 as a generatrix, the second refractive surface is bilaterally asymmetrical with respect to the one meridian passing through a far vision diopter measurement position F2 on the second refractive surface, and a position of a near vision diopter measurement position N2 on the second refractive surface is shifted inward to a nose by a predetermined distance.

* * * * *